US010679465B2

(12) United States Patent
Colvin et al.

(10) Patent No.: US 10,679,465 B2
(45) Date of Patent: Jun. 9, 2020

(54) WAGERING GAME SYSTEM AND METHOD WITH SKILL-BASED SELECTION OF PRIZES USING ARCADE STYLE TARGETING

(71) Applicant: Gaming Arts, LLC, Las Vegas, NV (US)

(72) Inventors: David Colvin, Las Vegas, NV (US); Eric D. Colvin, Las Vegas, NV (US)

(73) Assignee: Gaming Arts, LLC, Las Vegas, NV (US)

( * ) Notice: Subject to any disclaimer, the term of this patent is extended or adjusted under 35 U.S.C. 154(b) by 0 days.

(21) Appl. No.: 16/120,396

(22) Filed: Sep. 3, 2018

(65) Prior Publication Data

US 2018/0374310 A1 Dec. 27, 2018

Related U.S. Application Data

(63) Continuation of application No. 15/043,215, filed on Feb. 12, 2016, now Pat. No. 10,068,434.

(51) Int. Cl.
*G06F 17/00* (2019.01)
*G07F 17/32* (2006.01)

(52) U.S. Cl.
CPC ...... *G07F 17/3267* (2013.01); *G07F 17/3209* (2013.01); *G07F 17/3211* (2013.01); *G07F 17/3213* (2013.01); *G07F 17/3244* (2013.01); *G07F 17/3295* (2013.01); *G07F 17/3297* (2013.01)

(58) Field of Classification Search
None
See application file for complete search history.

(56) References Cited

U.S. PATENT DOCUMENTS 6,007,426 A * 12/1999 Kelly ...................... A63F 3/081 463/16
6,942,571 B1 9/2005 McAllister et al.
(Continued)

FOREIGN PATENT DOCUMENTS

GB 2387950 A 10/2003

OTHER PUBLICATIONS

International Search Report and Written Opinion for International Application No. PCT/US17/17116 dated May 26, 2017.
(Continued)

*Primary Examiner* — Paul A D'Agostino
(74) *Attorney, Agent, or Firm* — Brooks Kushman PC

(57) ABSTRACT

A wagering game system and method having an arcade-style bonus game to win a bonus prize or select one of a plurality of bonus prizes include a gaming device having a monetary input device, a user interface, and a processor programmed to add the monetary value to a credit balance, deduct the selected wager from the credit balance, and decrease the credit balance in response to the cash out operation. The bonus game enables the player to win a bonus prize or to select a bonus prize. The bonus game includes targets, wherein the processor adjusts at least one attribute associated with target selection to adjust a probability of winning a prize or selecting particular ones of the plurality of bonus prizes. The attribute may be adjusted based on a skill level of the player and may include speed, size, number of targets, and/or accuracy of a target selector.

36 Claims, 31 Drawing Sheets

(56) References Cited

U.S. PATENT DOCUMENTS 7,179,166 B1 2/2007 Abbott
7,494,410 B2 2/2009 Romik
7,789,756 B2 9/2010 Jones et al.
8,157,630 B2 * 4/2012 Herrmann ........... G07F 17/3295 273/138.1
8,308,556 B2 * 11/2012 Thomas .................. G07F 17/32 345/474
8,715,085 B2 5/2014 Crowder et al.
8,771,051 B2 7/2014 Mattice et al.
8,956,216 B1 * 2/2015 LeSourd ............. G07F 17/3213 463/20
9,017,158 B1 4/2015 Di Carlo
2002/0097229 A1 * 7/2002 Rose ..................... G06F 1/1626 345/173
2002/0160825 A1 10/2002 Nicastro et al.
2002/0193162 A1 * 12/2002 Walker .................... A63F 13/12 463/42
2003/0064805 A1 * 4/2003 Wells ...................... G07F 17/32 463/39
2003/0125107 A1 * 7/2003 Cannon ................... G07F 17/32 463/25
2004/0171417 A1 * 9/2004 Beaulieu ............. G07F 17/3211 463/20
2005/0059476 A1 * 3/2005 Vancura .................. G07F 17/32 463/20
2005/0148383 A1 * 7/2005 Mayeroff ................ G07F 17/32 463/20
2006/0105829 A1 5/2006 Vancura
2006/0160596 A1 * 7/2006 Sato ........................ G07F 17/32 463/16
2007/0054723 A1 * 3/2007 Mattice ................... G07F 17/32 463/16
2007/0259717 A1 11/2007 Mattice et al.
2008/0076546 A1 3/2008 Moyle et al.
2008/0113765 A1 * 5/2008 DeWaal .............. G07F 17/3244 463/25
2008/0132326 A1 * 6/2008 Seelig ................. G07F 17/3202 463/20
2009/0189351 A1 * 7/2009 Baerlocher ............. G07F 17/32 273/309
2009/0247267 A1 * 10/2009 Acres ...................... G07F 17/32 463/20
2009/0247284 A1 * 10/2009 Sugiyama ............... G07F 17/32 463/25
2009/0270164 A1 * 10/2009 Seelig ..................... G07F 17/32 463/20
2010/0056243 A1 * 3/2010 Czyzewski ......... G07F 17/3244 463/16
2010/0072699 A1 * 3/2010 Bress ...................... A63F 7/027 273/121 A
2010/0151932 A1 6/2010 Ellis
2010/0160023 A1 6/2010 Kane et al.
2011/0009178 A1 * 1/2011 Gerson ............... G07F 17/3295 463/17
2011/0212766 A1 * 9/2011 Bowers ................... G07F 17/32 463/25
2011/0218028 A1 * 9/2011 Acres ........................ A63F 9/24 463/20
2011/0263312 A1 * 10/2011 De Waal ................... A63F 7/02 463/20
2012/0214572 A1 8/2012 Seelig et al.
2012/0322545 A1 * 12/2012 Arnone ............... G07F 17/3272 463/25
2013/0217458 A1 * 8/2013 LeSourd ................. G07F 17/34 463/16
2013/0217465 A1 8/2013 Jaffe et al.
2013/0344942 A1 * 12/2013 Price ................... G07F 17/3241 463/25
2014/0087869 A1 * 3/2014 Thorne ................... G07F 17/32 463/31
2014/0194182 A1 * 7/2014 Young ................. G07F 17/3213 463/20
2014/0364210 A1 * 12/2014 Murray ............... G07F 17/3272 463/31
2015/0011285 A1 1/2015 Kaiblinger et al.
2015/0087378 A1 * 3/2015 Louie .................. G07F 17/3258 463/17
2017/0169653 A1 * 6/2017 Froy ................... G07F 17/3209
2017/0249806 A1 * 8/2017 Lutnick ............... G07F 17/3293
2018/0047253 A1 * 2/2018 Vann ................... G07F 17/3262
2018/0374308 A1 * 12/2018 Colvin ................ G07F 17/3209

OTHER PUBLICATIONS

Extended European Search Report and Opinion, EPO Application. No. EP 17 75 0737.3 (PCT/US2017017116), dated Sep. 20, 2019 (16 pages total).

* cited by examiner

WAGERING GAME SYSTEM AND METHOD WITH SKILL-BASED SELECTION OF PRIZES USING ARCADE STYLE TARGETING

CROSS-REFERENCE TO RELATED APPLICATIONS

This application is a continuation of, and claims priority under 35 U.S.C. § 120 to, commonly owned U.S. patent application Ser. No. 15/043,215 filed Feb. 12, 2016, now U.S. Pat. No. 10,068,434, the disclosure of which is hereby incorporated by reference in its entirety.

This application is related to the following commonly owned and co-pending U.S. patent applications, which also claim priority to U.S. patent application Ser. No. 15/043,215 filed Feb. 12, 2016: U.S. patent application Ser. No. 16/077,551 filed Aug. 13, 2018; U.S. patent application Ser. No. 16/120,362 filed Sep. 3, 2018, titled "Wagering Game System And Method With Prize Selection Based On Historical Skill Level Of Player"; U.S. patent application Ser. No. 16/120,377 filed Sep. 3, 2018, titled "Wagering Game System And Method With Combined Variable Randomness And Skill-Based Prize Selection"; U.S. patent application Ser. No. 16/120,381 filed Sep. 3, 2018, titled "Wagering Game System And Method With Skill-Based Prize Selection Based On Player Identity"; U.S. patent application Ser. No. 16/120,384 filed Sep. 3, 2018, titled "Wagering Game System And Method With Skill-Based Selection of Prizes Using Arcade Style Matching"; U.S. patent application Ser. No. 16/120,402 filed Sep. 3, 2018, titled "Wagering Game System And Method With Skill-Based Selection of Prizes Using Arcade Style Chase Or Pursuit"; and U.S. patent application Ser. No. 16/120,416 filed Sep. 3, 2018, titled "Wagering Game System And Method With Skill-Based Selection of Prizes Using Sports Theme".

BACKGROUND

Embodiments of the present disclosure relate to systems and methods for providing skill-based selection of prizes for games of chance.

Casinos and other gaming establishments often provide a variety of games of chance to players. These games of chance may include reel-based slot games, video poker, bingo games, keno games, and the like. The gaming establishments may periodically change the games offered in the establishments to keep players engaged and to provide new gaming experiences to the players.

Many players like to feel that they are in control over some part of the games so that they feel like they have an ability to influence either the outcome of the game or the prizes that they are able to win. As a result, some players may feel more engaged playing games in which they are able to exercise some amount of skill during the gameplay of the games or in the selection of the prizes awarded after the games are concluded.

SUMMARY

In one embodiment, a system is provided that includes a gaming device including a monetary input device configured to receive a physical item associated with a monetary value and a user interface configured to enable a player to select a wager for a game of chance and enable the player to initiate a cash out operation. The gaming device also includes a processor programmed to add the monetary value to a credit balance for the player, deduct the selected wager from the credit balance, and decrease the credit balance in response to the cash out operation. The system also includes a rotatable wheel comprising a plurality of selectable bonus prizes that are selectable by rotating the wheel until the wheel stops at a stopping position. The player is enabled to influence the stopping position of wheel.

In another embodiment, a method of selecting a prize for a game of chance is provided that includes receiving a physical item associated with a monetary value using a monetary input device of a gaming device, enabling a player to select a wager for a game of chance using a user interface of the gaming device, and enabling the player to initiate a cash out operation using the user interface. The method also includes adding the monetary value to a credit balance for the player, deducting the selected wager from the credit balance, and decreasing the credit balance in response to the cash out operation. The method further includes providing a rotatable wheel that includes a plurality of selectable bonus prizes that are selectable by rotating the wheel until the wheel stops at a stopping position, and enabling the player to influence the stopping position of the wheel.

In one embodiment, a system is provided that includes a gaming device including a monetary input device configured to receive a physical item associated with a monetary value and a user interface configured to enable a player to select a wager for a game of chance and enable the player to initiate a cash out operation. The gaming device also includes a processor programmed to add the monetary value to a credit balance for the player, deduct the selected wager from the credit balance, and decrease the credit balance in response to the cash out operation. The system also includes a bar-based prize selector that includes a prize indicator and a plurality of selectable bonus prizes that are selectable by oscillating the prize indicator until the prize indicator stops at a stopping position, wherein the player is enabled to influence the stopping position of the prize indicator.

In another embodiment, a method of selecting a prize for a game of chance is provided that includes receiving a physical item associated with a monetary value using a monetary input device of a gaming device, enabling a player to select a wager for a game of chance using a user interface of the gaming device, and enabling the player to initiate a cash out operation using the user interface. The method also includes adding the monetary value to a credit balance for the player, deducting the selected wager from the credit balance, and decreasing the credit balance in response to the cash out operation. The method further includes providing a bar-based prize selector that includes a prize indicator and a plurality of selectable bonus prizes that are selectable by oscillating the prize indicator until the prize indicator stops at a stopping position, and enabling the player to influence the stopping position of the prize indicator.

In one embodiment, a system is provided that includes a gaming device including a monetary input device configured to receive a physical item associated with a monetary value and a user interface configured to enable a player to select a wager for a game of chance and enable the player to initiate a cash out operation. The gaming device also includes a processor programmed to add the monetary value to a credit balance for the player, deduct the selected wager from the credit balance, and decrease the credit balance in response to the cash out operation. The system also includes a rotation-based prize selector that includes a prize indicator and a plurality of selectable bonus prizes that are selectable by rotating the prize indicator until the prize indicator stops at a stopping position, wherein the player is enabled to influence the stopping position of the prize indicator.

In another embodiment, a method of selecting a prize for a game of chance is provided that includes receiving a physical item associated with a monetary value using a monetary input device of a gaming device, enabling a player to select a wager for a game of chance using a user interface of the gaming device, and enabling the player to initiate a cash out operation using the user interface. The method also includes adding the monetary value to a credit balance for the player, deducting the selected wager from the credit balance, and decreasing the credit balance in response to the cash out operation. The method further includes providing a rotation-based prize selector that includes a prize indicator and a plurality of selectable bonus prizes that are selectable by rotating the prize indicator until the prize indicator stops at a stopping position, and enabling the player to influence the stopping position of the prize indicator.

DETAILED DESCRIPTION

Figure 1:
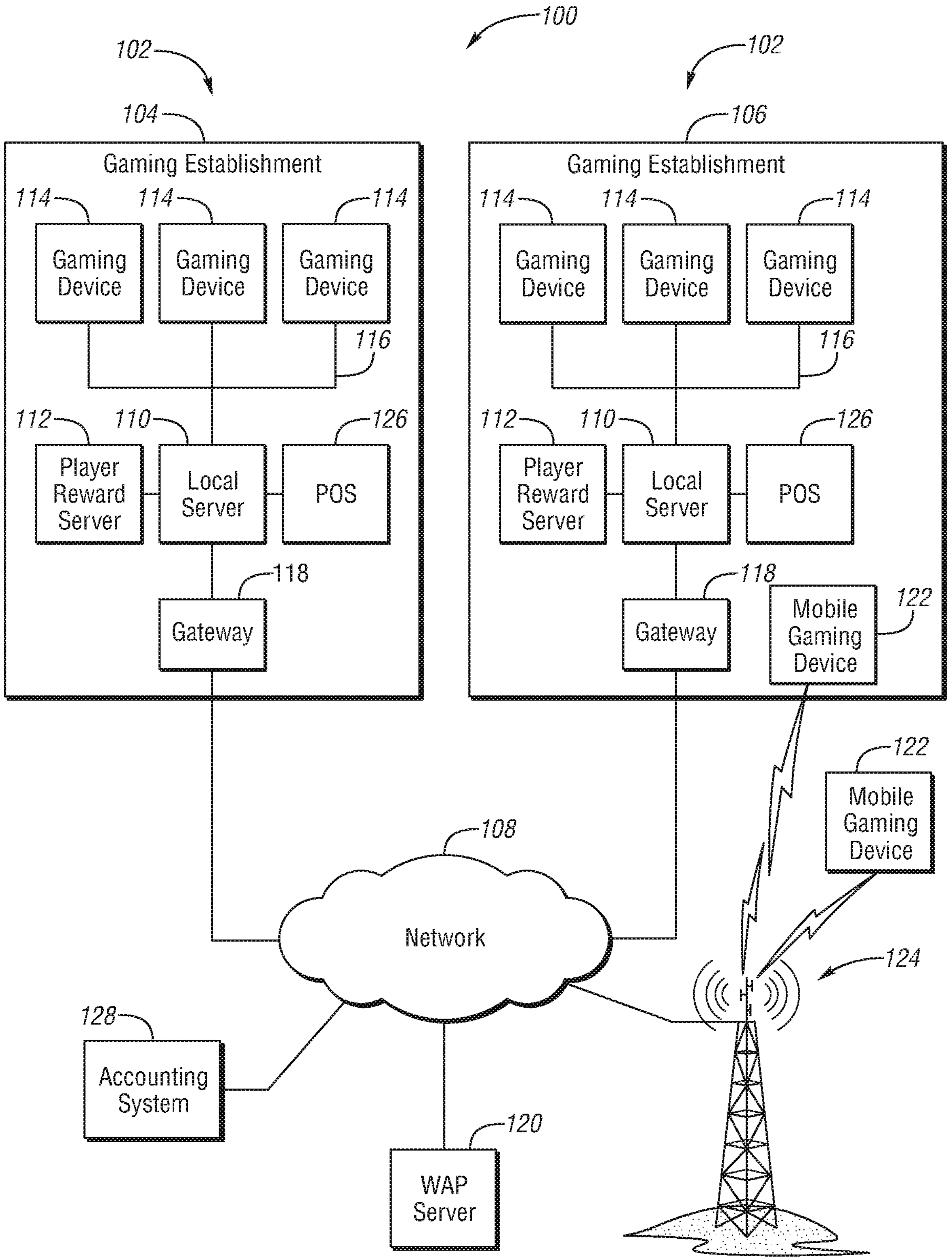
FIG. 1 is a block diagram of a system that may be used to play a game of chance.

Systems and methods for selecting prizes for games of chance are described herein. In one embodiment, a plurality of gaming devices are connected to one or more servers over a network, such as a wide area network (WAN) and/or a local area network (LAN). In one embodiment, the gaming devices are electronic gaming machines (EGMs), otherwise known as “slot machines.” These may be classified as Class II, Class III, video lottery terminals (VLT), or the like. EGMs may present either one or a plurality of games to the player such as video reels, video poker, video keno, video bingo, and the like. In another embodiment, the gaming devices are gaming kiosks or terminals. Alternatively, the gaming devices may include, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a game of bingo to be played on a gaming device, the gaming device uses the randomization device to select a plurality of house indicia from a pool of 75 indicia (or from a different sized pool) to be used during the game. In another embodiment, at least some aspects of one game are provided by one or more servers, such as a local server, a wide area server, a local area progressive server (LAP), or a wide area progressive server (WAP). The server or servers may include a randomization device for randomly selecting the house indicia in the bingo game.

In the example of a video poker game, either one or a plurality of games are presented to the player. After game selection and wagering, a number of playing cards, generally selected from a 52 card deck, are distributed to the player. In the case of draw poker or its many variants, the player selectively chooses to retain one or more of the original cards dealt and to discard those cards not chosen to be retained. The discarded cards are then replaced by new cards. If the player obtains a predefined winning combination of cards, the player wins an amount associated with the particular combination of cards.

In the example of mechanical, electromechanical, or video reel machines, the games may include a number of mechanical or simulated rotating reels that are arranged in a horizontal or vertical configuration forming columns or rows. One or a number of rows, columns or similar are presented to the player to allow for one or many different winning pay lines. Pay lines may be straight across or designed in any convenient fashion. A typical game many include five reels or columns and three or four rows or the like.

In the example of the bingo game, the house indicia are compared to a plurality of player indicia that are included within a pattern selected for one or more player cards. If at least some of the player indicia within the pattern are matched by the house indicia, the player may win a prize based on the number of house indicia that have been matched and an associated pay table.

In the example of a keno game or a keno-related game of chance, the gaming device uses the randomization device to randomly select a plurality of house indicia in a similar manner as described with respect to the game of bingo. However, the house indicia are typically randomly selected, or called, from a pool of 80 house indicia, although other sizes of house indicia pools may be used. The called house indicia are compared to a plurality of player indicia to determine how many player indicia are matched by the house indicia and may be irrespective of a pattern of the player indicia. The embodiments described herein may include allowing the player to select the number of and specific player indicia to be utilized for a keno game or may include an automated or quick pick selection. For example, a player may select one player indicia or spot to play a 1 spot game, 2 player indicia or spots for a 2 spot game, 3 player indicia or spots for a 3 spot game, etc. Embodiments may also include a maximum number of player indicia or spots that are playable. For example, in an 80 number game, the maximum number of house indicia or spots selectable by the player may be confined to 20 numbers or less or a 20 number game or less. Accordingly, in an 80 number game, the minimum number of player indicia or spots may be 4 and the maximum player indicia or spots may be 20. The player may win one or more prizes based on the number of player indicia matched by the called house indicia.

In these and other embodiments, the player may be eligible for a bonus prize based on the gameplay of the game of chance. For example, the player may become eligible for a bonus prize if the player matches a predetermined number and/or pattern of house or bonus indicia on a slot reel, in a bingo game, in a keno game, or if the player achieves a certain hand rank in a video poker game, for example.

If the player is determined to be eligible for a bonus prize, a bonus prize selector may be presented to the player. The bonus prize selector may be a wheel-based prize selector, a bar-based prize selector, a rotation or arc-based prize selector, and/or any other suitable prize selector. The prize selector may be operated to stop at one of a plurality of stopping positions with each stopping position having at least one prize associated therewith. Alternatively, some stopping positions may not have a prize associated therewith. The player may operate the prize selector using at least some amount of skill to influence or determine the stopping position of the prize selector and/or to influence the prize awarded as a result of operating the prize selector. Conversely, the prize selector may be in the stop position at the time the bonus is awarded and following triggering of the prize selector, stop at one of a plurality of stopping positions with each stopping position having at least one prize associated therewith. Alternatively, some stopping positions may not have a prize associated therewith. The player may operate or start the prize selector using at least some amount of skill to influence or determine the ultimate stopping position of the prize selector and/or to influence the prize awarded as a result of operating the prize selector either directly or in combination with one or more prize selectors or prize selector types.

As defined herein, the term "skill" refers to the use of a player's judgment, timing, reflexes, and/or strategy to provide an input that may be used to influence the stopping position or operation of the prize selector to influence the prize awarded as a result of the prize selector operation or starting the prize selector by use of a player's judgment, timing, reflexes, and/or strategy to provide an input that may be used to influence the ultimate stopping position. Stopping or starting positions may refer to either a discrete point or a range within the prize selector.

In one embodiment, the probabilities related to the selection of each prize using the prize selector may be adjusted based on the player's demonstrated skill at operating the prize selector and/or the player's prize history. For example, in an embodiment in which the prize selector includes a wheel, the wheel may be spun at a higher speed and/or may be decelerated at a different or varying rate if the player has demonstrated a proficiency in influencing the stopping position of the wheel. Similarly, in embodiments in which the wheel includes a plurality of sections and each section is associated with a prize, the size of each section may be adjusted so that higher value prizes may be associated with sections of reduced size for players who have demonstrated a proficiency in influencing the stopping position of the wheel. This may either be visible to the player or transparent to the player where the section size may appear identical but treated as smaller by the computer processor. Likewise, for players who have demonstrated a lack of skill or proficiency in operating the prize selector or who may have an unknown level of proficiency, the wheel may be spun at a slower rate or the size of the sections associated with higher value prizes may be increased as desired. This may either be visible to the player or transparent to the player where the section size may appear identical but treated as larger by the computer processor. Similarly, for many embodiments, for players who have demonstrated a lack of skill or proficiency in operating the prize selector or who may have an unknown level of proficiency, a time range for determining a desired outcome may be used to determine the ultimate outcome of the prize selector, i.e., 250 milliseconds triggering time range for a specific prize, but the duration of the time range may be adjusted or reduced for players who have demonstrated a proficiency in influencing the stopping position of the wheel, i.e., 50 milliseconds triggering time range for a specific prize.

Prizes awarded as a result of operating the prize selector may include, for example, a defined amount of money or credits, one or more free games, one or more items of merchandise, current or future game multipliers, discount coupons or tickets, a progressive prize, a pari-mutuel prize, and/or any other suitable prize.

Accordingly, the embodiments described herein may enhance the player's satisfaction and engagement with the games of chance. The player may feel more engaged and may want to play the games of chance longer or more frequently as a result of the skill-based prize selectors described herein.

A technical effect of the systems and methods described herein includes one or more of: (a) receiving a physical item associated with a monetary value using a monetary input device of a gaming device; (b) enabling a player to select a wager for a game of chance using a user interface of the gaming device; (c) enabling the player to initiate a cash out operation using the user interface; (d) adding the monetary value to a credit balance for the player; (e) deducting the selected wager from the credit balance; (f) decreasing the credit balance in response to the cash out operation; (g) providing a rotatable wheel that includes a plurality of randomly, skill based, or partially skill based selectable bonus prizes that are selectable by rotating the wheel until the wheel stops at a stopping position; and (h) enabling the player to influence the stopping or starting position of the wheel. It should be recognized that operation of the prize selector may be based on either stopping the prize selector as described or starting of the prize selector in any suitable means.

Another technical effect of the systems and methods described herein includes one or more of: (a) receiving a physical item associated with a monetary value using a monetary input device of a gaming device; (b) enabling a player to select a wager for a game of chance using a user interface of the gaming device; (c) enabling the player to initiate a cash out operation using the user interface; (d) adding the monetary value to a credit balance for the player; (e) deducting the selected wager from the credit balance; (f) decreasing the credit balance in response to the cash out operation; (g) providing a bar-based or rotation-based prize selector that includes a prize indicator and a plurality of randomly, skill based, or partially skill based selectable bonus prizes that are selectable by oscillating or rotating the prize indicator until the prize indicator stops at a stopping position; and (h) enabling the player to influence the stopping or starting position of the prize indicator. It is understood that any of the embodiments described may include a time limit for the player to either stop or start the prize selector where the prize selector may automatically stop or start predicated on the player's lack of response thereby reducing the total time for a given game play.

As used herein, a "game of chance" or "game" refers to a game that is played by a player in which an outcome of the game of chance is at least partially based on chance or a random selection of game components. A game may be categorized by a game variety and/or a game size, for example. It should be recognized by those of ordinary skill in the art that the term "random" is not limited to true randomness, such as truly random numbers. Rather, pseudorandom numbers and pseudorandom algorithms are included within the meaning of "random." In addition, those of ordinary skill in the art will recognize that permutation generators may additionally or alternatively be used to generate player card indicia or other game components.

Gaming devices described herein may use real money for play, or may utilize a credit-based system in which the credits used for the games do not have a cash value. Similarly, prizes for the games may be in the form of credits, cash, and/or physical prizes such as televisions, automobiles, or the like.

The play of a game, or the gameplay, may include the random drawing or selection of a plurality of house indicia. The house indicia may be drawn or selected until a game ending criteria is met or until a predetermined number of house indicia have been selected. In an embodiment where the game being played is a reel-based game (sometimes referred to as a "slot game" or a "slot machine game"), the gameplay may include a random selection of house indicia displayed on the reels of the game. In an embodiment in which the game being played is a bingo or keno game, the gameplay may include a random drawing or selection of numbered balls or other house indicia.

As used herein, the term "player indicia" refers to indicia, such as objects, graphics, symbols, numbers, letters, or the like, that may be printed on, displayed on, or otherwise associated with a player card used by the player to play a game of chance. In at least some embodiments, the player may select one or more player indicia for each player card.

The term "house indicia" or "game indicia" refers to indicia, such as objects, graphics, symbols, numbers, letters, or the like, that may be generated, called, or otherwise selected by a gaming establishment or an operator of the game (e.g., by a computing device or server operated by the gaming establishment or operator). In an embodiment in which the game played is a slot game, the selected house indicia may be compared to predetermined winning patterns of house indicia to determine whether the player wins a prize. In an embodiment in which the game played is a bingo or keno game, the selected house indicia are compared to player indicia on each player card to determine if each player card satisfies one or more winning conditions, such as matching a predetermined pattern or matching a predetermined number of indicia on the player card.

The term "ball call" refers to a random selection of house indicia in connection with a game of chance. The terms "select," "draw," "call," "determine," and "generate" are used interchangeably with respect to the selection of house indicia, numbers, or balls in a game. A ball call may include drawing or receiving a random ball with a number indicated on the ball, or may more generally refer to a random selection of a number or another suitable house indicia using a randomization device. A "ball," as used herein, may be a round plastic, wood, or glass spherical object with a number or other indicia displayed thereon, or may be an electronic representation of a spherical object with a number or other indicia displayed thereon. It should be recognized that the term "ball" may also include non-spherical objects or electronic representations, such as cubes, electronic images, and/or the numbers or indicia by themselves.

As used herein, the term "pattern" refers to a predetermined combination of spaces or indicia of a player card, a reel, or the like. In at least some embodiments, a winning combination is satisfied if player indicia included within the spaces associated with a pattern are matched to house indicia called during the game.

As used herein, the term "the house" refers to a game operator or a gaming establishment operator. For example, if a game is operated within or by a casino, the casino may be referred to as the house. Alternatively, the house may refer to a software application contained within a mobile device, such as a cell phone or a tablet computing device, that operates the game on the mobile device.

As used herein, the term "fixed prize" or "fixed payout" refers to a prize or payout that is a predetermined multiple of an amount wagered on the game, or that is a fixed amount regardless of the amount wagered. The fixed prizes or payouts are typically listed on a pay table associated with the game.

In contrast, progressive prizes or payouts are prizes or payouts in which at least a portion of the payout or prize increases or changes based on the amounts wagered by the players who are playing the game to win the progressive prize.

The term "meter" may refer to various types of devices or processors or the like such as a discrete computerized device or may exist as a software implementation within an accounting system or similar. Meters may be used to track an amount of money or credits wagered, won, and/or lost and to output a signal or data representative of the tracked amount.

Any suitable game of chance may be played that operates according to the described embodiments. Example games of chance playable according to the disclosure herein include video poker, video reel slots, a keno or keno-related game, a bingo or bingo-related game, table games, and sports betting. However, it should be emphasized that these games are merely exemplary, and any other suitable game may be played as described herein.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

In some embodiments, different groups of players may qualify to compete to win different prizes or may share the common result with players within the group. For example, a first group of players positioned in a gaming establishment may be able to compete to win one or more local prizes (e.g., progressive prizes and/or pari-mutuel prizes) while a second group of players may not be able to compete to win those prizes, for example, if the second group of players is positioned outside of the gaming establishment. However, the first group of players and the second group of players may be able to compete to win one or more other shared or common prize, such as one or more progressive and/or pari-mutuel prizes administered over a wide area network.

An "individual prize" is a prize that is only awarded to a player of an individual gaming device. For example, if a group of players are playing a game over a network, the game may provide one or more individual prizes that are tied to a single gaming device such that the individual prizes are only able to be won by the player of the gaming device. Individual prizes are sometimes referred to as gaming device specific player prizes because the individual prizes are specific to a player's gaming device. Accordingly, while a plurality of players may play to win one or more shared or common progressive prizes and/or pari-mutuel prizes, each player is prevented from winning individual prizes associated with, or "tied to," any other player's gaming device.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices. Any suitable means to connect or couple devices or components together may be used.

A player reward card refers to a physical or electronic card, token, or other device or data that enables a system to identify a player in connection with, among other things, a reward program or campaign. Accordingly, the player reward card may serve to identify the player and may enable gameplay, credits, funds, or other data to be associated with the player.

A player card refers to a card that may be used by the player to play bingo or another game of chance. The player card typically includes a plurality of spaces that may display or include player indicia. The player card may be an electronic card that is transmitted to a device or generated by a device that the player is using to play the game of chance. Alternatively, the player card may be manufactured from paper, cardboard, cardstock, plastic, and/or any other suitable material.

Methods described herein may be embodied within a plurality of instructions stored within a memory device of a computing device. Moreover, a processor of the computing device, or of a computing device coupled to the memory device, executes the instructions to perform the functions described herein and/or to cause the functions described herein to be performed. The instructions may be grouped together to form one or more computer-readable program modules.

Computing devices typically include at least one processor and at least one memory device. The processor may be, without limitation, an x86-based logic circuit, an ARM-based logic circuit, and/or a system-on-a-chip circuit. It should be recognized that these examples are non-limiting, and a variety of other programmable circuits may be included within the definition of "processor." The memory device may include random access memory (RAM), flash memory, read-only memory (ROM), hard disk drives, magnetic-based memory, and/or any other form of computer-readable memory.

A desktop computer is one example of a computing device. It should be recognized that computers or computing devices may be implemented as one or more virtual machines, virtual servers, and/or any other virtual device. A server is another type of computing device that may receive network connections from a computer or a plurality of computers or other computing devices.

As used herein, the term "module" or "program module" refers to a computer program, dataset, and/or instruction set that, when executed by a processor, performs the functions described herein. In one embodiment, the module may be included within a computer program, or may be connected to a computer program in any suitable manner. Any computer readable instructions may be programmed or hardcoded in a device, such as a gaming device, in any suitable manner.

FIG. 1 is a block diagram of a system 100 that may be used to play one or more games of chance, such as video poker, video slots, race or sports betting, table games, bingo, keno, or the like. The games of chance may be played by a player against other players, or may be played by the player against the house.

System 100 is operated using components and devices within one or more gaming establishments 102, such as a first gaming establishment 104 and a second gaming establishment 106. It should be recognized that any suitable number of gaming establishments 102 may be provided within system 100. Accordingly, system 100 is not limited to including two gaming establishments 102 as illustrated in FIG. 1. In one embodiment, gaming establishments 102 are locations in which devices (e.g., gaming devices) that play or operate at least a portion of the game of chance are located. For example, gaming establishments 102 may be casinos, racetracks, bingo halls, keno parlors, or any other establishments. In another example, gaming establishments 102 may be residences or businesses in which one or more devices are located for playing or operating the game of chance. Gaming establishments 102 may additionally or alternatively include any combination of the examples described herein.

In one embodiment, gaming establishments 102 are physically remote from each other and are communicatively connected to at least one network 108, such as a wide area network (WAN), a metropolitan area network (MAN), and/or the Internet, for example. Alternatively, gaming establishments 102 may be separate rooms or sections of a casino or another facility that are communicatively connected together by network 108. It should be recognized that network 108 may be a wired Ethernet network, a wireless Ethernet network, a combination of wired and wireless Ethernet networks, or any other suitable wired and/or wireless network.

In one embodiment, each gaming establishment 102 includes a local game server 110 (referred to herein as a "local server") and a player reward server 112. Local server 110 and player reward server 112 may alternatively be implemented as or within a single server. Local server 110 is coupled to a plurality of gaming devices 114 through an internal network 116, such as a private local area network (LAN) within gaming establishment 102, for example. Gaming devices 114 may be located in separate gaming establishments 102, or within the same gaming establishment 102. In one embodiment, a gateway 118 is provided to enable local server 110 of each gaming establishment 102 to securely connect to network 108.

In one embodiment, local server 110 is a server computer (or "server") that monitors and controls the games played on gaming devices 114, including local games. In one embodiment, the local games include games that are played against the house and/or that are played against other players within gaming establishment 102.

In addition, local server 110 may administer other background tasks that enable games to be played on gaming devices 114. For example, local server 110 may facilitate authenticating gaming devices 114 and the players using gaming devices 114, and may facilitate allocating payments or credits between players and the house. Local server 110 may include payment processing capabilities to enable players to receive electronic funds from a bank or another financial institution or to deposit electronic funds to the bank or financial institution. Alternatively, the payment processing capabilities may be included in a separate server or another device that is communicatively connected to local server 110. In addition, local server 110 may interface with player reward server 112 to facilitate tracking and administering player rewards. Each gaming device 114, group of gaming devices 114, local servers 110, player reward servers 112, or the like may collect and/or generate data desired for accounting purposes, such as for use in slot accounting systems.

In one embodiment, local server 110 may enable gaming devices 114 within gaming establishment 102 to participate in one or more games that share one or more progressive or pari-mutuel prizes with other gaming establishments 102 and/or gaming devices 114. While progressive prizes are described in embodiments herein, it should be recognized that pari-mutuel prizes may be substituted as desired, and vice versa. In such an embodiment, each local server 110 may be coupled to a wide area progressive (WAP) server 120 that administers the prizes. For example, WAP server 120 receives data from each local server 110 and/or from gaming devices 114 regarding an amount wagered by each player playing the game. WAP server 120 may allocate a portion of each wager to the prizes and may communicate the current prize amounts to local servers 110 and/or to gaming devices 114.

Gaming devices 114 may include one or more gaming kiosks or terminals, electronic gaming machines (EGMs) (also known as "slot machines"), desktop computers, lottery kiosks or terminals, or any other suitable device. Gaming devices 114 may additionally or alternatively include one or more desktop computers or one or more mobile gaming devices 122, such as, without limitation, cellular phones, tablet computing devices, laptops, or any other suitable device. Mobile gaming devices 122 may connect to local server 110, WAP server 120, and network 108 via a wireless data network represented by cell tower 124. For example, mobile gaming devices 122 may connect to any suitable network 108 (and thereby to local servers 110 and/or WAP server 120) via a "3G" or a "4G" wireless data network. It should be recognized that mobile gaming devices 122 may additionally or alternatively connect to network 108 using another suitable wireless network, such as a wireless Ethernet network. For convenience, gaming devices 114 described herein may also include mobile gaming devices 122.

One or more point-of-sale (POS) terminals 126 may also be included within each gaming establishment 102 to enable players to "cash out" winnings from one or more gaming devices 114 and/or to perform other account management activities related to player accounts. POS terminals 126 may be connected to local server 110, for example, and/or to WAP server 120 as desired.

In addition, system 100 may include an accounting system 128 (sometimes referred to as a "slot accounting system") coupled to WAP server 120, local server 110, and/or gaming devices 114, for example, through network 108. In one embodiment, accounting system 128 is a server or another suitable computer that includes at least one processor, at least one memory device, and at least one communication device. Accounting system 128 may be used to track and/or audit financial aspects of system 100 to ensure compliance with applicable regulations. While accounting system 128 is illustrated in FIG. 1 as being external to gaming establishments 104 and 106, it should be recognized that a separate accounting system 128 may be included within each gaming establishment 104 and 106.

During operation, the player utilizes or selects a gaming device 114 and initiates a gaming session for playing one or more games of chance ("games"). Optionally, the player inserts a player reward card or enters a player reward number or other identification information into gaming device 114. If the identification information is entered, gaming device 114 transmits the identification information to local server 110 for authentication, or authentication may be accomplished locally within gaming device 114. Local server 110 communicates with player reward server 112 to establish the player's identity and to associate the gameplay with the player account. Local server 110 authenticates the player and gaming device 114 and authorizes the player to play the game or games on gaming device 114 if desired or required.

When play of the game is initiated, during selection of the game, or during play of the game, the player may be required to purchase or generate credits. The player may purchase or generate credits by inserting cash or a ticket-in-ticket-out voucher into gaming device 114 or another device. Alternatively or additionally, the player may transfer credits or cash to gaming device 114 from banking accounts, credit accounts, gaming establishment accounts, and/or gaming company accounts. In one embodiment, computer-generated credits may be used with gaming device 114, for example, as part of a free-to-play game.

The player selects a game to play and enters a wager on gaming device 114. Gaming device 114 transmits data representative of the selected game and the wager to local server 110. If the player selects a game that is at least partially operated by WAP server 120 or that includes one or more progressive prizes administered by WAP server 120, local server 110 transmits the wager and game information and/or selection to WAP server 120. WAP server 120 may increment the progressive prizes based on the wager received from the player and may communicate the updated prize amounts via network 108 to all other players (via associated gaming devices 114) playing to win the progressive prizes.

The player plays the game on gaming device 114. The following gameplay is described as being administered by WAP server 120. However, it should be recognized that the gameplay (i.e., the play of the game of chance) may be alternatively or additionally administered by local server 110 and/or gaming device 114. For example, if gaming device 114 is a cellular phone or a tablet computing device, the gameplay may be administered through an application installed on gaming device 114.

In one embodiment, the player may play a game of bingo by selecting a game or game type, one or more player cards, selecting one or more winning patterns for the player cards, and/or selecting one or more numbers or other player indicia for the player cards using gaming device 114. The selected player cards, winning patterns, and player indicia are transmitted to WAP server 120. The player cards are included within one or more game tickets issued by WAP server 120, and the game tickets are communicated to gaming device 114 via network 108 and local server 110. WAP server 120 selects or receives randomly generated house indicia and compares the house indicia to the player indicia and the pattern or patterns selected for the player cards. Alternatively, the functions described herein (e.g., comparing the house indicia to the player indicia and the pattern or patterns selected for the player card) may be performed in gaming device 114. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated. In an alternative embodiment, WAP server 120 (or another device) may designate a server, computer, or another device to provide randomly selected house indicia during the game, and may receive the house indicia from the designated device.

WAP server 120 determines whether the player wins a prize based on the comparison of the house indicia to the player indicia. For example, WAP server 120 determines whether the player indicia within the pattern or patterns selected for each card match the house indicia that were randomly determined (sometimes also referred to as the house indicia that were "called"). If the player indicia within a pattern match the called house indicia, the player may win a prize based on a pay table associated with the game. The prize may be one of the progressive prizes or the prize may be a fixed prize identified in the pay table. WAP server 120 determines the appropriate payout to be paid to the player based on the pay table and transmits data representative of the payout to local server 110.

Local server 110 receives the payout data and credits the player account accordingly. In addition, local server 110 may transmit the gameplay data and/or payout data to player reward server 112 to enable player reward server 112 to update the player history and other gameplay data for the player. When the player is done playing, the player may "cash out" some or all of the credits in the player account or may deposit the credits into the player account using POS terminal or kiosk 126, for example. The player account may be stored on gaming device 114, local server 110, or player reward server 112, for example.

In one embodiment, the player may enter the wager and/or may initiate play of the game on a first gaming device 114 and may complete the gameplay on a second gaming device 114. Alternatively, the player plays the game on first gaming device 114 and receives the results of the gameplay (e.g., whether the player won and how much the winnings are) on second gaming device 114. For example, the player may begin playing the game on a kiosk or electronic gaming machine, and may complete the game or view the results of the game on a cell phone. In such an embodiment, WAP server 120 and/or local server 110 may transmit the player's gameplay data from the 1st gaming device 114 to the second gaming device 114.

While the foregoing embodiment is described with reference to games of chance played on gaming devices 114, it should be recognized that system 100 may be used with other games of chance, such as sports or race betting, that may not use gaming devices 114. In such an embodiment, a player may enter a wager on a sports game or a race at a betting terminal such as POS terminal 126 or another suitable device or system. The player may also be required to enter an identification, such as a taxpayer identification number or card (e.g., a social security number or card) or the like. POS terminal 126, local server 110, WAP server 120, and/or any other suitable computing device may store or record the amount wagered, an amount won or lost, and/or the player's identification in memory. POS terminal 126 may additionally or alternatively transmit data representative of the amount wagered, won, and/or lost to local server 110, WAP server 120, and/or any other suitable computing device for tracking purposes and/or for generating reports of the player's wagering and win/loss activity.

Figure 2:
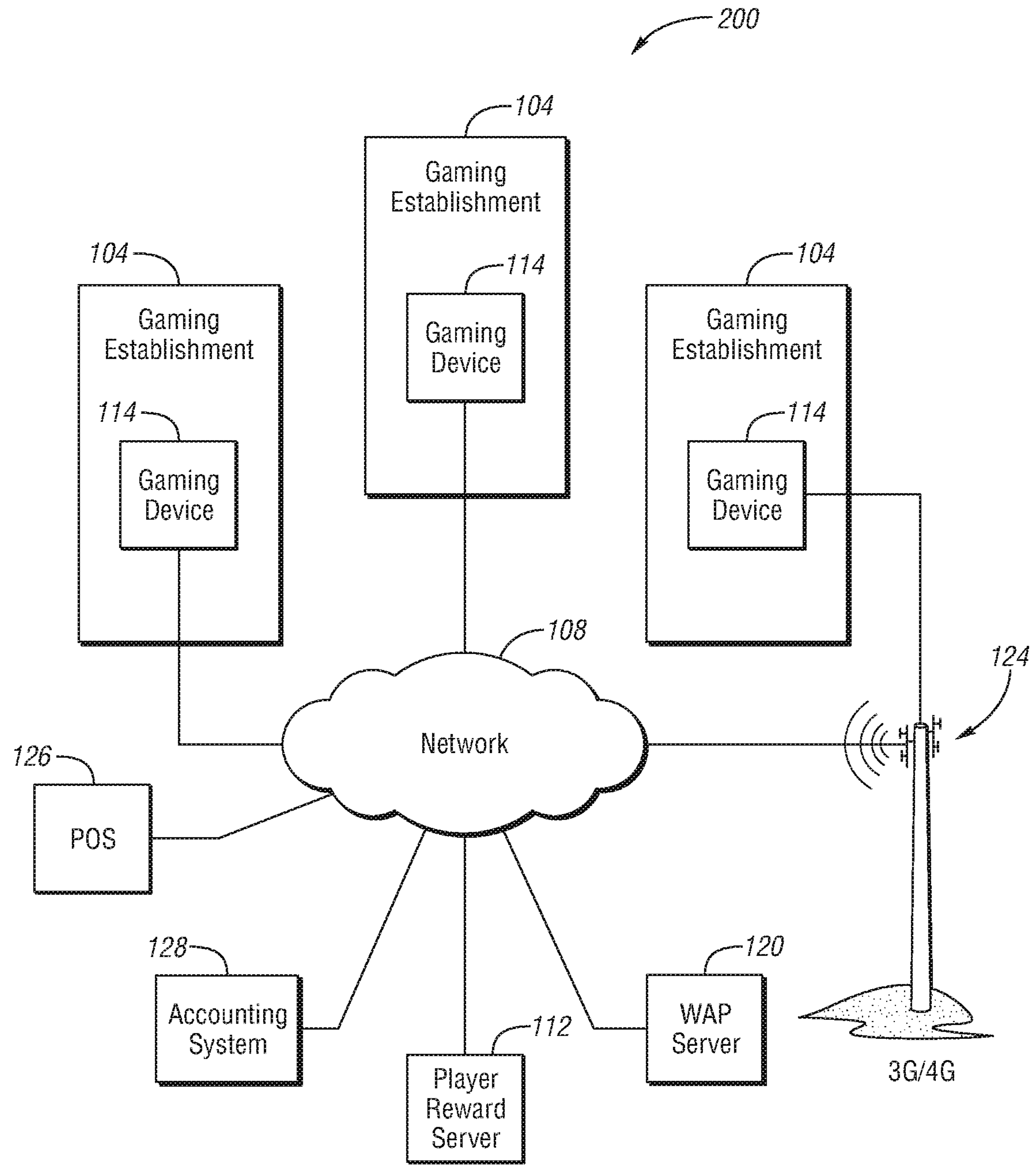
FIG. 2 is a block diagram of another system that may be used to play a game of chance.

FIG. 2 is a block diagram of another system 200 that may be used to play one or more games of chance. Unless otherwise specified, system 200 is similar to system 100 (shown in FIG. 1) and similar components are labeled in FIG. 2 with the same reference numerals used in FIG. 1. It should be understood that more or less components may be included within the various embodiments described herein.

In the embodiment shown in FIG. 2, system 200 includes a plurality of gaming devices 114 that are positioned in a plurality of gaming establishments 102. Gaming devices 114 may connect to network 108 without using a local server 110 (shown in FIG. 1), and may connect to WAP server 120 and/or to player reward server 112 through network 108. For example, gaming devices 114 may be playing one or more Internet-based games that connect to WAP server 120 through a web server. In some embodiments, one or more gaming devices 114 may connect to WAP server 120 and/or to player reward server 112 through a wireless data network as described above. Accordingly, gaming devices 114 interact with WAP server 120 to play the game, and WAP server 120 performs the game administration and other tasks handled by local server 110 as described above in FIG. 1. In a similar manner, POS terminal 126 and accounting system 128 may connect to gaming devices 114 and/or WAP server 120 via network 108. In other respects, system 200 performs in a similar manner as described above.

During operation, the player utilizes or selects a gaming device 114 and initiates a gaming session to play one or more games on gaming device 114. The player inserts a player reward card or enters a player reward number or other identification information into gaming device 114. Gaming device 114 transmits the identification information to player reward server 112 to establish the player's identity and to associate the gameplay with the player account. Player reward server 112 authenticates the player and gaming device 114 and authorizes the player to play the game on gaming device 114. In one embodiment, gaming device 114 also transmits the identification information to WAP server 120 to enable WAP server 120 to associate the player with the game to be played. As previously described, player identification or authentication may be optional.

In another embodiment, WAP server 120 authenticates the player using the player identification information in addition to, or instead of, the authentication performed by player reward server 112. In some embodiments, player reward server 112 is omitted and the functions of player reward server 112 are incorporated within WAP server 120.

The player selects a game to play and enters a wager using gaming device 114. If the player selects a game that is operated by WAP server 120 or that includes one or more progressive prizes administered by WAP server 120, gaming device 114 transmits the wager and game selection to WAP server 120. WAP server 120 may increment the progressive prizes based on the wager received from the player and may communicate the updated prize amounts via network 108 to all other players (via associated gaming devices 114) playing to win the progressive prizes.

The player plays the game on gaming device 114. The following gameplay is described as being administered by WAP server 120. However, it should be recognized that the gameplay may be alternatively or additionally administered by gaming device 114. For example, if gaming device 114 is a cellular phone or a tablet computing device, the gameplay may be administered through an application installed on gaming device 114.

In one embodiment, the player may play a game of bingo by selecting one or more player cards, selecting one or more winning patterns for the player cards, and/or selecting one or more numbers or other player indicia for the player cards using gaming device 114. In another embodiment, the player may play a game of keno by selecting one or more player cards and selecting one or more numbers or other player indicia for the player cards using gaming device 114. The selected player cards, winning patterns (for example, in the bingo embodiment), and player indicia are transmitted to WAP server 120. The player cards are included within one or more game tickets issued by WAP server 120, and the game tickets are communicated to gaming device 114 via network 108 and local server 110. WAP server 120 selects or receives randomly generated house indicia and compares the house indicia to the player indicia and the pattern or patterns selected for the player cards. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated.

WAP server 120 determines whether the player wins a prize based on the comparison of the house indicia to the player indicia. For example, in an embodiment in which the player plays a game of bingo, WAP server 120 determines whether the player indicia within the pattern or patterns selected for each card match the house indicia that were randomly determined. If the player indicia within a pattern match the called house indicia, the player wins a prize based on a pay table associated with the game. In an embodiment in which the player plays a game of keno, WAP server 120 determines whether the player indicia selected for each card match the house indicia that were randomly determined. If a predetermined number of the player indicia match the called house indicia, the player wins a prize based on a pay table associated with the game. The prize may be one of the progressive prizes or the prize may be a fixed prize identified in the pay table. WAP server 120 determines the appropriate payout to be paid to the player based on the pay table and transmits data representative of the payout to gaming device 114 for display to the player.

WAP server 120 also credits the player account to reflect the prize that was won by the player. In addition, WAP server 120 may transmit the gameplay or payout data to player reward server 112 and to accounting system 128 to enable player reward server 112 and accounting system 128 to update the player history and other gameplay data for the player. When the player is done playing, the player may "cash out" some or all of the credits in the player account and/or gaming device 114 or may deposit the credits in the player's account using POS terminal 126, for example.

In one embodiment, the player may enter the wager and/or may initiate play of the game on a first gaming device 114 and may complete the gameplay on a second gaming device 114. Alternatively, the player plays the game on first gaming device 114 and receives the results of the gameplay (e.g., whether the player won and how much the winnings are) on second gaming device 114. For example, the player may begin playing the game on a kiosk or electronic gaming machine, and may complete the game or view the results of the game on a cell phone. The game completion may be for a game currently being played, and/or may be for one or more future games (i.e., one or more games that have not yet started). For example, the player may enter sufficient credits or other consideration into gaming device 114 to purchase gameplay for a plurality of future games that use the same player card or that use other preselected or random player cards. The player may then complete one or more of the future games on another gaming device 114 (or any other suitable device) and/or may receive the result of one or more of the future games on another gaming device 114 (or any other suitable device).

In one embodiment, the player may purchase any number of future games (i.e., games to be played in the future) by entering a wager, a number of cards to play for each game, and a number of games to play. After inserting sufficient cash or credits to pay for the games, WAP server 120 or another device or machine that is administering the game (such as gaming device 114) may automatically display the called house indicia for each game and a result of each game to the player. The player may watch the results of the game in real time, or may view the results at a later time, for example, by viewing a summary of the game results. The player may view the results (in real time or later) on the same gaming device 114 used to initiate the games and enter the wagers, on another gaming device 114, or on any other suitable device.

In another embodiment, such as an embodiment in which the game is administered through an application installed on a cell phone, a tablet computing device, or another gaming device 114, WAP server 120 only administers the progressive prizes, or some or all prizes associated with the game being played. In such an embodiment, gaming device 114 randomly selects the house indicia using a randomization device included within, or connected to, gaming device 114. In addition, gaming device 114 may determine whether the player indicia within the player selected pattern match the house indicia, thus determining whether the player wins a prize. Gaming device 114 may transmit the results of the game to WAP server 120. The results of the game may include, for example, an indication whether the player won, the house indicia randomly selected, the player indicia selected, the player pattern selected, the number of ball calls that were required to match the house indicia to the player indicia, and/or any other aspect of the game.

In one embodiment, WAP server 120 confirms the result of the game before awarding the prize to the player. For example, WAP server 120 may determine whether the house indicia match the player indicia within the player selected pattern independently of the game result reported by gaming device 114. WAP server 120, local server 110, and/or another suitable server or device may also track the prizes won by the player (the "prize history") and may store the prize history in a database or memory device for later use.

Figure 3:
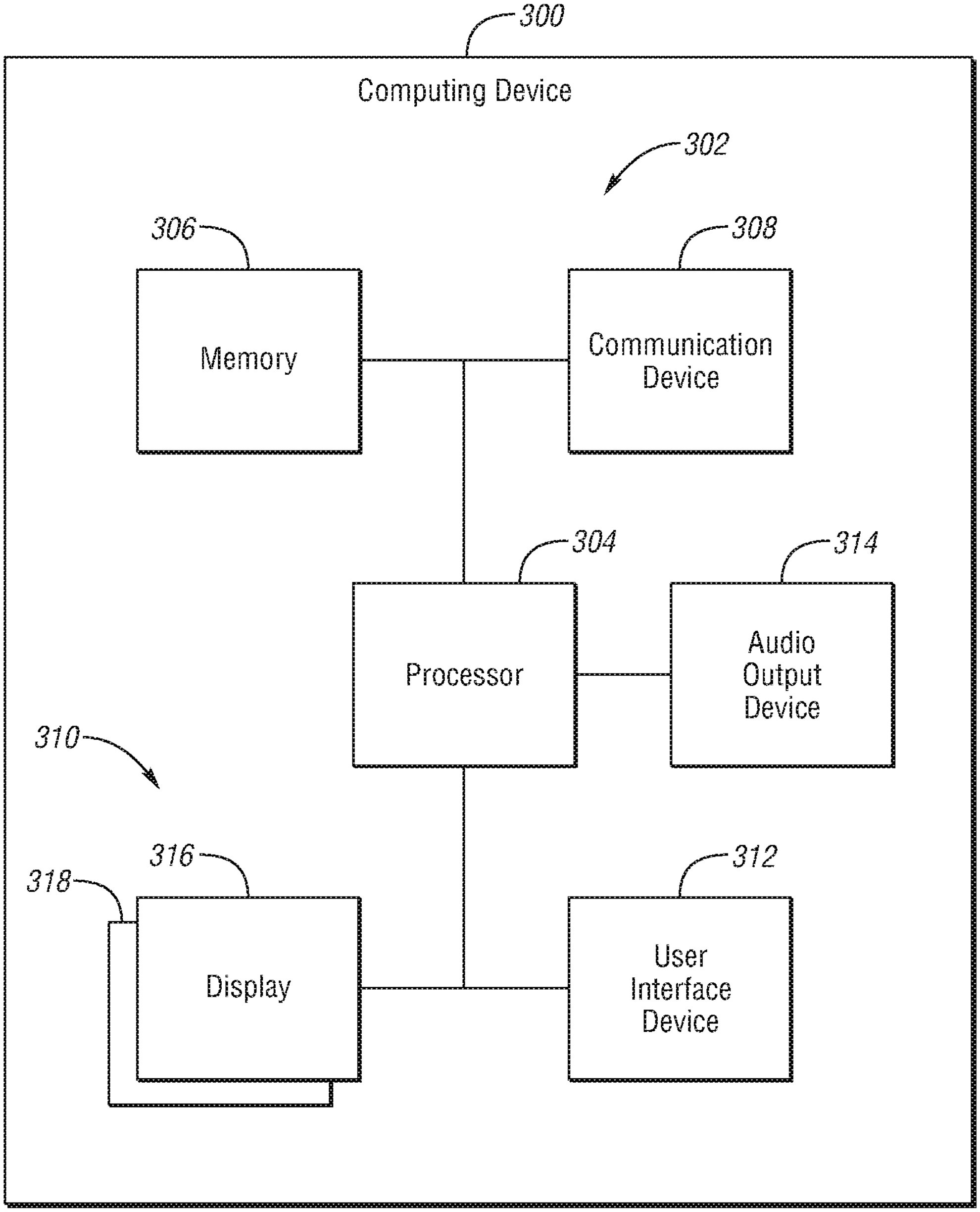
FIG. 3 is a block diagram of a computing device that may be used with the system shown in FIG. 1 or the system shown in FIG. 2.

FIG. 3 is a block diagram of a computing device 300 that may be used with system 100 (FIG. 1) or system 200 (shown in FIG. 2). More specifically, one or more gaming devices, servers, or other devices described herein may be implemented as a specialized or specific computing device 300. For example, local server 110, WAP server 120, player reward server 112, accounting system 128, gaming devices 114, and/or mobile gaming devices 122 may be specialized or specific computing devices 300.

Computing device 300 includes a plurality of computing device components 302, such as a processor 304, a computer-readable memory device 306, and a communication device 308. In one embodiment, computing device 300 may also include a display 310, a user interface device 312, and/or an audio output device 314. It should be recognized that memory device 306, communication device 308, display 310, and user interface device 312 (if provided) may be connected to processor 304 and/or to each other via any suitable bus or busses, interfaces, or other mechanisms.

Processor 304 includes any suitable programmable circuit including one or more controllers, microcontrollers, microprocessors, application specific integrated circuits (ASICs), systems on a chip (SoCs), programmable logic circuits (PLCs), field programmable gate arrays (FPGAs), and/or any other circuit capable of executing the functions described herein. The above examples are exemplary only, and thus are not intended to limit in any way the definition and/or meaning of the term "processor."

Memory device 306 is an electronic storage device that includes transitory or non-transitory computer readable media, such as, without limitation, random access memory (RAM), flash memory, a hard disk drive, a solid state drive, a compact disc, a digital video disc, and/or any suitable memory. Memory device 306 may include data as well as instructions that are executable by processor 304 to program processor 304 to perform the functions described herein. For example, the methods described herein may be performed by one or more processors 304 executing instructions stored within one or more memory devices 306.

Communication device 308 may include, without limitation, a network interface controller (NIC) or adapter, a radio frequency (RF) transceiver, a public switched telephone network (PSTN) interface controller, or any other communication device that enables computing device 300 to operate as described herein. In one embodiment, communication device 308 may connect to communication devices 308 of other computing devices 300 of system 100 or system 200 through network 108 or another network using any suitable wireless or wired communication protocol.

Display 310 may include, without limitation, a liquid crystal display (LCD), a vacuum fluorescent display (VFD), a cathode ray tube (CRT), a plasma display, a light-emitting diode (LED) display, a projection display, and/or any suitable visual output device capable of displaying graphical data and text to a user. For example, display 310 may be used to display a graphical user interface to a player or an administrator, one or more images associated with a game such as bingo, keno, or another game of chance, player statistics, gameplay data, and/or any other suitable data.

User interface device 312 may include, without limitation, a keyboard, a keypad, a touch screen, a mouse, a scroll wheel, a pointing device, an audio input device employing speech-recognition software, a video input device that registers movement of a user, and/or any other suitable device that enables the user to input data into computing device 300 and/or retrieve data from computing device 300.

Audio output device 314 may include, without limitation, one or more speakers, or any other device that enables data to be audibly output from computing device 300. For example, gameplay data and/or music may be audibly output from audio output device 314. In addition, if the player wins a prize, audio output device 314 may be used to alert the player and/or others about the win.

While the foregoing computing device components 302 have been described as being included within a computing device 300, it should be recognized that at least some computing devices 300 may not include each component 302. For example, a computing device 300 may not include audio output device 314. In addition, a computing device 300 may include any suitable number of each individual computing device component 302. For example, a computing device 300 may include a plurality of processors 304 or processor cores and/or a plurality of memory devices 306 (of the same or different types, sizes, etc.). In addition, computing device 300 may include a plurality of displays 310, such as a first display 316 and a second display 318. In one embodiment, first display 316 may provide a graphical user interface to a player, and second display 318 may display one or more aspects of gameplay to the player as described more fully herein. Alternatively, first display 316 and second display 318 may display any suitable aspect of the game as desired.

Figure 4:
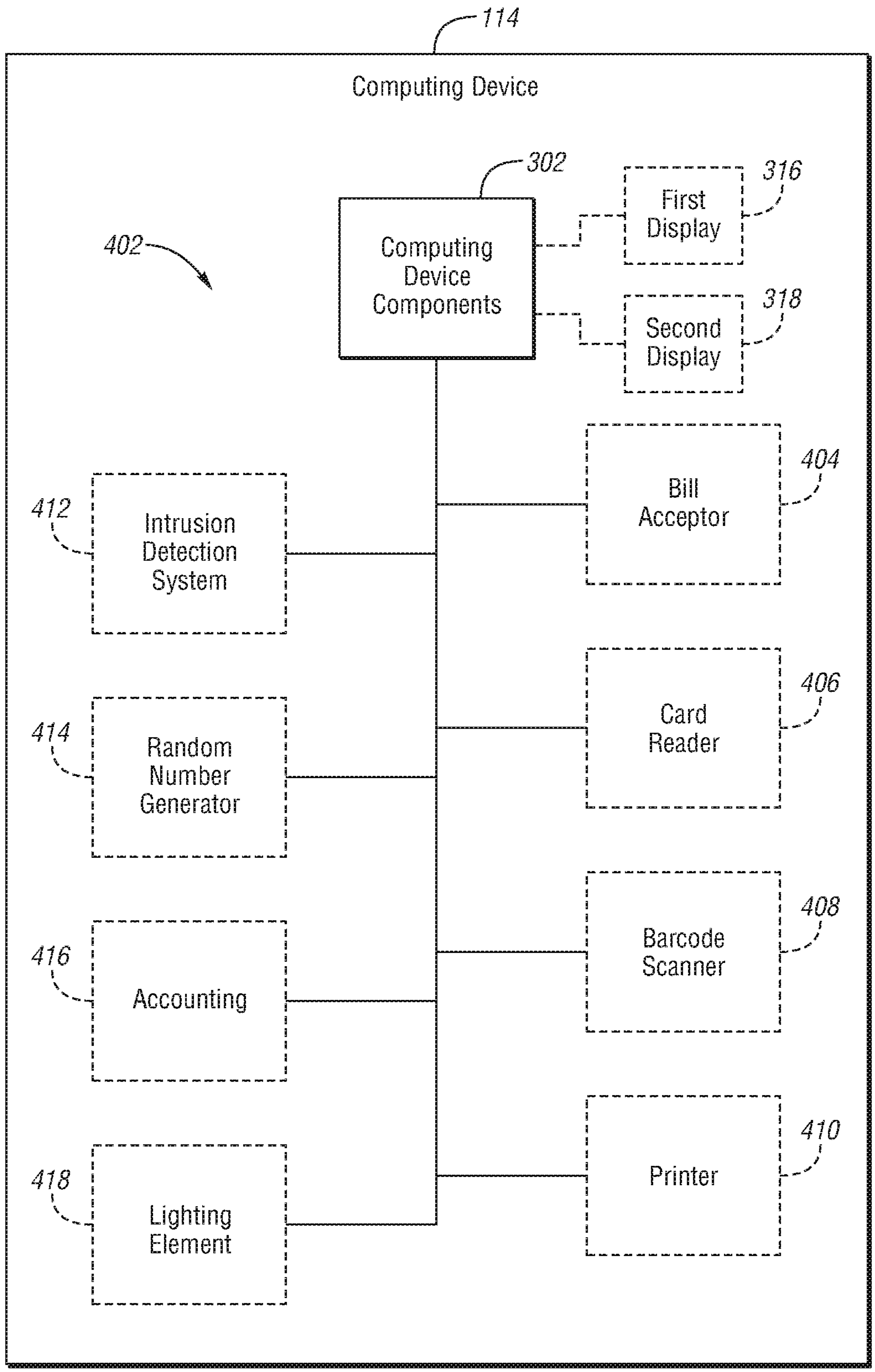
FIG. 4 is a block diagram of a gaming device that may be used with the system shown in FIG. 1 or the system shown in FIG. 2.

FIG. 4 is a block diagram of a gaming device 114 that may be used with system 100 (shown in FIG. 1) or system 200 (shown in FIG. 2). As described above, gaming device 114 may be a specialized or specific computing device 300 (such as an EGM or a kiosk) that includes a plurality of computing device components 302 positioned within a cabinet or other housing. In one embodiment, computing device components 302 include first display 316 and second display 318. In addition, gaming device 114 may include a plurality of gaming device components 402 including a bill acceptor 404, a card reader 406, a barcode scanner 408, a printer 410, an intrusion detection system 412, a randomization device 414, and/or an accounting interface 416 that are positioned within, or coupled to, the cabinet or housing. In one embodiment, gaming device 114 may also include at least one lighting element 418 coupled to the cabinet or housing.

It should be recognized that in some embodiments, a gaming device 114 may not include each gaming device component 402 illustrated in FIG. 4. For example, if gaming device 114 is a cellular phone, gaming device 114 may not include bill acceptor 404, card reader 406, barcode scanner 408, and/or printer 410. Rather, in some embodiments, the functions of each omitted gaming device component 402 may be replaced by equivalent software, hardware, and/or firmware if desired. Optional components may be designated using dashed lines in the figures.

Bill acceptor 404 is a payment or monetary input device that enables gaming device 114 to receive and identify paper currency. For example, bill acceptor 404 may receive and identify physical items associated with a monetary value, such as dollar bills or other currency, that are inserted into bill acceptor 404. In one embodiment, bill acceptor 404 includes a scanner that scans paper currency inserted therein. Bill acceptor 404 may also include optical character recognition (OCR) capabilities that enable bill acceptor 404 to identify the amount of currency inserted into bill acceptor 404 from a scanned image of the currency. Bill acceptor 404 may transmit data representative of the amount of currency inserted into gaming device 114 to processor 304, for example. Processor 304 may cause the amount of currency to be converted into credits usable with the game, and may add the credits to the player's credit balance or account.

Card reader 406 is a device that "reads," or obtains data encoded in, player reward cards or other cards or media that are inserted into reader 406. In one embodiment, card reader 406 is a magnetic card reader that reads barcodes or magnetic strips included within a player reward card. In another embodiment, card reader 406 wirelessly reads data encoded within the player reward card by accessing a chip, such as a radio frequency identification (RFID) chip, embedded within the card. Card reader 406 decodes the data obtained from the cards and transmits the decoded data to processor 304. In one embodiment, card reader 406 is used to read player identification information encoded within player reward cards. Processor 304 may transmit the player identification information to player reward server 112 to identify the player, to allow for the transfer of funds or credits, to facilitate authenticating the player, and/or to authorize the player to play a game on gaming device 114. In one embodiment, the player may "log in" to gaming device 114 by swiping the player reward card or otherwise passing the player reward card through, or inserting the player reward card within, card reader 406. In another embodiment, the player may enter a number or other identifier associated with the player reward card into gaming device 114, through user interface device 312 for example, instead of using card reader 406. In another embodiment, the insertion of the player reward card and player entering the identifier into user interface device 312 may be combined. In yet another embodiment, the player may use a near field communication (NFC) device, such as an NFC device incorporated within communication device 308, to read the player reward card or data representative of the player card.

In one embodiment, barcode scanner 408 is an optical or a magnetic scanner that is optimized to read barcodes on media positioned proximate to scanner 408. For example, barcode scanner 408 may be optimized to read barcodes printed on paper receipts (sometimes referred to as "tickets" or vouchers, not to be confused with game or player tickets that may include player selected patterns, player indicia, and the like) and/or barcodes displayed electronically on a cell phone or tablet computing device. It should be recognized that the barcodes read by barcode scanner 408 may be linear or one-dimensional barcodes, two-dimensional barcodes, or may even include data represented in a form other than a barcode. For example, barcode scanner 408 may read images and/or text indicative of data, such as currency or credits, usable with gaming device 114. Barcode scanner 408 extracts the data from the barcode and transmits the data to processor 304. For example, barcode scanner 408 may scan a paper receipt or voucher that includes an amount of currency or credits usable by the player with a gaming device 114 and may transmit the amount of credits to processor 304. In such an example, barcode scanner 408 may act as a payment or monetary input device to receive or read one or more physical items associated with a monetary value. Processor 304 may cause the amount of currency or credits to be added to a currency or credit balance for the player on gaming device 114 or on another suitable device or system. Processor 304 may also cause the amount of currency or credits to be displayed to the player on first display 316 (or on display 310 in embodiments including a single display 310) to inform the player how many credits or currency is available to be used in playing a game.

Printer 410 may be used to print paper receipts (also known as tickets as described above) that indicate an amount of currency or credits available to the player. In many locations, the tickets or receipts may alternatively be referred to as vouchers. Printer 410 may act as a payment output device that enables a player to cash out or withdraw money or credits from gaming device 114 by printing a voucher representative of the money or credits when the player initiates a cash out operation using, for example, user interface 312 of gaming device 114. In one embodiment, printer 410 is a thermal printer that is fed by a roll of paper or any suitable paper stock. In a further embodiment, the roll of paper includes one or more watermarks that are visible when printer 410 has printed the receipt on the paper. Alternatively, printer 410 may print the watermark on the receipt, or may include another security mechanism to facilitate preventing counterfeit receipts from being made. For example, printer 410 may include an image or a code on the receipt that identifies gaming device 114, printer 410, or another component of gaming device 114 along with a time that the receipt was printed. Other suitable security mechanisms may be used as well. It should be recognized that barcode scanner 408 and printer 410 may cooperate such that a security mechanism printed on the receipt may be received and validated by barcode scanner 408, in conjunction with processor 304, for example. Barcode scanner 408 may be located remotely from gaming device 114, such as within a redemption kiosk, a casino cage, or the like. In some embodiments, printer 410 may also print reports indicating the player's win amounts, loss amounts, wager amounts, and/or net win amounts.

Intrusion detection system 412 notifies processor 304 if a case, cabinet, or other housing enclosing components of gaming device 114 is opened or modified without authorization. In one embodiment, intrusion detection system 412 includes a pair of contacts that transmit an electronic signal to processor 304 if the housing of gaming device 114 is opened (e.g., if the opening of the housing separates the contacts). In another embodiment, intrusion detection system 412 may include a light sensor that detects a change in the light within the housing of gaming device 114. Intrusion detection system 412 may also include a key or another mechanism for disabling the transmission of the signal to processor 304 in the event that maintenance or other authorized access to gaming device 114 components is desired.

In one embodiment, intrusion detection system 412 includes a software program (a "monitoring program") that monitors one or more applications installed on gaming device 114. For example, if gaming device 114 is a cell phone that includes an application for playing the game thereon, the monitoring program may monitor the application to determine whether the application is modified without authorization. In one embodiment, the monitoring program stores a hash value or a digital fingerprint of the application when the application is installed and/or when the application undergoes authorized modification (e.g., if the application is updated or patched). However, if the monitoring program determines that the application has been modified without authorization, the monitoring program may cause a signal or another notification to be transmitted to processor 304. For example, the monitoring program may periodically calculate a new hash value of the application and/or create a new digital fingerprint of the application. The monitoring program then compares the new hash value and/or digital fingerprint to the stored hash value and/or digital fingerprint. If the hash values or fingerprints are different, the monitoring program may determine that the application has been modified without authorization. It should be understood that the hash value, the monitoring program, and/or the digital fingerprint may be generated by any suitable means and may be encrypted for additional security.

In response to the signal or notification from intrusion detection system 412 and/or the modification program, processor 304 may perform one or more actions. For example, processor 304 may alert an administrator within gaming establishment 102 by transmitting a message via communication device 308, may cause audio output device 314 to emit an alarm or another audible alert, may cause first display 316 to display an error or a warning, and/or may disable the application and/or gaming device 114 such that the game is unable to be played on gaming device 114.

In one embodiment, randomization device 414 is an electronic random number generator (RNG) 414 or a permutation generator that may be implemented by a dedicated hardware device with associated embedded software. Alternatively, RNG 414 or the permutation generator may be implemented entirely in software executing on gaming device 114. RNG 414 may be used to randomly determine a game outcome for the game of chance. In one embodiment, RNG 414 or the permutation generator provides house or game draws of between 1 and n numbers, where n may be a suitable number based on the game type selected to be played by the player. RNG 414 or the permutation generator may be programmed via hardware, software, or firmware to provide a particular range of numbers (or other indicia) and numbers of draws for a particular application. For example, in one embodiment of bingo according to the present disclosure, RNG 414 or the permutation generator initially provides 24 randomly generated numbers having values between 1 and 75 for each game. Additional draws or numbers may be provided to play the game to conclusion depending on the particular implementation as described in greater detail herein. In addition, RNG 414 or the permutation generator may be used to randomly select a plurality of player indicia to be used with one or more player cards. In embodiments in which a processor, such as processor 304, is described as randomly selecting indicia, it should be recognized that processor 304 may interface with randomization device 414 or the permutation generator to select the indicia. In other embodiments, processor 304 may include randomization device 414 or the permutation generator, or may execute instructions to perform the functions of randomization device 414 or the permutation generator.

Accounting interface 416 is used to interface with an accounting system, such as accounting system 128, at or connected to a gaming establishment 102. Accounting interface 416 may include or be connected to a network interface, such as communication device 308 for use in communicating gameplay data, player identification information, and/or other data to the accounting system for accounting and/or auditing purposes.

Lighting element 418 may include, for example, one or more LEDs, slot machine candles, fluorescent tubes, and/or any other element that emits light as controlled or directed by processor 304. In one embodiment, lighting element 418 is activated to display light, or one or more lighting patterns, when processor 304 determines that a winning or bonus criterion is satisfied. Lighting elements 418 may also be activated upon receipt of a signal from intrusion detection system 412 (e.g., upon the determination that gaming device 114 has been opened and/or modified without authorization) and/or upon any other suitable determination.

In one embodiment in which gaming device 114 is a kiosk, the kiosk may interface with another gaming device 114 operated by or otherwise associated with the player, such as a cell phone or another mobile device. For example, the kiosk may be configured to transmit a result of one or more games of chance to the player's mobile device to notify the player whether one or more player cards or game tickets are winning cards or tickets.

The kiosk may also notify the player that a software application is available to be installed on the player's mobile device. If the player installs the application on the mobile device, for example, the results of the games of chance and/or the determinations of whether the player's card and/or tickets are winners may be automatically transmitted to the application to be displayed to the player. Alternatively, the kiosk or another device (such as local server 110 or WAP server 120) may automatically transmit the results of the games and/or the determinations of the winning cards and/or tickets to the player's mobile device or other device via email, SMS message, MMS message, and/or by any other suitable means. In one embodiment, the kiosk (i.e., processor 304 of the kiosk) or another device (such as local server 110 or WAP server 120) may wait to transmit the results of the games until all of the games for the player's purchased cards or tickets have been completed. Accordingly, if the player purchases player cards or game tickets for a current game and/or one or more future games, the results of the current game and the future games may not be transmitted until all of the future games associated with the player's cards or tickets have been completed.

The player may also view the player cards and/or the game tickets that the player has selected on the player's mobile device or other device, for example, using the application. After the player receives the results of the games and/or the determinations of whether the player's cards and/or tickets are winners, the player may use the mobile device (i.e., the application installed on the mobile device) to receive any winnings from the games and/or to cancel any unplayed games, player cards, and/or game tickets. The winnings may be credited to the player's account, for example, using the mobile device.

In one embodiment, one or more advertisements and/or promotions may be presented to the player via the mobile device or other device (e.g., through the application). For example, after the player has been notified of any winning tickets or player cards, a promotion may be presented to the player on the mobile device that offers a bonus or discount for one or more products or services if the player uses (or redeems) at least a portion of the winnings to purchase the product or service. Alternatively, the promotion may be transmitted along with, or before, the player has been notified of any winning tickets or player cards. The bonus or discount may be restricted to being usable within a predetermined amount of time after the promotion was transmitted to the mobile device, or the bonus or discount may be increased if the player purchases the product or service within the predetermined amount of time. For example, a promotion may be offered to the player in which the player receives a bonus (free) dinner if the player cashes in or redeems a winning ticket at a casino within 24 hours of the promotion being sent to the player's device. As another example, the player may receive bonus credits if the player purchases one or more game tickets for a new game of chance using at least a portion of the winnings.

Figure 5:
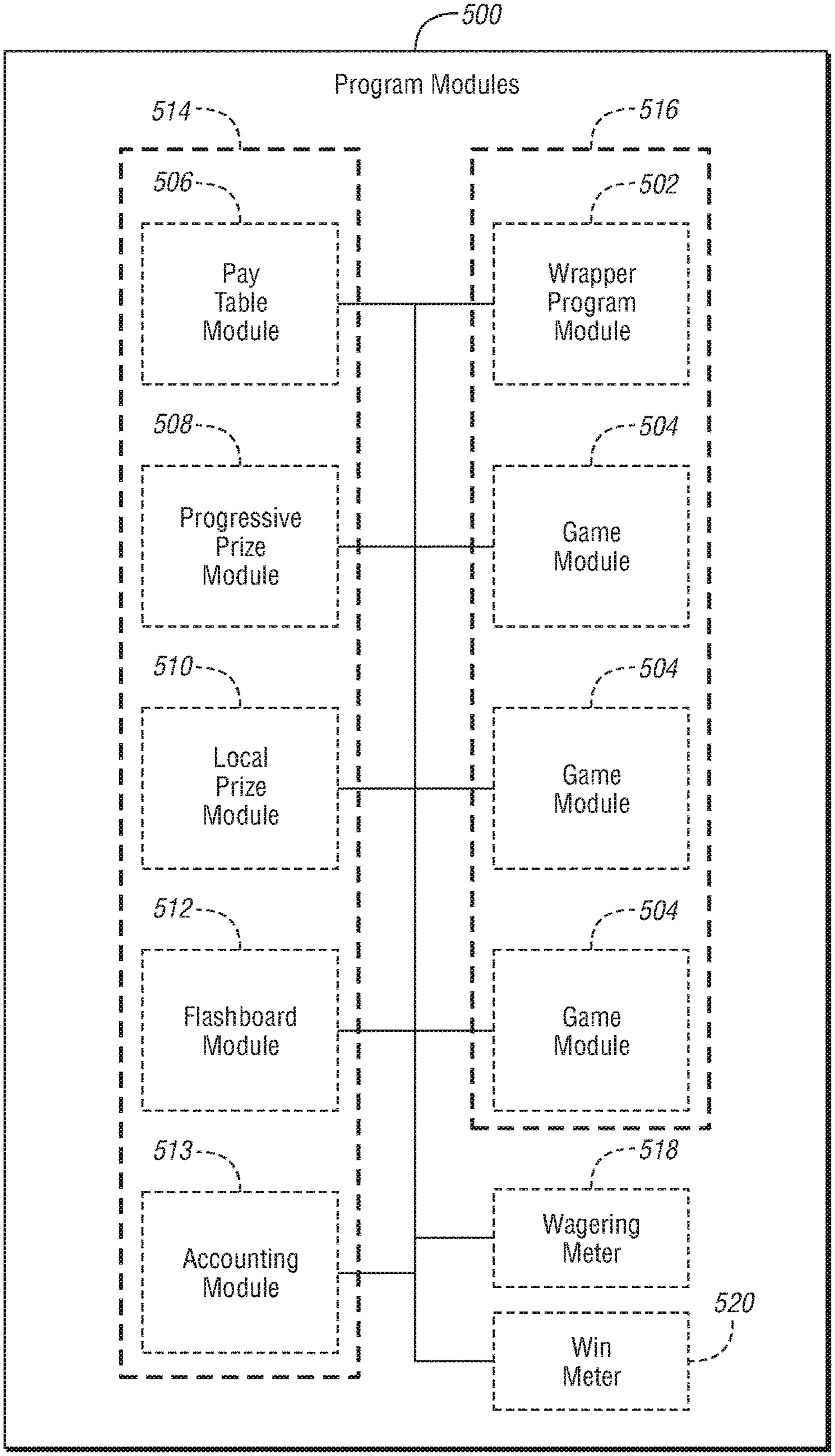
FIG. 5 is a block diagram of a plurality of program modules that may be used with the system shown in FIG. 1 or the system shown in FIG. 2 to administer a game of chance.

FIG. 5 is a block diagram of a plurality of program modules 500 that may be used with system 100 (shown in FIG. 1) or system 200 (shown in FIG. 2) to administer one or more games of chance, such as video reel slots, video poker, sports betting or sport book games, bingo or bingo-related games, keno or keno-related games, and/or any other games of chance. In one embodiment, program modules 500 are installed and/or stored within local server 110, WAP server 120, and/or gaming devices 114. For example, program modules 500 may be stored in memory device 306 of local server 110, WAP server 120, and/or gaming devices 114.

Program modules 500 are firmware and/or software programs or applications that, when executed by processor 304 of local server 110, WAP server 120, and/or gaming device 114, cause processor 304 to perform the functions described herein. In one embodiment, program modules 500 include a wrapper program module 502, a plurality of game modules 504, a pay table module 506, a progressive prize module 508, a local prize module 510, a flashboard module 512, and/or an accounting module 513. A first plurality 514 of program modules 500 may be installed within each local server 110 and/or WAP server 120 and a second plurality 516 of program modules 500 may be installed within each gaming device 114. It should be recognized that in embodiments in which the game of chance is administered by gaming device 114 (e.g., when a cell phone or a tablet computing device is used as gaming device 114), some or all of the first plurality 514 of program modules 500 may be incorporated within gaming device 114 and executed by processor 304 of gaming device 114. Alternatively, some or all of the second plurality 516 of program modules 500 may be incorporated within local server 110 and/or WAP server 120. Together, wrapper program module 502, game modules 504, and other program modules 500 that present and/or administer one or more games may be referred to herein as a game application, or an application.

In one embodiment, wrapper program module 502 is used at least in part to provide a graphical user interface (GUI) on first display 316 of gaming device 114 (or on display 310 in embodiments that include a single display). Wrapper program module 502 operates to provide an entry point or a game entry interface for a player to access gaming device 114, and to enable the player to select a game of chance to be played on gaming device 114. For example, the games of chance may be categorized into a plurality of game sizes and a plurality of game variations. Wrapper program module 502 may present the game sizes and the game variations to the player, using first display 316, and may enable the player to select a game to play by selecting a game size and game variation through user interface device 312.

In one embodiment of a bingo game, wrapper program module 502 may present a list of player card sizes (i.e., game sizes or matrices), such as 3×3, 4×4, and 5×5, to the player for selection on first display 316. In addition, wrapper program module 502 may present a list of games or game variations to the player for selection on first display 316. Alternatively, the game size and game variation may be combined into one selectable icon, such as an icon representing a first variation of 3×3 bingo or a second variation of 5×5 bingo. If the player selects a size and variation, wrapper program module 502 calls or branches to a game module 504 that provides the selected game size and variation.

In one embodiment, game modules 504 each provide a game associated with the selected game size and/or game variation to the player using gaming device 114, local server 110, and/or WAP server 120. Accordingly, in one embodiment, each game is provided by a separate game module 504. Alternatively, each game module 504 may provide more than one game to the player.

Pay table module 506 provides a pay table associated with each game such that one or more pay tables may be associated with each game module 504. In one embodiment, pay table module 506 provides a pay table associated with a game when game module 504 requests the pay table and/or when a predetermined event occurs during the game. Pay tables associated with a game may be changed as desired by a game operator by any suitable means. The predetermined event may include, for example, the player selecting a "See Pays" or another icon displayed on first display 316 that represents a request to view the pay table for the game. The predetermined event may also include reaching a point in the game in which the house indicia are matched to the player indicia within a selected pattern to determine whether the player wins a prize.

Progressive prize module 508 may be used to administer aspects of one or more progressive prizes, such as one or more progressive prizes offered to players playing across network 108. For example, progressive prize module 508 may receive information regarding an amount wagered by each player playing a game that has a chance to win the progressive prize. Progressive prize module 508 may allocate a first portion of each wager to a first progressive prize to increase the size of the progressive prize. Progressive prize module 508 may allocate a second portion of each wager to a second progressive prize, and may continue in a similar manner for any additional progressive prizes, if desired or applicable. Accordingly, a plurality of progressive prizes may be provided for each game and may be at least partially funded by each wager.

Local prize module 510 may be used to administer aspects of one or more local prizes, such as one or more prizes that may be won by players playing against each other within a gaming establishment 102. In addition, local prize module 510 may administer aspects of one or more fixed prizes, such as prizes that may be won only by individual players playing on respective gaming devices 114. Accordingly, fixed or individual prizes may be awarded to a player based on the gameplay of the player against randomization device 414 of gaming device 114, rather than based on winning against other players.

In one embodiment, flashboard module 512 may be used to display called bingo numbers or other house indicia within one or more gaming establishments. In another embodiment, flashboard module 512 may be used to display called bingo numbers, keno numbers, or other house indicia on gaming devices 114 themselves, for example, on second display 318 (or on display 310 in embodiments that include a single display) during play of the game. Flashboard module 512 may cause the house indicia to be displayed as a rectangular matrix of spaces (sometimes referred to as a "flashboard"). For bingo games played utilizing 75 numbers or indicia, the letters B, I, N, G, and O may be pre-printed above five vertical columns of the matrix with one letter appearing above each column to assist players in more quickly locating a called number on their card(s). For 75 number bingo games, the numbers printed on the card are commonly arranged as follows: 1 to 15 in the B column, 16 to 30 in the I column, 31 to 45 in the N column, 46 to 60 in the G column, and 61 to 75 in the O column. However, other arrangements of the flashboard may be used instead of the arrangement described herein.

Accounting module 513 may be used to interface with an accounting system, such as accounting system 128, at or connected to a gaming establishment 102. In one embodiment, accounting module 513 is incorporated within, or executed by, accounting interface 416. Any suitable data, such as gameplay data, player identification information, an amount of prizes won by a player, an amount of wagers placed by a player, and/or any other suitable data may be collected and transmitted by accounting module 513.

For keno games played utilizing 80 number or indicia, the numbers may be arranged sequentially in a matrix such that numbers 1-10 appear sequentially in a first row, the numbers 11-20 appear sequentially in a second row below the first row, the numbers 21-30 appear sequentially in a third row below the second row, and so on. It should be recognized that embodiments of keno games having a different number of player indicia (or spots) may be used, such as 49 or 25 spots.

It should be recognized that two or more program modules 500 may be combined together such that the functionality of each program module 500 is incorporated into the combined module. Likewise, each program module 500 may be split into two or more sub-modules that each perform a portion of the functionality of the program module 500 being split. Accordingly, while the above-described program modules 500 are described individually, each may be combined or split into other sub-modules as desired.

Figure 6A:
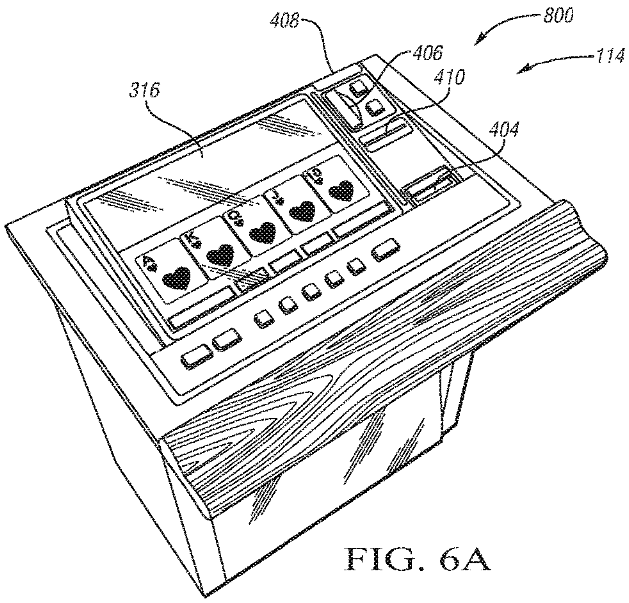
FIGS. 6A and 6B are perspective views of electronic gaming machines that may be used with the system shown in FIG. 1 or the system shown in FIG. 2.
Figure 6B:
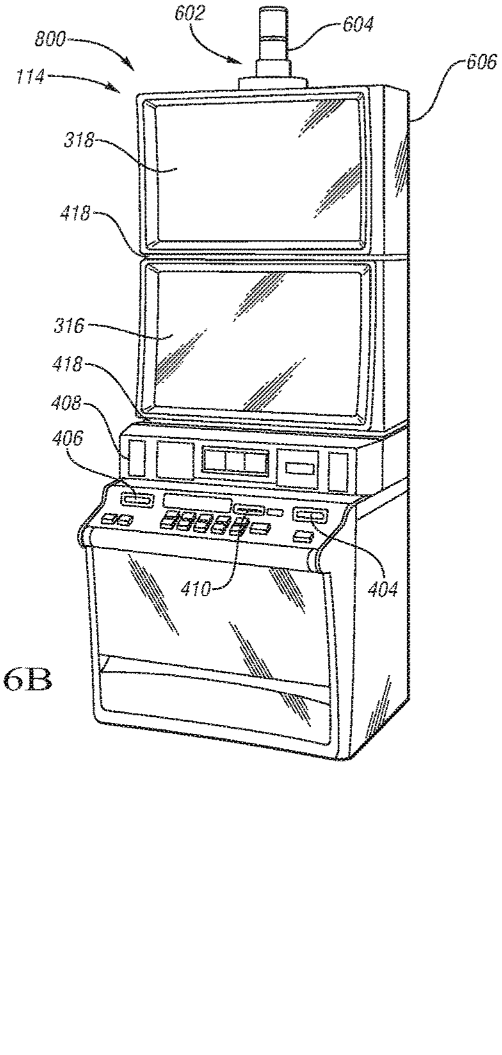

FIG. 6A is an illustration of an exemplary electronic gaming machine (EGM) 600 configured as a stand-alone kiosk (also referred to as "kiosk 600") that may be used with the systems described herein. In one embodiment, EGM 600 is a gaming device 114. FIG. 6B is an illustration of EGM 600 configured as a bar top machine described herein. In bar top machine embodiments, EGMs 600 are placed at a slight horizontal angle to facilitate play as illustrated in FIG. 6B, for example.

As illustrated in FIGS. 6A and 6B, EGM 600 may include, for example, a processor 304, a memory device 306, a communication device 308, an audio output device 314 (none shown in FIG. 6A or 6B), a first display 316, and/or a second display 318 as described above with reference to FIG. 3. In addition, EGM 600 may include a bill acceptor 404, a card reader 406, a barcode scanner 408, a printer 410, a randomization device 414 (not shown in FIG. 6A or 6B), and/or one or more lighting elements 418 as described above with reference to FIG. 4. EGM 600 may also include one or more program modules 500 described in FIG. 5.

In one embodiment, EGM 600 or a server or system connected thereto, such as local server 110, WAP server 120, or accounting system 128, requires the player to input identification into EGM 600, such as through card reader 406, barcode scanner 408, and/or user interface device 312 before playing a game on EGM 600. For example, EGM 600 may display a prompt for the player to insert, scan, or enter the details of the player's social security card or other taxpayer identification card or number into EGM 600.

Figure 7A:
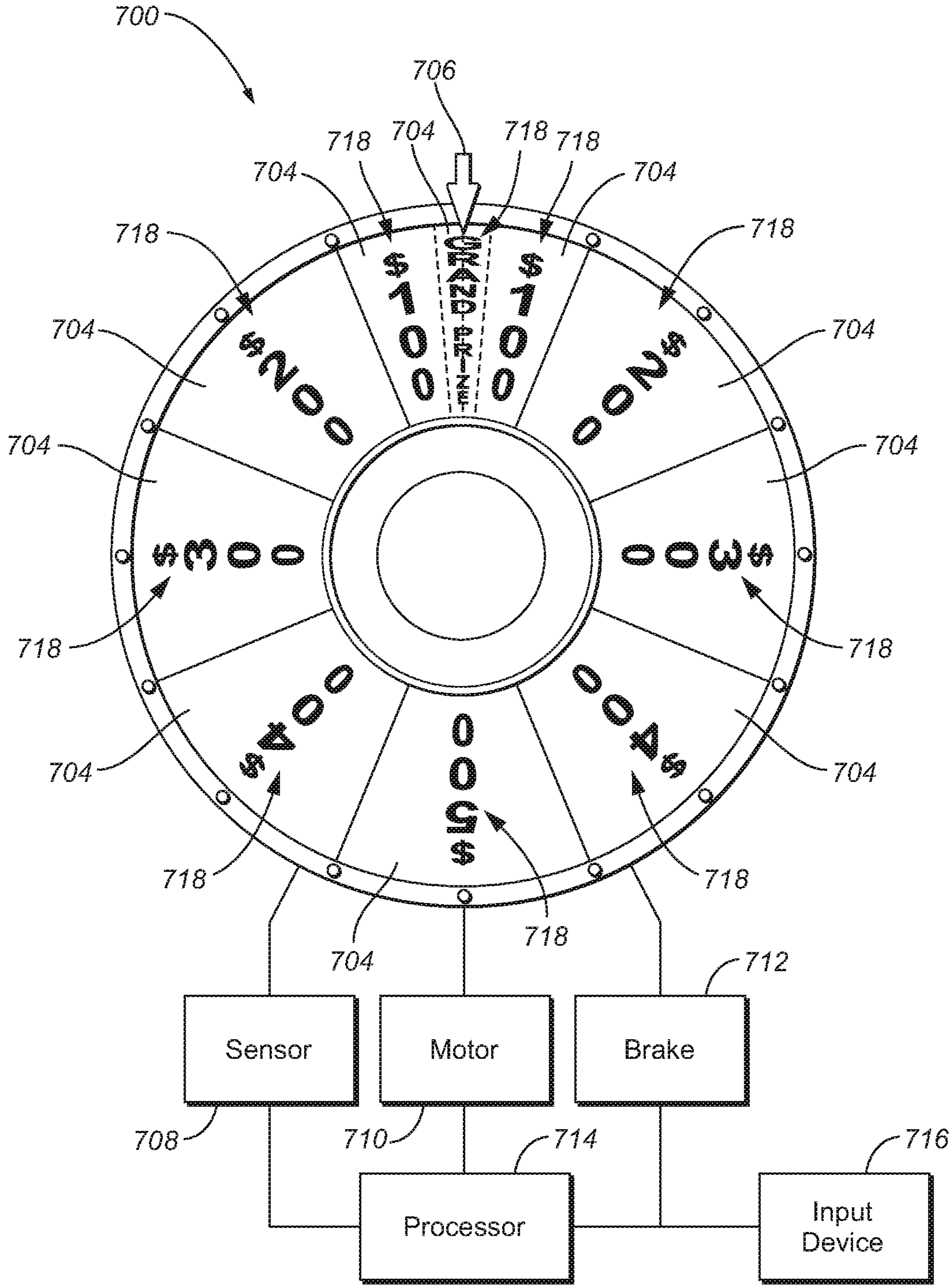
FIG. 7A is a block diagram of an exemplary mechanical wheel-based prize selector that may be used with the systems and methods described herein.

FIG. 7A is a block diagram of an exemplary mechanical wheel-based prize selector 700 that may be used with system 100 (shown in FIG. 1) or system 200 (shown in FIG. 2). While prize selector 700 is described herein as a mechanical wheel-based prize selector 700, it should be recognized that prize selector 700 may alternatively be implemented as a virtual or computer-implemented wheel-based prize selector.

In one embodiment, prize selector 700 includes a wheel 702 that is divided into sections 704, a prize indicator 706, a sensor 708, a motor 710, a brake 712, a processor 714, and an input device 716. Alternatively, prize selector 700 may not include one or more of the above-identified components. In one embodiment, prize selector 700 is operatively connected to one or more gaming machines 114, local server 110, WAP server 120, and/or any other suitable device within gaming establishment 102.

Wheel 702 may be implemented as a virtual wheel displayed on a display 310 of a computing device 300 or on another suitable display. In the example of a virtual wheel 702, a display of wheel 702 (e.g., a graphic or image depicting wheel) may be displayed as slowing down according to a predetermined algorithm or deceleration rate, for example. Alternatively, wheel 702 may be implemented as a physical wheel that may be spun by a player or a device operated by the player. More specifically, in embodiments in which prize selector 700 includes a physical wheel 702, the wheel may be activated or spun by a player physically spinning wheel 702, or by processor 714 or another suitable system or device activating motor 710 to spin wheel 702. In the example of a physical wheel 702, wheel 702 may gradually slow down due to friction between prize selector 700 components after being spun or by brake 712 or a combination thereof.

Wheel 702 may include any suitable number of sections 704 as desired. In the example shown in FIG. 7A, 10 sections 704 are shown with varying sizes. One or more prizes 718 may be associated with each section 704 such that when a player selects a section 704 (or a selection is made for the player), the prize 718 (or prizes 718) associated with the selected section 704 is awarded to the player. Prizes 718 may include, for example, a fixed amount of money or credits, a changeable amount of money or credits (e.g., a progressive jackpot), a prize multiplier for a prize awarded in a primary game or the like, a physical item such as a car or a retail item, and/or any other suitable prize. In one embodiment, the size of each section 704 may be adjusted by processor 714, for example, to adjust the probability of selecting the prize associated with each section. For example, processor 714 (or another suitable processor or device) may adjust the size of each section 704 based on the player's gameplay, player skill level, prize history, wager history, and/or any other suitable factor. It should be recognized that processor 714 may display sections 704 in any size, i.e., equal sections, but may process sections 704 differently internally, i.e., high prizes may appear equal on wheel 702 or another suitable display but be treated as smaller by processor 714 to bias wheel 702 toward prizes of a lesser amount.

Wheel 702 may also include a prize indicator 706 that points to or otherwise indicates a selected section 704 and/or a prize 718 associated with a selected section 704. As illustrated in FIG. 7A, prize indicator 706 may be implemented as a physical or virtual pointer or arrow. Alternatively, prize indicator 706 may be implemented as a physical or virtual arm, flapper, or may be implemented in any other suitable manner as desired.

In one embodiment in which wheel 702 is a physical wheel, a sensor 708 may be integrated with or connected to wheel 702. In one embodiment, sensor 708 detects a position of wheel 702, a rotational speed of wheel 702 and/or an angular distance traveled by wheel 702. Sensor 708 may include, for example, a rotary encoder, a position sensor, and/or any other suitable sensor. Sensor 708 may generate one or more signals representative of the detected position of wheel 702, the detected speed of wheel 702, and/or the detected distance traveled by wheel 702 as wheel 702 rotates, and may transmit the signals to processor 714 and/or to another suitable device. Processor 714 may use the signals received from sensor 708 to calculate or determine the position of wheel 702, the speed of wheel 702, the angular distance traveled by wheel 702, and/or the deceleration rate of wheel 702.

Prize selector 700 may also include a motor 710 or similar rotary actuator means connected to a processor 714 in embodiments in which wheel 702 is a physical wheel. Motor 710 may be operated according to signals received from processor 714 to operate as described herein. In one embodiment, motor 710 may be used to rotate wheel 702 at a substantially constant rotational speed. Alternatively, motor 710 may rotate wheel 702 at a variable speed based on signals received from processor 714, for example. Motor 710 may begin rotating wheel 702 and may continue rotating wheel 702 for a predetermined amount of time. Alternatively, motor 710 may only initiate the rotation of wheel 702 at an initial speed before disengaging from wheel 702 to allow wheel 702 to slow down due to friction and/or due to operation of brake 712, for example. Motor 710 may disengage from wheel 702, or may otherwise cease rotating wheel, by use of a clutch (not shown) or a similar mechanism.

Prize selector 700 may also include a brake 712 to slow and/or stop the rotation of wheel 702. Brake 712 may be operated according to signals received from processor 714 to operate as desired. For example, brake 712 may receive a signal from processor 714 to slow down the rotation of wheel 702 by a desired amount and/or for a desired amount of time.

Processor 714 may be used to control the operation of prize selector 700. For example, processor 714 may receive one or more signals from sensor 708 to determine one or more characteristics of wheel 702, such as the position, rotational speed, rotational acceleration or deceleration, and/or an angular distance traveled by wheel 702. Processor 714 may use the signals and the characteristics of wheel 702 to determine a speed to rotate wheel 702. Processor 714 may then transmit one or more signals to motor 710 to cause motor 710 to rotate wheel 702 at a desired speed and/or to cause motor 710 to disengage or otherwise stop rotating wheel 702. Processor 714 may also transmit one or more signals to brake 712 to cause brake 712 to engage with wheel to slow down or stop wheel at a desired deceleration rate, for example. Processor 714 may also use signals received from sensor 708 to determine the stopping position of wheel 702 and to determine which section 704 and/or prize 718 is pointed to by prize indicator 706. For example, processor 714 may reference a look-up-table or a database (not shown) to correlate the stopping position of wheel 702 with the section 704 and/or prize 718 associated with the stopping position. In one embodiment, processor 714 is a processor 304 of a specialized or specific computing device 300, such as a gaming device 114, local server 110, WAP server 120, or any other suitable device or system.

In one embodiment, prize selector 700 includes an input device 716 that is operable by a player and/or a gaming establishment employee. Input device 716 may be activated to initiate the rotation of wheel 702, to stop wheel 702 at a desired time or position, and/or to initiate a deceleration of wheel 702. For example, the player may activate or use input device 716 to start the rotation of wheel 702. Input device 716 may then transmit one or more signals to processor 714 indicating that the player has activated or used input device 716. Processor 714 may transmit one or more signals to motor 710 to cause motor 710 to rotate wheel 702 at a constant or variable speed as described herein.

The player may also activate or use input device 716 to stop or initiate a slowdown of wheel 702 after wheel 702 has begun spinning. Input device 716 may transmit one or more signals to processor 714 when the player has activated input device 716. Processor 714 may then transmit one or more signals to motor 710 to disengage from wheel 702 or otherwise cease rotating wheel 702. Wheel 702 may begin decelerating due to friction at a substantially constant rate or at a variable rate. Additionally or alternatively, processor 714 may transmit one or more signals to brake 712 to cause brake 712 to engage with and slow down wheel 702 at a substantially constant rate of deceleration or at a variable rate of deceleration. When wheel 702 stops, processor 714 may receive signals from sensor 708 to determine the stopping position of wheel 702 and to identify the section 704 and/or prize 718 pointed to by prize indicator 706 as described above.

While the foregoing embodiments primarily described implementations of a mechanical or physical wheel-based prize selector 700, it should be recognized that a virtual or computer-implemented prize selector 700 may be operated in a similar manner as described herein. Accordingly, in a virtual implementation of prize selector 700, prize selector 700 may include wheel 702, processor 714, and input device 716, for example. Wheel 702 may be implemented on a display 310 of a gaming device 114 or another specialized computing device 300, processor 714 may be a processor 304 of a gaming device 114 or another specialized computing device 300, and/or input device 716 may be a user interface device 312 of a gaming device 114 or another specialized computing device 300. It is recognized that other embodiments described herein may include mechanical or physical based prize selectors or computer-implemented prize selectors.

In addition, one or more components of prize selector 700 may be incorporated within multiple devices. For example, input device 716 may be incorporated within a handheld tablet device or smart phone while wheel 702 and/or other components of prize selector 700 may be incorporated within a separate gaming device 114, computing device 300, or as a standalone component.

Figure 7B:
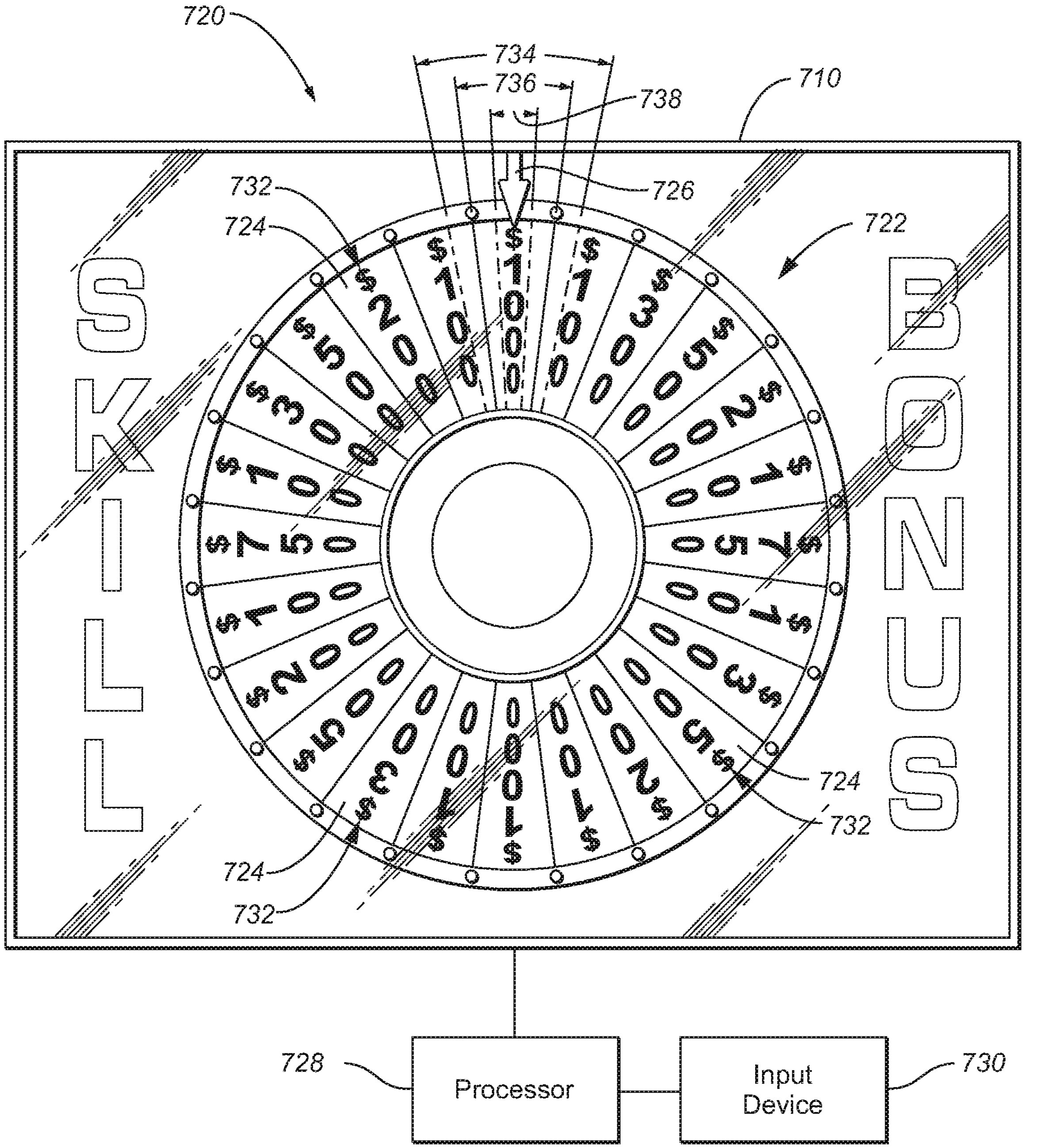
FIG. 7B is a diagram of another exemplary wheel-based prize selector that may be used with the systems and methods described herein.

FIG. 7B is a block diagram of an exemplary virtual or computer-implemented wheel-based prize selector 720 that may be used with system 100 (shown in FIG. 1) or system 200 (shown in FIG. 2).

In one embodiment, prize selector 720 includes a wheel 722 that is divided into sections 724, a prize indicator 726, a processor 728, and an input device 730. Alternatively, prize selector 720 may not include one or more of the above-identified components. In one embodiment, prize selector 720 is operatively connected to, or included within, one or more gaming machines 114, local server 110, WAP server 120, and/or any other suitable device within gaming establishment 102.

Wheel 722 may be implemented as a virtual wheel displayed on a display 310 of a computing device 300 or on another suitable display. In the example of a virtual wheel 722, a display of wheel 722 (e.g., a graphic or image depicting wheel) may be displayed as slowing down according to a predetermined algorithm or deceleration rate, for example.

Wheel 722 may include any suitable number of sections 724 as desired. One or more prizes 732 may be associated with each section 724 such that when a player selects a section 724 (or a selection is made for the player), the prize 732 (or prizes 732) associated with the selected section 724 is awarded to the player. Prizes 732 may include, for example, a fixed amount of money or credits, a changeable amount of money or credits (e.g., a progressive jackpot), a prize multiplier for a prize awarded in a primary game or the like, a physical item such as a car or a retail item, and/or any other suitable prize.

Wheel 722 may also include a prize indicator 726 that points to or otherwise indicates a selected section 724 and/or a prize 732 associated with a selected section 724. As illustrated in FIG. 7B, prize indicator 726 may be implemented as a virtual pointer or arrow. Alternatively, prize indicator 726 may be implemented as a virtual arm or flapper, or may be implemented in any other suitable manner as desired.

Processor 728 may be used to control the operation of prize selector 720. For example, processor 728 may receive one or more signals from sensor 728 to determine one or more characteristics of wheel 722, such as the position, rotational speed, rotational acceleration or deceleration, and/or an angular distance traveled by wheel 722. Processor 728 may use the signals and the characteristics of wheel 722 to determine a speed to rotate wheel 722.

In one embodiment, prize selector 720 includes an input device 730 that is operable by a player and/or a gaming establishment employee. Input device 730 may be activated to initiate the rotation of wheel 722, to stop wheel 722 at a desired time or position, and/or to initiate a deceleration of wheel 722. For example, the player may activate or use input device 730 to start the rotation of wheel 722. Input device 730 may then transmit one or more signals to processor 728 indicating that the player has activated or used input device 730. Processor 728 may transmit one or more signals to display 310 to cause display 310 to show wheel 722 rotating at a constant or variable speed as described herein.

The player may also activate or use input device 730 to stop or initiate a slowdown of wheel 722 after wheel 722 has begun spinning. Input device 730 may transmit one or more signals to processor 728 when the player has activated input device 728. Processor 728 may then transmit one or more signals to display 310 to cause display 310 to show wheel 722 decelerating at a substantially constant rate or at a variable rate. When wheel 722 stops, processor 728 may determine the stopping position of wheel 722 and identify the section 724 and/or prize 732 pointed to by prize indicator 726 as described above.

In addition, one or more components of prize selector 720 may be incorporated within multiple devices. For example, input device 730 may be incorporated within a handheld tablet device or smart phone while wheel 722 and/or other components of prize selector 720 may be incorporated within a separate gaming device 114, computing device 300, or as a standalone component.

Figure 24:
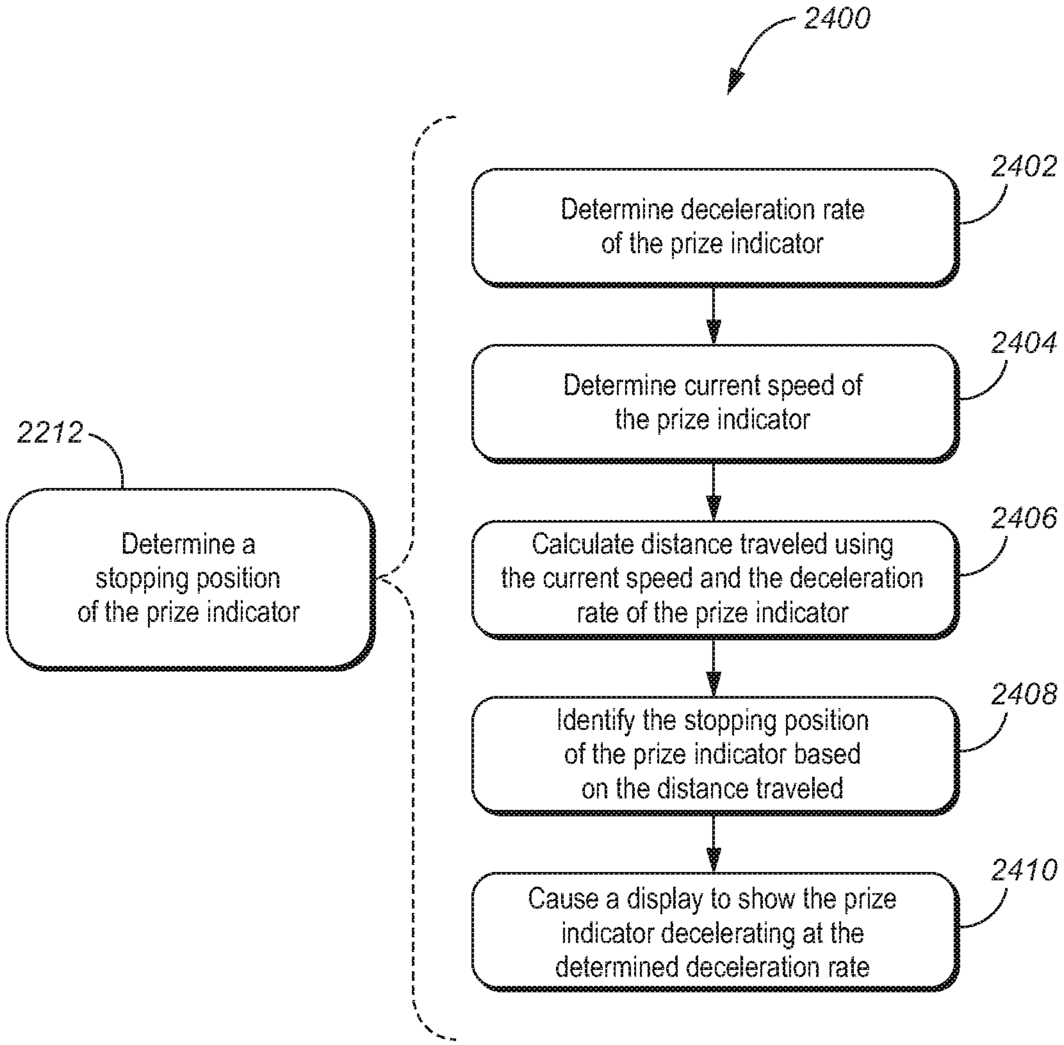
FIG. 24 is a flow diagram of a method of determining a stopping position of a prize indicator that may be used with the method shown in FIG. 22.

In the example shown in FIG. 7B, 24 sections 724 are shown with varying sizes. In one embodiment, the size of each section 724 may be adjusted by processor 728, for example, to adjust the probability of selecting the prize associated with each section. For example, processor 728 (or another suitable processor or device) may adjust the size of each section 724 based on the player's gameplay, player skill level, prize history, wager history, and/or any other suitable factor. It should be recognized that processor 728 may display sections 724 in any size, i.e., equal sections, but may process sections 704 differently internally, i.e., high prizes may appear equal on wheel 722 or another suitable display but be treated as smaller by processor 728 to bias wheel 722 toward prizes of a lesser amount. In one embodiment shown in FIG. 7B, a section 724 associated with a grand prize may be adjusted to be a first or increased size 734, a second or normal size 736, or a third or reduced size 738. These sizes may represent accuracy ranges (e.g., first accuracy range 734, second accuracy range 736, and third accuracy range 738) within which a player must stop prize selector 720 (or prize indicator 726) to achieve the desired prize 732. The first size or accuracy range 734 may be used for players having a low amount of skill or a low skill level, the second size or accuracy range 736 may be used for players having a normal or average amount of skill or skill level, and the third size or accuracy range 738 may be used for players having a high amount of skill or a high skill level. It should be recognized that any suitable section 704 may be adjusted to be any size rather than being limited to three sizes as shown in FIG. 7B.

The player's skill level may be determined, for example, based on a history of prizes won by the player, and/or based on any other suitable criterion. In one example, the player's skill level may be a value between 1 and 10. Alternatively, the player's skill level may be a value between 1 and 100 or any other suitable range. Each section size may be associated with different player skill levels or ranges of player skill levels to facilitate normalizing bonus prizes won by players and/or to encourage less skilled players to keep playing to win larger bonus prizes. For example, in an embodiment where player skill levels range from 1 to 10, with 1 representing a player having very low skill and 10 representing a player having very high skill, the first or increased size 734 may be associated with player skill levels 1-3, the second or normal size 736 may be associated with player skill levels 4-6, and the third or reduced size 738 may be associated with player skill levels 7-10. Alternatively, any suitable skill level or range of skill levels may be associated with any suitable section 704 and/or section size as desired.

In one embodiment, the player skill level may be set to an initial value until the player's prize history is developed sufficiently to adjust the skill level to a more suitable value. For example, if the player skill level range is between 1 and 10 described above, each player with an unknown player skill may have their player skill level set to 8. The initial value is preferably set to a relatively high value to prevent highly skilled players from taking advantage of a bonus prize selector having a section size meant for less skilled players (e.g., having an increased section size). For example, if the initial value is set to a lower value such that the default section size presented to a player of unknown skill is the normal size 736 or increased size 734, a highly skilled player may try to conceal his or her skill level by not using a player reward card (or other player tracking mechanism) and moving from gaming device 114 to gaming device 114 each time a bonus award is achieved. In such a manner, the highly skilled player may achieve higher valued prizes more often than a gaming establishment or gaming operator expects, which may in turn cause the gaming establishment or operator to consistently lose money.

A player's prize history and skill level may be monitored and updated, for example, during the entire gameplay at a particular gaming device 114 (e.g., for a player who does not use a player reward card or the like). Additionally or alternatively, the player's prize history and skill level may be monitored and updated during any suitable period, such as 1 game or play session on gaming device 114, 1 day, 1 week, 1 month, and/or 1 year. As a result, the player's prize history and skill can be tracked and updated for both carded play (i.e., using a player reward card or the like) and uncarded play (i.e., without using a player reward card or the like).

In one embodiment, to maintain an expected level of profitability for games associated with prize selector 720, one or more prizes 732 and sizes of the section 724 associated with each prize 732 may be adjusted based on the player skill level to maintain a predetermined return-to-player (RTP) percentage or value, or a predetermined RTP range. As used herein, the term "return-to-player percentage or value" refers to an average amount of money the player wins during a period of time divided by the amount of money wagered by the player during the period of time. For example, if a player wins $95 during a game session and wagers $100 during the session, the RTP value would be 95% or 0.95. In the case of a game with a bonus prize, the RTP may be calculated to be the amount awarded to the player as a result of any prize awarded during the base or primary game plus the amount awarded to the player as a result of any prize awarded during the bonus game divided by the total amount wagered.

In one embodiment, a gaming establishment may determine a maximum RTP value that may be realized over time with respect to a game associated with prize selector 720. For example, a gaming establishment may set a maximum RTP value of 0.98 to ensure that, on average, the gaming establishment will retain about 2% of money wagered. In such an embodiment, the gaming establishment may adjust the value of one or more prizes 732 displayed on prize selector 720 and/or a size of one or more sections 724 of prize selector 720 to ensure that the amount contributed by prize selector 720 to the overall RTP of a game is less than or equal to the maximum RTP. For example, if the primary game has an RTP value of 0.90, the RTP amount of the bonus awarded through prize selector 720 may be limited to a range of 0 to 0.08. The RTP amount of the bonus awarded through prize selector 720 may factor in the probability of triggering a bonus round that includes spinning or otherwise activating prize selector 720.

The monitoring, determining, and adjustment of the player skill and the RTP of prize selector 720 (including the adjustment of prizes 732 and section sizes) may be performed by one or more processors of gaming device 114, local server 110, WAP server 120, and/or any other suitable system or device.

In one embodiment, an adjustment to a player's skill level and/or an adjustment to the size of one or more sections 724 may be adjusted quickly to prevent a highly skilled player taking over for the bonus portion of a lower skilled player's game. For example, if a player has a relatively stable skill level and gaming device 114, local server 110, WAP server 120, or another suitable system or device determines that a bonus prize associated with prize selector 720 has been selected with greater skill than is consistent with the player's history, the player's skill level may be adjusted to a higher level and/or the size of one or more sections 724, such as a section 724 associated with a grand prize, may be adjusted to be a smaller size consistent with a higher player skill level.

While the embodiments described herein have focused on adjusting a size of one or more sections 724 based on a determined player skill level (sometimes referred to as adjusting an accuracy requirement), a speed at which prize selector 720 is spun (i.e., wheel 722 portion of prize selector 720) may be adjusted based on the player's skill level in addition to, or instead of, the adjustment to the size of one or more sections 724. Adjusting the player-influenced speed or accuracy requirement in response to the player's skill level may occur at any time including before the start of a game, during the game, or following the conclusion of a game.

Figure 8:
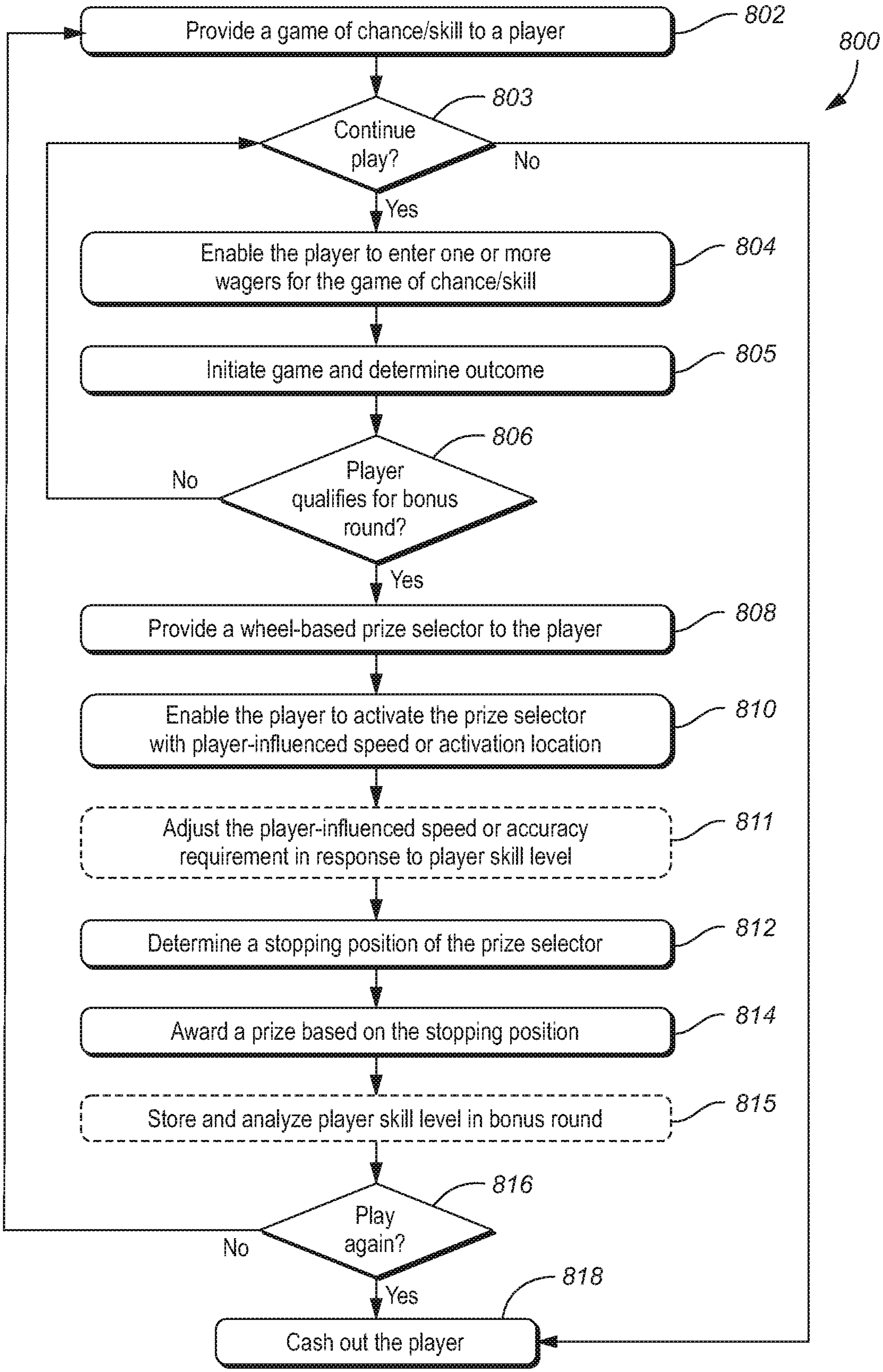
FIG. 8 is a flow diagram of a method of selecting a prize that may be used with the wheel-based prize selector shown in FIG. 7A or 7B.

FIG. 8 is a flow diagram of a method 800 of selecting a prize that may be used with one or more gaming devices 114 (shown in FIG. 1).

In one embodiment, method 800 is performed by one or more processors 304 of one or more computing devices 300 executing instructions stored within one or more computer-readable memories, such as memory device 306. For example, method 800 may be implemented by processor 304 of a gaming device 114, WAP server 120, local server 110, accounting system 128, and/or by any other suitable device.

During operation of method 800, one or more games of chance and/or skill are provided 802 to a player on a gaming device 114, for example. The games of chance and/or skill may include, without limitation, video reel slots, video poker, sports betting or sport book games, bingo or bingo-related games, keno or keno-related games, and/or any other games of chance. The game or games may be displayed to the player, for example, on one or more displays 310 of gaming device 114.

Once one or more games of chance and/or skill are provided 802 to a player on a gaming device 114, the player may continue 803 to play or alternatively cash out the player as described below. The player is enabled 804 to enter one or more wagers for the game. For example, the player may enter one or more wagers through user interface device 312 of gaming device 114. The wagers entered by the player may be tracked by gaming device 114, by accounting system 128, and/or by any other suitable device or system. For example, the amount of money or credits wagered by the player may be tracked by a wagering meter included within gaming device 114, accounting system 128, and/or any other suitable system or device. In one embodiment, an amount of credits wagered by the player is deducted from a credit balance of the player.

The game is initiated and an outcome for the game is determined 805. For example, in one embodiment, symbols or other indicia are selected during the game. If a winning outcome is determined, (e.g., if the indicia satisfy a winning criterion), the player may be awarded a prize for the game.

As the player plays the game, gaming device 114 determines 806 whether the player qualifies for a bonus round. Additionally or alternatively, WAP server 120, local server 110, and/or any other suitable system or device determines 806 whether the player qualifies for the bonus round. The player may qualify for the bonus round by satisfying a winning criterion in a primary game or by satisfying a bonus criterion in the primary game, for example. The winning criterion may include, for example, matching a predetermined pattern of indicia in a reel-type or video bingo game, matching a predetermined number of indicia in a video keno game, achieving a predetermined hand rank in a video poker game, and/or any other suitable criterion. The bonus criterion may include, for example, receiving a predetermined number of bonus indicia in the game, matching a predetermined number of indicia during the game, matching a predetermined pattern of indicia in the game, and/or any other suitable criterion.

If the player is determined to not be eligible for the bonus round, another game of chance may be provided 802 to the player. However, if the player is determined to be eligible for the bonus round, a wheel-based prize selector, such as prize selector 700 (shown in FIG. 7A) or prize selector 720 (shown in FIG. 7B), may be provided 808 to the player in one embodiment. While the following embodiment is described with reference to a wheel-based prize selector, it should be recognized that any suitable prize selector may be provided to the player.

In one embodiment, the player is enabled 810 to activate the prize selector with a player-influenced speed or activation location (i.e., a point at which the player either activates a stop function of the already rotating wheel-based prize selector or starts the rotation of the wheel-based prize selector). For example, in one embodiment, the player may walk over to a physical wheel and grab, pull, or push on a portion of the wheel (or component attached to the wheel) to spin the wheel at a speed controlled by the player (i.e., based on a force applied by the player). In another embodiment, the player may operate an input device, such as a button, a touch screen interface of a tablet computing device or of gaming device 114, or another suitable input device 716 (shown in FIG. 7A or 7B), to cause the wheel to spin based on a characteristic of the player's input. For example, the input device may be a button that the player holds down and releases after a player-determined amount of time. The amount of time that the player holds down the button may influence the speed at which the wheel is spun. In another embodiment, the input device may be a touch screen that the player "swipes" or enters a "swipe input" (i.e., drags his or her finger across to register an input), with the length and/or speed of the swipe influencing the speed at which the wheel is spun. In embodiments in which the player operates the input device to spin a physical wheel, it should be recognized that a motor, such as motor 710 (shown in FIG. 7A or 7B), or another suitable device may be activated to spin the wheel at the player-influenced speed. In embodiments in which the player operates the input device to spin a virtual wheel, it should be recognized that a processor, such as processor 304 (shown in FIG. 3), may calculate or determine the player-influenced speed and cause a display, such as display 310, to display the wheel spinning at the player-influenced speed. It is understood that those skilled in the art will recognize a large variety of ways for the player to input different gestures to start, stop, accelerate or decelerate the wheel-based prize selector.

It should be recognized that the player-influenced speed refers to an initial speed at which the prize selector spins. After the player initiates the spin of the prize selector, the prize selector may begin decelerating due to friction between components of the prize selector, interaction with a brake or similar mechanism, and/or interaction with a flapper (e.g., prize indicator 706) or similar mechanism in embodiments in which the prize selector includes a physical wheel. In embodiments in which the prize selector includes a virtual wheel that is displayed on a display, the prize selector may be displayed as decelerating according to a deceleration rate controlled by a processor or controller, for example.

In one embodiment, the player-influenced speed may be adjusted 811, for example, by a processor in response to a skill level associated with the player as described above with reference to FIG. 7B. Additionally or alternatively, an accuracy requirement (described above with reference to FIG. 7B) may be adjusted 811 in response to the player skill level. For example, as illustrated in FIG. 7B, varying accuracy ranges or requirements may be provided in order for the player to achieve the highest value prize shown on prize selector 720. As an example, a first time or average player would need to trigger in the second range 736 to achieve the top prize. A highly skilled player needs to trigger in the third range 738 and the highly unskilled needs to trigger in the first range 734. The system may monitor the skill level of players using a player's reward card or the like over time, e.g., 2 plays, 1 play session, 1 week, 1 year, etc., and adjust accordingly or those players not using a players card for shorter periods. It is understood that the size and position of the first range 734, second range 736 and third range 738 may vary and the size and position of the ranges shown in FIG. 7B are for reference purposes only. Adjusting the player-influenced speed or accuracy requirement in response to the player skill level 811 may occur at any time including before the start of a game, during the game on following the conclusion of a game.

After the player has activated the prize selector, a stopping position of the prize selector is determined 812 by processor 714, for example. In some embodiments, the stopping position may be defined as the position on the wheel pointed to by the prize indicator when the wheel is stopped.

In an embodiment in which the wheel-based prize selector includes a physical wheel, processor 714 may determine 812 the stopping position of the prize selector based on signals received from sensor 708. In an embodiment in which the wheel-based prize selector includes a virtual wheel, processor 714 may determine 812 the stopping position of the prize selector based on a calculation of the initial speed of the wheel and the deceleration rate of the wheel.

A prize may be awarded 814 based on the determined stopping position of the prize selector. For example, if the stopping position of the prize selector is associated with a particular prize, the player may be awarded the prize associated with the stopping position. The prize may be selected based on an associated pay table, or the prize selector may display the prize to be won for each stopping position, for example. While the foregoing embodiment has been described in which the prize is a bonus prize awarded in a bonus round, it should be recognized that any suitable prize may be awarded 814 during operation of method 800. After 1 or more bonus rounds, the system may optionally store, analyze, and/or update 815 the player skill level in the bonus round.

The player may be presented with an option 816 to play the game of chance again, or to play another game of chance. If the player chooses to play again, method 800 returns to providing 802 a game of chance to the player. If the player does not want to play another game of chance, the player may cash out 818 of gaming device 114. The player may receive a ticket or voucher representing the funds remaining in the player's credit balance, or may receive currency from a bill or coin dispenser representative of the amount remaining in the player's credit balance. Alternatively, the player may receive an electronic fund transfer of the remaining credit balance into an account of the player at a financial institution, for example.

Figure 9:
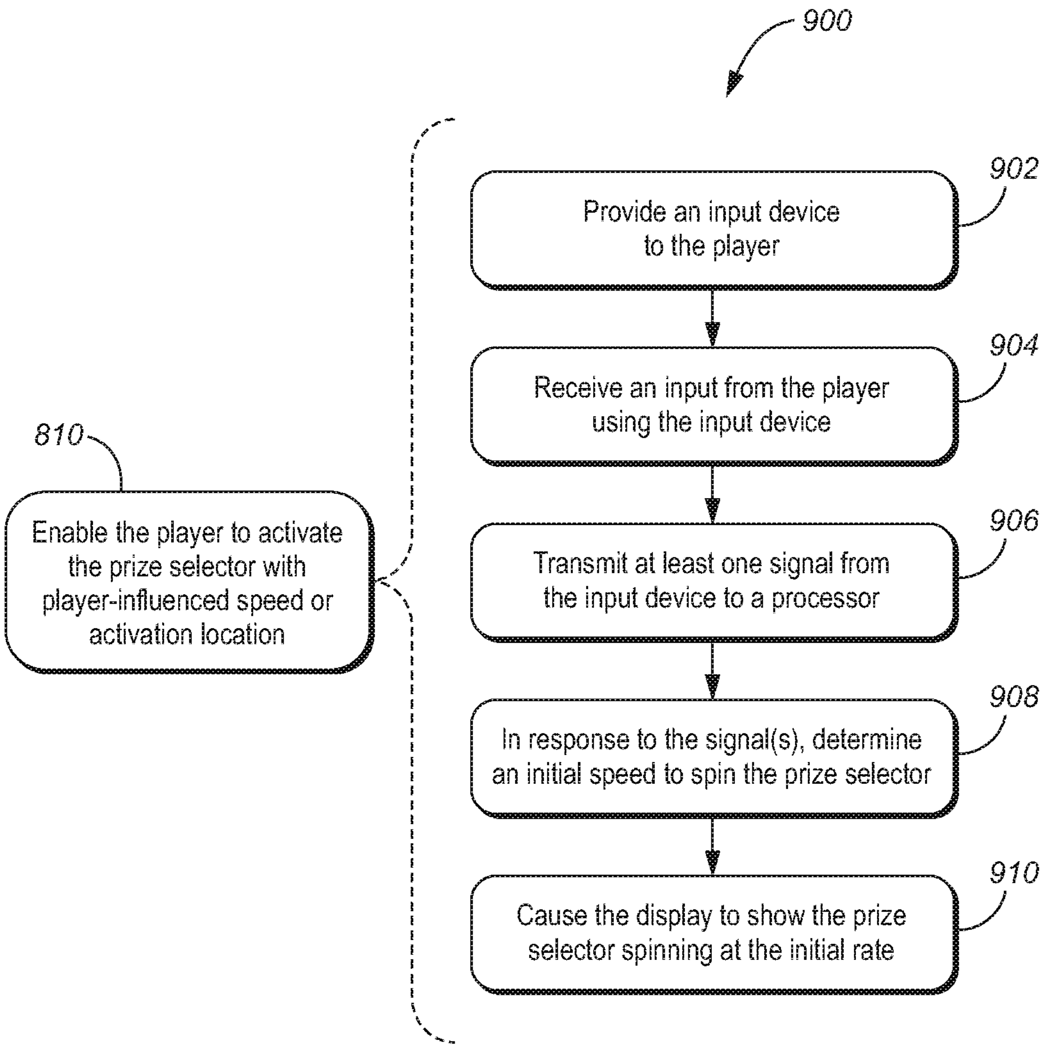
FIG. 9 is a flow diagram of a method of enabling a player to activate a prize selector with a player-influenced speed that may be used with the method shown in FIG. 8.

FIG. 9 is a flow diagram of a method 900 of enabling a player to activate a prize selector with a player-influenced speed or activation location that may be used with one or more gaming devices 114 (shown in FIG. 1). In one embodiment, method 900 is a more detailed embodiment of step 810 in which the prize selector is a virtual wheel-based prize selector as described above with reference to FIG. 8. It is understood that any embodiments that refer to player-influenced results may utilize player-influenced speed, player-influenced time, player-influenced location and the like or any combination thereof with respect to starting and/or stopping a prize selector and such alternatives may be considered as interchangeable with those described. In addition, a player influence may be only one of two or more influences that provide the final result or outcome. For example, a player influence may be used in combination with a randomized influence where the final result or outcome is determined by adjusting the player influence by a randomized factor of accuracy, i.e., the player influence multiplied by a random accuracy factor which may range from 1.000 (exact result or outcome) to 0.500 (significantly distorts the result or outcome).

In one embodiment, method 900 is performed by one or more processors 304 of one or more computing devices 300 executing instructions stored within one or more computer-readable memories, such as memory device 306. For example, method 900 may be implemented by processor 304 of a gaming device 114, WAP server 120, local server 110, accounting system 128, and/or by any other suitable device.

In one embodiment, an input device is provided 902 to the player to facilitate enabling the player to operate the prize selector for the bonus round. For example, the input device may include a button, a touch screen interface of a tablet computing device or of gaming device 114, or another suitable input device 716 (shown in FIG. 7A or 7B). An input may then be received 904 from the player using the input device. The input device transmits 906 at least one signal representative of the user input to a processor, such as processor 304 of gaming device 114, WAP server 120, local server 110, and/or any other device or system.

In response to the signal or signals received from the input device, the processor determines 908 an initial speed to spin the prize selector. For example, the input device may be a button that the player holds down and releases after a player-determined amount of time. The processor may then determine the initial speed to spin the prize selector based on the amount of time the player holds down the button. For example, in one embodiment, the processor may assign a base speed of 1 revolution per second and may determine the initial speed to be equal to the base speed multiplied by a multiplier value that is equal to the number of seconds the player holds the button. The processor may set the initial speed equal to a minimum speed of 1 revolution per second in case the player does not hold the button down for a full second, and may set the initial speed equal to a maximum speed of 10 revolutions per second in case the player holds down the button for longer than 10 seconds. These examples are illustrative only, and any suitable base speed, multiplier value, minimum speed, and/or maximum speed may be used as desired. Additionally, the processor may not assign a minimum speed or maximum speed, and/or may use a different calculation to determine the initial speed to spin the wheel.

In another embodiment, the input device may be a touch screen that the player "swipes" (i.e., drags his or her finger across to register an input), with the length and/or speed of the swipe influencing the speed at which the wheel is spun. The processor may then determine the initial speed to spin the prize selector based on the amount of time, the distance, and/or the speed at which the player swipes his or her finger across the screen. For example, in one embodiment, the processor may assign a base speed of 1 revolution per second and may determine the initial speed to be equal to the base speed multiplied by a multiplier value that is equal to the number of inches the player swipes his or her finger across the screen. The processor may additionally set the initial speed equal to a minimum speed of 1 revolution per second in case the player's finger does not travel a full inch, and may set the initial speed equal to a maximum speed of 10 revolutions per second in case the player's finger travels more than 10 inches. These examples are illustrative only, and any suitable base speed, multiplier value, distance, minimum speed, and/or maximum speed may be used as desired. Additionally, the processor may not assign a minimum speed or maximum speed, and/or may use a different calculation to determine the initial speed to spin the wheel.

In the embodiments described herein, the processor may also adjust the initial speed by a value based on the player's gameplay or prize history. For example, if the player has a history of achieving high bonus prizes (i.e., bonus prizes exceeding a predetermined threshold), the processor may add or subtract a random or set value from the initial speed to determine an adjusted initial speed to spin the wheel. In such embodiments, the processor may enable the prize selector to be at least partially non-deterministic from the player's perspective and/or may make it more difficult for the player to use skill in achieving a high bonus prize.

The processor may cause 910 a display to show the prize selector (e.g., the wheel portion of the prize selector) spinning at the initial speed. For example, the processor may transmit one or more signals to a display, such as display 310 (shown in FIG. 3), to cause display 310 to graphically depict the wheel spinning at the initial speed determined above.

Figure 10:
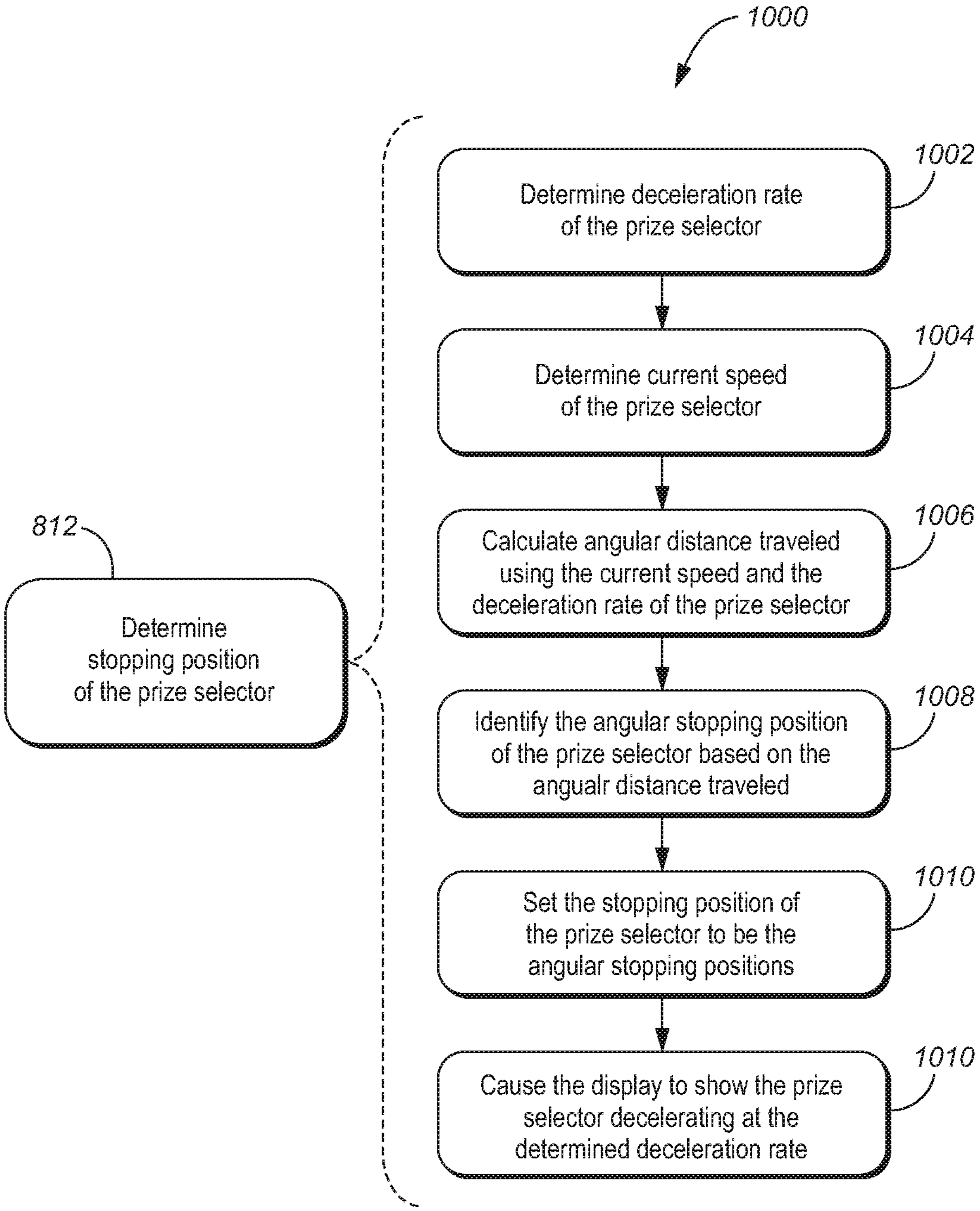
FIG. 10 is a flow diagram of a method of determining a stopping position of a prize selector that may be used with the method shown in FIG. 8.

FIG. 10 is a flow diagram of a method 1000 of determining a stopping position of a prize selector that may be used with one or more gaming devices 114 (shown in FIG. 1). In one embodiment, method 1000 is a more detailed embodiment of step 812 in which the prize selector is a virtual wheel-based prize selector as described above with reference to FIG. 8.

In one embodiment, method 1000 is performed by one or more processors 304 of one or more computing devices 300 executing instructions stored within one or more computer-readable memories, such as memory device 306. For example, method 1000 may be implemented by processor 304 of a gaming device 114, WAP server 120, local server 110, accounting system 128, and/or by any other suitable device.

During operation of method 1000, a processor, such as processor 304, may determine 1002 the deceleration rate of the prize selector (e.g., of the wheel portion of the prize selector described above with reference to FIG. 8). In one embodiment, the processor may assign a constant deceleration rate of 0.5 revolutions per second squared to the wheel. Accordingly, in the example described above in FIG. 9 in which the initial speed of the wheel is between 1 and 10 revolutions per second, the wheel may come to a stop after between 2 and 20 seconds. Alternatively, the processor may assign a random deceleration rate or may add or subtract a random or set value to the constant deceleration rate described above. For example, if the player has a history of achieving high bonus prizes, the processor may adjust the deceleration rate by adding or subtracting a random or set value from the constant deceleration rate to determine an adjusted deceleration rate for the wheel. In such embodiments, the processor may enable the prize selector to be at least partially non-deterministic from the player's perspective and/or may make it more difficult for the player to use skill in achieving a high bonus prize.

The processor may also determine 1004 a current speed of the prize selector. The current speed may be determined to be the initial speed at which the wheel is spun or rotated as described above with reference to FIG. 9. In such an embodiment, the processor may determine the current speed at a time substantially simultaneously with the initial spin of the wheel. Alternatively, the current speed of the prize selector may be determined 1004 to be the initial speed minus a deceleration rate of the wheel multiplied by the number of seconds (or other suitable unit of time) that has elapsed since the wheel was initially spun.

The processor may also calculate 1006 an angular distance traveled by the wheel until the wheel slows to a stop using the initial or current speed and the deceleration rate of the prize selector according to Eq. 1:

$$d=v\times t+(a\times t^2)/2 \quad \text{Eq. 1}$$

where d is the distance traveled, v is the velocity or speed of the wheel, t is the time elapsed, and a is the acceleration (or deceleration if negative) of the wheel. For example, if the current speed is 3 revolutions per second, the deceleration rate of the prize selector is 0.5 revolutions per second squared, and the amount of time needed to slow the wheel down to a stop is 6 seconds, the processor may calculate the angular distance traveled to be 9 revolutions, or 3240 degrees.

The processor may also identify 1008 an angular stopping position of the prize selector based on the angular distance traveled by the wheel. For example, the processor may identify a starting position of the wheel before the wheel is spun (or the position of the wheel when calculating the current speed of the wheel) and may add the angular distance traveled to the starting position to determine the angular stopping position of the wheel. If the starting position plus the distance traveled is more than one revolution of the wheel, the processor may calculate the angular stopping position to be equal to the remainder of the distance traveled plus the starting position divided by 360 (the number of degrees in one revolution of the wheel). The processor may also set 1010 the stopping position of the prize selector to be the angular stopping position.

In some embodiments, the processor may also cause 1012 the display to show the prize selector (e.g., the wheel portion of the prize selector) to decelerate at the deceleration rate determined above until the wheel stops. For example, the processor may transmit one or more signals to the display, such as display 310 (shown in FIG. 3), to cause display 310 to graphically depict the wheel decelerating at the deceleration rate determined above as the wheel rotates through the angular distance traveled until the wheel comes to a stop at the stopping position.

Figure 11:
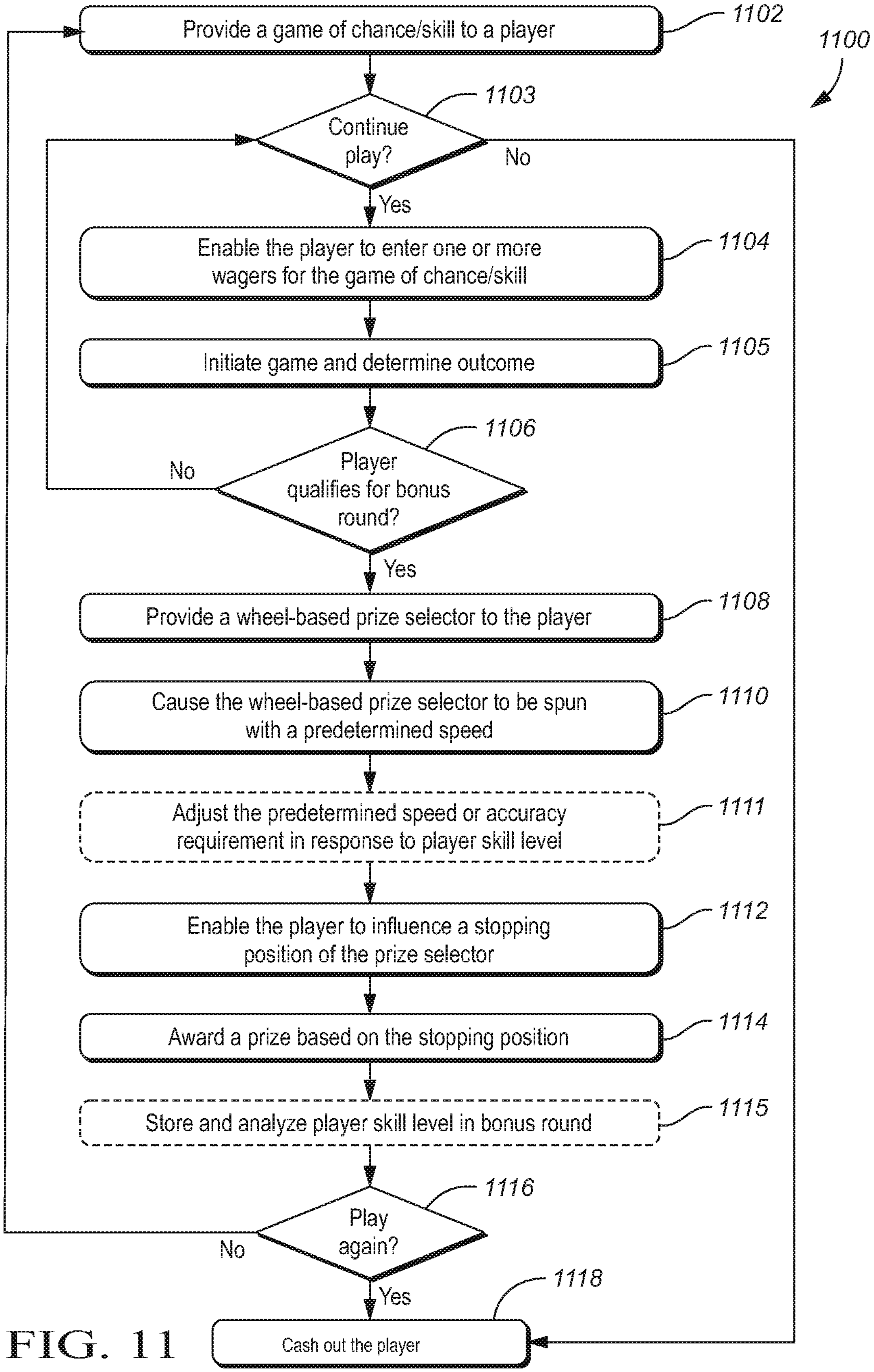
FIG. 11 is a flow diagram of a method of selecting a prize that may be used with the wheel-based prize selector shown in FIG. 7A or 7B.

FIG. 11 is a flow diagram of a method 1100 of selecting a prize that may be used with one or more gaming devices 114 (shown in FIG. 1).

In one embodiment, method 1100 is performed by one or more processors 304 of one or more computing devices 300 executing instructions stored within one or more computer-readable memories, such as memory device 306. For example, method 1100 may be implemented by processor 304 of a gaming device 114, WAP server 120, local server 110, accounting system 128, and/or by any other suitable device.

During operation of method 1100, one or more games of chance and/or skill are provided 1102 to a player on a gaming device 114, for example. The games of chance and/or skill may include, without limitation, video reel slots, video poker, sports betting or sport book games, bingo or bingo-related games, keno or keno-related games, and/or any other games of chance. The game or games may be displayed to the player, for example, on one or more displays 310 of gaming device 114.

Once one or more games of chance and/or skill are provided 1102 to a player on a gaming device 114, the player may continue 1103 to play or alternatively cash out the player as described below. The player is enabled 1104 to enter one or more wagers for the game. For example, the player may enter one or more wagers through user interface device 312 of gaming device 114. The wagers entered by the player may be tracked by gaming device 114, by accounting system 128, and/or by any other suitable device or system. For example, the amount of money or credits wagered by the player may be tracked by a wagering meter included within gaming device 114, accounting system 128, and/or any other suitable system or device. In one embodiment, an amount of credits wagered by the player is deducted from a credit balance of the player.

The game is initiated and an outcome for the game is determined 1105. For example, in one embodiment, symbols or other indicia are selected during the game. If a winning outcome is determined, (e.g., if the indicia satisfy a winning criterion), the player may be awarded a prize for the game.

As the player plays the game, gaming device 114 determines 1106 whether the player qualifies for a bonus round. Additionally or alternatively, WAP server 120, local server 110, and/or any other suitable system or device determines 1106 whether the player qualifies for the bonus round. The player may qualify for the bonus round by satisfying a winning criterion in a primary game or by satisfying a bonus criterion in the primary game, for example. The winning criterion may include, for example, matching a predetermined pattern of indicia in a reel-type or video bingo game, matching a predetermined number of indicia in a video keno game, achieving a predetermined hand rank in a video poker game, and/or any other suitable criterion. The bonus criterion may include, for example, receiving a predetermined number of bonus indicia in the game, matching a predetermined number of indicia during the game, matching a predetermined pattern of indicia in the game, and/or any other suitable criterion.

If the player is determined to not be eligible for the bonus round, another game of chance may be provided 1102 to the player. However, if the player is determined to be eligible for the bonus round, a wheel-based prize selector, such as prize selector 700 (shown in FIG. 7A) or prize selector 720 (shown in FIG. 7B) may be provided 1108 to the player in one embodiment. While the following embodiment is described with reference to a wheel-based prize selector, it should be recognized that any suitable prize selector may be provided to the player.

In one embodiment, the processor causes 1110 the prize selector to be spun with a predetermined speed. In embodiments in which the prize selector includes a physical wheel, the processor may transmit one or more signals to a motor, such as motor 710 (shown in FIG. 7A or 7B) to cause the motor to spin the wheel at the predetermined speed. In embodiments in which the prize selector includes a virtual wheel, the processor may transmit one or more signals to a display, such as display 310 (shown in FIG. 3), to cause the display to display the wheel spinning at the predetermined speed. In one embodiment, the predetermined speed is about 10 revolutions per second. Alternatively, any suitable speed may be used for the predetermined speed. It should be recognized that the predetermined speed may or may not be constant.

In one embodiment, the predetermined speed may be adjusted 1111, for example, by a processor in response to a skill level associated with the player as described above with reference to FIG. 7B. Additionally or alternatively, an accuracy requirement (described above with reference to FIG. 7B) may be adjusted 1111 in response to the player skill level.

When the prize selector (e.g., the wheel portion of the prize selector) is spinning at the predetermined speed, the player is enabled 1112 to influence a stopping position of the prize selector. For example, the player may operate an input device, such as a button, a touch screen interface of a tablet computing device or of gaming device 114, or another suitable input device 716 (shown in FIG. 7A or 7B), to cause the wheel to stop spinning or to begin slowing down to until the wheel stops at the stopping position. In embodiments in which the player operates the input device to influence the stopping position of a physical wheel, it should be recognized that a brake, such as brake 712 (shown in FIG. 7A or 7B), or another suitable device may be activated to stop the wheel or begin slowing down the wheel when the player operates the input device. Additionally or alternatively, the motor may disengage from or otherwise stop spinning the wheel at the predetermined speed when the player operates the input device such that friction between components of the prize selector causes the wheel to begin slowing down to a stop. In embodiments in which the player operates the input device to influence the stopping position of a virtual wheel, it should be recognized that a processor, such as processor 304 (shown in FIG. 3), may calculate or determine the stopping position and/or a deceleration rate of the wheel when the player operates the input device. The processor may cause a display, such as display 310, to display the wheel stopping at the stopping position or may cause the display to display the wheel slowing down at the deceleration rate when the player operates the input device.

It should be recognized that the player-influenced stopping position refers to an angular position of the prize selector (e.g., the wheel portion of the prize selector) pointed to by the prize indicator when the prize selector stops as a result of the player operating the input device. In one embodiment, the prize selector will stop at the player-selected stopping position when the player operates the input device. In another embodiment, the prize selector will begin decelerating when the player operates the input device and will slow down to a stop at the stopping position.

The position at which the prize selector is stopped may be determined by processor 714 in some embodiments. In an embodiment in which the wheel-based prize selector includes a physical wheel, processor 714 may determine the stopping position of the prize selector based on signals received from sensor 708. In an embodiment in which the wheel-based prize selector includes a virtual wheel, processor 714 may determine the stopping position of the prize selector based on a calculation of the initial speed of the wheel and the deceleration rate of the wheel.

A prize may be awarded 1114 based on the determined stopping position of the prize selector. For example, if the stopping position of the prize selector is associated with a particular prize, the player may be awarded the prize associated with the stopping position. The prize may be selected based on an associated pay table, or the prize selector may display the prize to be won for each stopping position, for example. While the foregoing embodiment has been described in which the prize is a bonus prize awarded in a bonus round, it should be recognized that any suitable prize may be awarded 1114 during operation of method 1100. After 1 or more bonus rounds, the system may optionally store, analyze, and/or update 1115 the player skill level in the bonus round 1115.

The player may be presented with an option 1116 to play the game of chance again, or to play another game of chance. If the player chooses to play again, method 1100 returns to providing 1102 a game of chance to the player. If the player does not want to play another game of chance, the player may cash out 1118 of gaming device 114. The player may receive a ticket or voucher representing the funds remaining in the player's credit balance, or may receive currency from a bill or coin dispenser representative of the amount remaining in the player's credit balance. Alternatively, the player may receive an electronic fund transfer of the remaining credit balance into an account of the player at a financial institution, for example.

Figure 12:
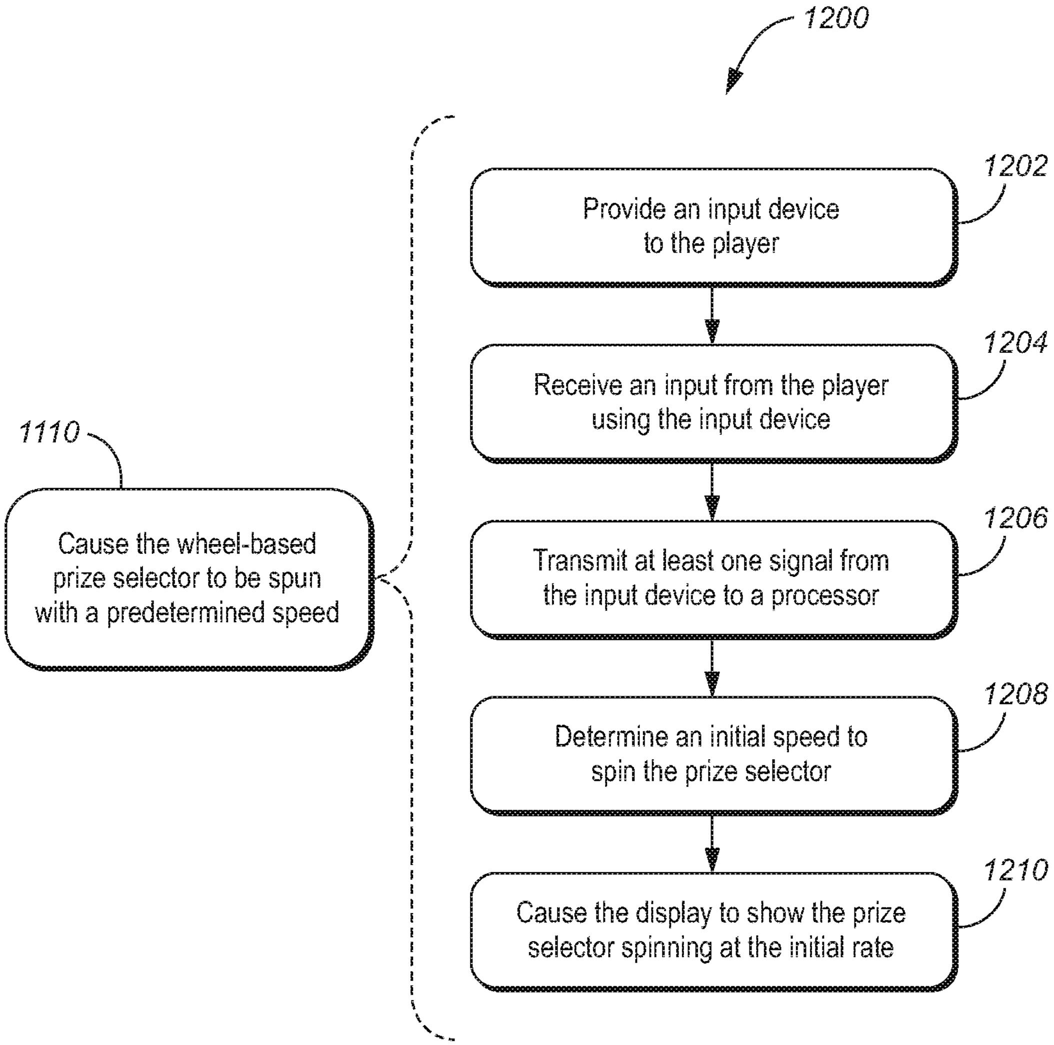
FIG. 12 is a flow diagram of a method of causing a wheel-based prize selector to be spun with a predetermined speed that may be used with the method shown in FIG. 11.

FIG. 12 is a flow diagram of a method 1200 of causing a wheel-based prize selector to be spun with a predetermined speed that may be used with one or more gaming devices 114 (shown in FIG. 1). In one embodiment, method 1200 is a more detailed embodiment of step 1110 in which the prize selector is a virtual wheel-based prize selector as described above with reference to FIG. 11.

In one embodiment, method 1200 is performed by one or more processors 304 of one or more computing devices 300 executing instructions stored within one or more computer-readable memories, such as memory device 306. For example, method 1200 may be implemented by processor 304 of a gaming device 114, WAP server 120, local server 110, accounting system 128, and/or by any other suitable device.

In one embodiment, an input device is provided 1202 to the player to facilitate enabling the player to operate the prize selector for the bonus round. For example, the input device may include a button, a touch screen interface of a tablet computing device or of gaming device 114, or another suitable input device 716 (shown in FIG. 7A or 7B). An input may then be received 1204 from the player using the input device to start spinning the prize selector (e.g., the wheel portion of the prize selector) at the initial speed. The input device transmits 1206 at least one signal representative of the user input to a processor, such as processor 304 of gaming device 114, WAP server 120, local server 110, and/or any other device or system. Alternatively, the input device may not be used in method 1200 and the wheel may automatically begin spinning at the initial speed when the player is determined to be eligible for the bonus round, for example.

In response to the signal or signals received from the input device, the processor determines 1208 an initial speed to spin the prize selector. Alternatively, the processor may determine 1208 an initial speed to spin the prize selector without using signals from the input device. For example, in one embodiment, the processor may determine the initial speed to be 10 revolutions per second. This example is illustrative only, and any suitable initial speed may be used as desired. It should be recognized that the predetermined speed may or may not be constant.

In the embodiments described herein, the processor may also adjust the initial speed by a value based on the player's gameplay or prize history. For example, if the player has a history of achieving high bonus prizes, the processor may add or subtract a random or set value from the initial speed to determine an adjusted initial speed to spin the wheel. In such embodiments, the processor may enable the prize selector to be at least partially non-deterministic from the player's perspective and/or may make it more difficult for the player to use skill in achieving a high bonus prize.

The processor may cause 1210 a display to show the prize selector (e.g., the wheel portion of the prize selector) spinning at the initial speed. For example, the processor may transmit one or more signals to a display, such as display 310 (shown in FIG. 3), to cause display 310 to graphically depict the wheel spinning at the initial speed determined above.

Figure 13:
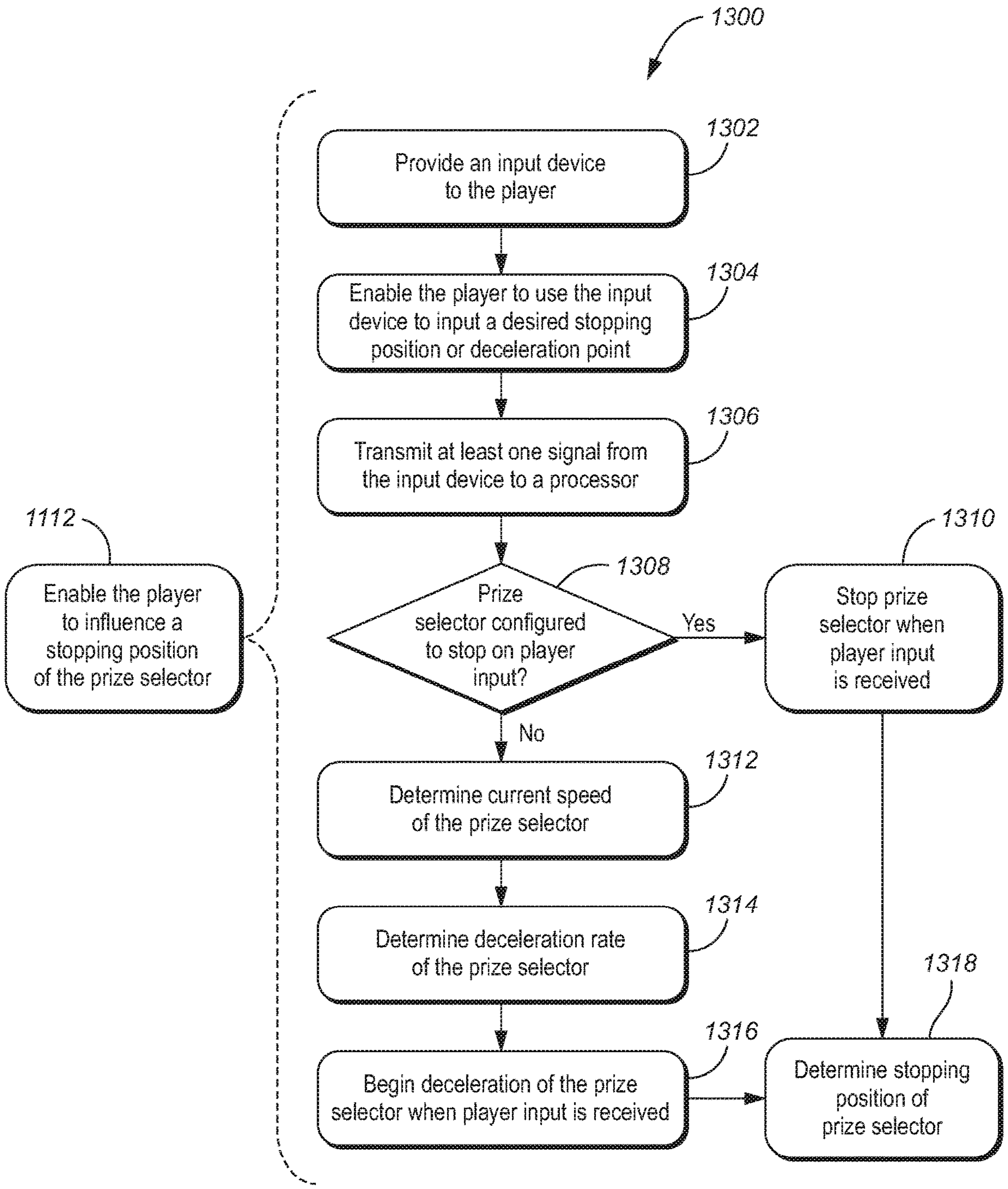
FIG. 13 is a flow diagram of a method of enabling a player to influence a stopping position of a prize selector that may be used with the method shown in FIG. 11.

FIG. 13 is a flow diagram of a method 1300 of enabling a player to influence a stopping position of a prize selector that may be used with one or more gaming devices 114 (shown in FIG. 1). In one embodiment, method 1300 is a more detailed embodiment of step 1112 in which the prize selector is a virtual wheel-based prize selector as described above with reference to FIG. 11.

In one embodiment, method 1300 is performed by one or more processors 304 of one or more computing devices 300 executing instructions stored within one or more computer-readable memories, such as memory device 306. For example, method 1300 may be implemented by processor 304 of a gaming device 114, WAP server 120, local server 110, accounting system 128, and/or by any other suitable device.

In one embodiment, an input device is provided 1302 to the player to facilitate enabling the player to operate the prize selector. For example, the input device may include a button, a touch screen interface of a tablet computing device or of gaming device 114, or another suitable input device 716 (shown in FIG. 7A or 7B). The player is enabled 1304 to use the input device to input a desired stopping position or deceleration point for the prize selector. The input device transmits 1306 at least one signal representative of the user input to a processor, such as processor 304 of gaming device 114, WAP server 120, local server 110, and/or any other device or system.

If the prize selector is configured 1308 to stop at the time the player input is received, the processor transmits one or more signals to cause the prize selector to stop upon receipt of the signal or signals from the input device. For example, the processor may transmit one or more signals to a display to cause the display to show the prize selector in a stopped position when the signal or signals are received from the input device.

Alternatively, if the prize selector is not configured to stop at the time the player input is received, the processor may determine 1312 a current speed of the prize selector in preparation for slowing down the prize selector. The current speed may be determined to be the initial speed at which the wheel is spun or rotated as described above with reference to FIG. 12. In such an embodiment, the processor may determine the current speed at a time substantially simultaneously with the initial spin of the wheel. Alternatively, the current speed of the prize selector may be determined 1312 to be the initial speed minus a deceleration rate of the wheel multiplied by the number of seconds (or other suitable unit of time) that has elapsed since the wheel was initially spun. It should be recognized that the prize selectors described herein may alternatively or in addition utilize starting or acceleration configurations.

The processor may determine 1314 the deceleration rate of the prize selector (e.g., of the wheel portion of the prize selector described above with reference to FIG. 11). In one embodiment, the processor may assign a constant deceleration rate of 0.5 revolutions per second squared to the wheel. Accordingly, in the example described above in FIG. 12 in which the initial speed of the wheel is 10 revolutions per second, the wheel may come to a stop after about 20 seconds. Alternatively, the processor may assign a random deceleration rate or may add or subtract a random or set value to the constant deceleration rate described above. For example, if the player has a history of achieving high bonus prizes, the processor may adjust the deceleration rate by adding or subtracting a random or set value from the constant deceleration rate to determine an adjusted deceleration rate for the wheel. In such embodiments, the processor may enable the prize selector to be at least partially non-deterministic from the player's perspective and/or may make it more difficult for the player to use skill in achieving a high bonus prize.

The processor may also begin 1316 deceleration of the prize selector when the player input is received (i.e., when the signal or signals representative of the player input is received). In one embodiment, the processor may cause the display to show the prize selector (e.g., the wheel portion of the prize selector) decelerating at the deceleration rate determined above until the wheel stops. For example, the processor may transmit one or more signals to the display, such as display 310 (shown in FIG. 3), to cause display 310 to graphically depict the wheel decelerating at the deceleration rate determined above until the wheel comes to a stop.

The processor may also determine 1318 a stopping position of the prize selector. For example, the processor may identify a starting position of the wheel before the wheel is spun (or the position of the wheel when calculating the current speed of the wheel) and may add an angular distance traveled (described above) to the starting position to determine the angular stopping position of the wheel. The angular stopping position may be adjusted to account for the number of revolutions completed by the wheel in a similar manner as described above with reference to FIG. 10. For example, the angular stopping position may be calculated to be the remainder of the angular distance traveled plus the starting position divided by 360.

Figure 14:
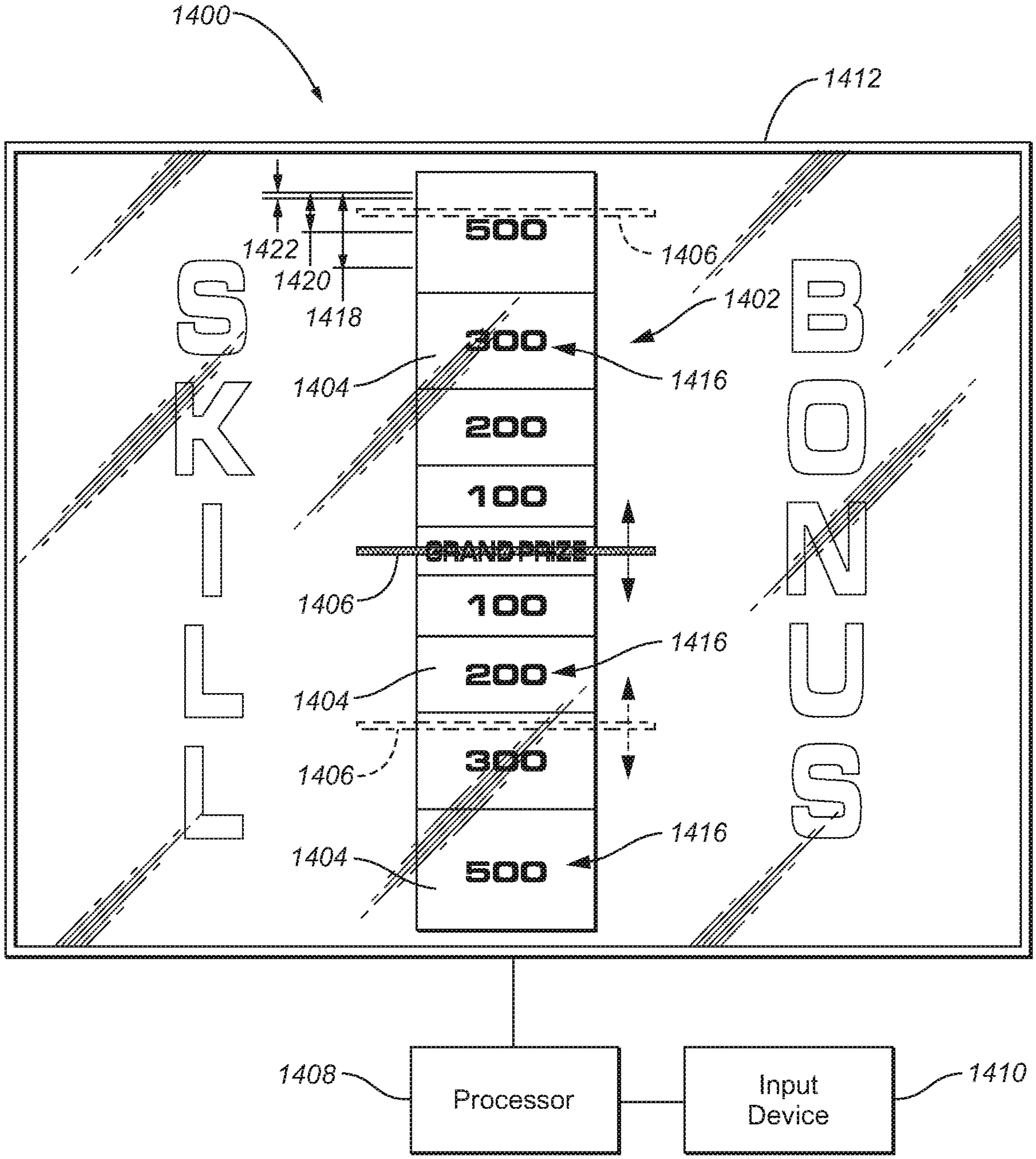
FIG. 14 is a block diagram of an exemplary bar-based prize selector that may be used with the systems and methods described herein.

FIG. 14 is a block diagram of an exemplary bar-based prize selector 1400 that may be used with system 100 (shown in FIG. 1) or system 200 (shown in FIG. 2).

In one embodiment, prize selector 1400 includes a bar graph (or bar) 1402 that is divided into sections 1404, a prize indicator 1406, a processor 1408, and an input device 1410. In one embodiment, prize selector 1400 is operatively connected to, or included within, one or more gaming machines 114, local server 110, WAP server 120, and/or any other suitable device within gaming establishment 102. Prize selector 1400 may be activated by a player by using input device 1410, for example, to initiate an oscillation of prize indicator 1406 and/or prize indicator 1406 (e.g., causing prize indicator 1406 to move back and forth along bar 1402) and/or to cause the oscillation of prize indicator 1406 and/or prize selector 1400 to stop.

It is understood that any of the embodiments described may be operated by stopping the movement of the prize selector 1400, may be operated by starting the movement of the prize selector 1400, may be operated by starting and stopping the movement of the prize selector 1400 or may be operated by starting the movement of the prize selector 1400 while the input device 1410 is pressed or otherwise activated and initiating stopping the movement when the input device 1410 is released. It is also understood the term stop or stopping refers to any stopping or initiation of a slowing movement to ultimately stop the prize selector 1400. Accordingly, the prize selector 1400 may stop instantly, may come to a stop over time, may come to a stop in a predetermined period of time, may come to a stop in a random or semi-random period of time or may come to a stop after a predetermined or semi-predetermined period of time in response to instructions from the processor 1408 which may be based on analyzing the skill level or proficiency of the player.

Such movements may also apply to embodiments where the player activates or starts the movement of the prize selector 1400. It may also be desirable to provide for automated starting or stopping of the prize selector 1400 in the event the player fails to either activate or start the prize selector 1400 for applicable embodiments or if the player fails to either stop or activate the stop process of the prize selector 1400 for applicable embodiments.

Bar 1402 may be implemented as a virtual bar or bar graph displayed on a display 1412. In one embodiment, display 1412 is a display 310 of a computing device 300. Alternatively, bar 1402 may be implemented as a physical bar having a channel 1414 through which a physical prize indicator 1406, such as a ball, may be directed by a player or a device operated by the player. In the example of a physical bar 1402, prize indicator 1406 may gradually slow down due to friction between prize selector 1400 components (e.g., between prize indicator 1406 and bar 1402, for example) after being propelled through channel 1414. In the example of a virtual bar 1402, a display of bar 1402 (e.g., a graphic or image depicting bar 1402) may be displayed as slowing down due to a predetermined algorithm or deceleration rate, for example.

Bar 1402 may include any suitable number of sections 1404 as desired. In the example shown in FIG. 14, 10 sections 1404 are shown with varying sizes. One or more prizes 1416 may be associated with each section 1404 such that when a player selects a section 1404 (or a selection is made for the player), the prize 1416 (or prizes 1416) associated with the selected section 1404 is awarded to the player. Prizes 1416 may include, for example, a fixed amount of money or credits, a changeable amount of money or credits (e.g., a progressive jackpot), prize multipliers for one or more prizes awarded in a primary game or the like, a physical item such as a car or a retail item, and/or any other suitable prize. In one embodiment, the size of each section 1404 may be adjusted by processor 1408, for example, to adjust the probability of selecting the prize associated with each section. For example, processor 1408 (or another suitable processor or device) may adjust the size of each section 1404 based on the player's gameplay, player's skill level, prize history, wager history, and/or any other suitable factor as described more fully herein.

Prize 1416 may also include a prize indicator 1406 that points to or otherwise indicates a selected section 1404 and/or a prize 1416 associated with a selected section 1404. As illustrated in FIG. 14, prize indicator 1406 may be implemented as a physical or virtual bar, pointer or arrow. Alternatively, prize indicator 1406 may be implemented as a physical or virtual ball, arm, flapper, or may be implemented in any other suitable manner as desired.

Processor 1408 may be used to control the operation of prize selector 1400. For example, processor 1408 may determine one or more characteristics of bar 1402 and/or prize indicator 1406, such as the position, oscillation speed, oscillation acceleration or deceleration, and/or a distance traveled by prize indicator 1406. Processor 1408 may also determine a speed to oscillate prize indicator 1406 or another suitable portion of prize selector 1400. Processor 1408 may then transmit one or more signals to display 1412 to cause display 1412 to show prize indicator 1406 oscillating at a desired speed. Processor 1408 may also transmit one or more signals to display 1412 to cause display 1412 to show prize indicator 1406 slowing down and/or stopping at a desired deceleration rate, for example. Processor 1408 may also determine the stopped or stopping position of prize indicator 1406 and to determine which section 1404 and/or prize 1416 is pointed to by prize indicator 1406. For example, processor 1408 may reference a look-up-table or a database (not shown) to correlate the stopping position of prize indicator 1406 with the section 1404 and/or prize 1416 associated with the stopping position. In one embodiment, processor 1408 is a processor 304 of a specialized or specific computing device 300, such as a gaming device 114, local server 110, WAP server 120, or any other suitable device or system.

In one embodiment, prize selector 1400 includes an input device 1410 that is operable by a player and/or a gaming establishment employee. Input device 1410 may be activated to initiate the oscillation of prize indicator 1406, to stop prize indicator 1406 at a desired time or position, and/or to initiate a deceleration of prize indicator 1406 (or another suitable component of prize selector 1400). For example, the player may activate or use input device 1410 to start the oscillation of prize indicator 1406. Input device 1410 may then transmit one or more signals to processor 1408 indicating that the player has activated or used input device 1410. Processor 1408 may transmit one or more signals to display 1412 to cause display 1412 to show prize indicator 1406 oscillating at a constant or variable speed as described herein.

The player may also activate or use input device 1410 to stop or initiate a slowdown of prize indicator 1406 after prize indicator 1406 has begun oscillating. Input device 1410 may transmit one or more signals to processor 1408 when the player has activated input device 1410. Processor 1408 may then transmit one or more signals to display 1412 to cause display 1412 to show prize indicator 1406 decelerating at a substantially constant rate or at a variable rate. Additionally or alternatively, processor 1408 may transmit one or more signals to display 1412 to cause display 1412 to show prize indicator 1406 stopping when the player operates input device 1410. When prize indicator 1406 stops, processor 1408 may determine the stopping position of prize indicator 1406 and may identify the section 1404 and/or prize 1416 pointed to by prize indicator 1406 as described above.

In some embodiments, one or more components of prize selector 1400 may be incorporated within multiple devices. For example, input device 1410 may be incorporated within a handheld tablet device or smart phone while bar 1402, prize indicator 1406, and/or other components of prize selector 1400 may be incorporated within a separate gaming device 114, computing device 300, or as a standalone component.

While the foregoing embodiments primarily described implementations of a virtual bar-based prize selector 1400, it should be recognized that a physical prize selector 1400 may be operated in a similar manner as described herein. Accordingly, in a physical implementation of prize selector 1400, prize indicator 1406 may be a ball that is propelled through channel 1414 of bar 1402 by an input device, such as a spring-loaded launcher or plunger. The ball may travel back and forth through bar 1402, bouncing off of each end of channel 1414 until coming to a stopping position within channel 1414. Processor 1408 may receive signals from a sensor (not shown) or the like to determine the stopping position of the ball to determine the prize won by the player.

In one embodiment, a size and/or an accuracy range or requirement may be adjusted for prize selector 1400 and/or prize indicator 1406. More specifically, the size of each section 1404 and/or for prize indicator 1406 may be adjusted by processor 1408, for example, to adjust the probability of selecting the prize associated with each section. For example, processor 1408 (or another suitable processor or device) may adjust the size of each section 1404 based on the player's gameplay, player skill level, prize history, wager history, and/or any other suitable factor. It should be recognized that processor 1408 may display sections 1404 in any size, i.e., equal sections, but may process sections 1404 differently internally, i.e., high prizes may appear equal on bar 1402 or another suitable display but be treated as smaller by processor 1408 to bias bar 1402 toward prizes of a lesser amount. In one embodiment shown in FIG. 14, a section 1404 associated with a grand prize may be adjusted to be a first or increased size 1418, a second or normal size 1420, or a third or reduced size 1422. These sizes may represent accuracy ranges (e.g., first accuracy range 1418, second accuracy range 1420, and third accuracy range 1422) within which a player must stop prize selector 1400 (or prize indicator 1406) to achieve the desired prize 1416. The first size or accuracy range 1418 may be used for players having a low amount of skill or a low skill level, the second size or accuracy range 1420 may be used for players having a normal or average amount of skill or skill level, and the third size or accuracy range 1422 may be used for players having a high amount of skill or a high skill level. It should be recognized that any suitable section 1404 may be adjusted to be any size rather than being limited to three sizes as shown in FIG. 14.

The player's skill level may be determined, for example, based on a history of prizes won by the player, and/or based on any other suitable criterion. In one example, the player's skill level may be a value between 1 and 10. Alternatively, the player's skill level may be a value between 1 and 100 or any other suitable range. Each section size may be associated with different player skill levels or ranges of player skill levels to facilitate normalizing bonus prizes won by players and/or to encourage less skilled players to keep playing to win larger bonus prizes. For example, in an embodiment where player skill levels range from 1 to 10, with 1 representing a player having very low skill and 10 representing a player having very high skill, the first or increased size 1418 may be associated with player skill levels 1-3, the second or normal size 1420 may be associated with player skill levels 4-6, and the third or reduced size 1422 may be associated with player skill levels 7-10. Alternatively, any suitable skill level or range of skill levels may be associated with any suitable section 1404 and/or section size as desired.

In one embodiment, the player skill level may be set to an initial value until the player's prize history is developed sufficiently to adjust the skill level to a more suitable value. For example, if the player skill level range is between 1 and 10 described above, each player with an unknown player skill may have their player skill level set to 8, or any other suitable value, as described above with reference to FIG. 7B.

A player's prize history and skill level may be monitored and updated, for example, during the entire gameplay at a particular gaming device 114 (e.g., for a player who does not use a player reward card or the like). Additionally or alternatively, the player's prize history and skill level may be monitored and updated during any suitable period, such as 1 game or play session on gaming device 114, 1 day, 1 week, 1 month, and/or 1 year. As a result, the player's prize history and skill can be tracked and updated for both carded play (i.e., using a player reward card or the like) and uncarded play (i.e., without using a player reward card or the like).

In one embodiment, to maintain an expected level of profitability for games associated with prize selector 1400, one or more prizes 1416 and sizes of the section 1404 associated with each prize 1416 may be adjusted based on the player skill level to maintain a predetermined return-to-player (RTP) percentage or value, or a predetermined RTP range as described above with reference to FIG. 7B.

In one embodiment, a gaming establishment may determine a maximum RTP value that may be realized over time with respect to a game associated with prize selector 1400. For example, a gaming establishment may set a maximum RTP value of 0.98 to ensure that, on average, the gaming establishment will retain about 2% of money wagered. In such an embodiment, the gaming establishment may adjust the value of one or more prizes 1416 displayed on prize selector 1400 and/or a size of one or more sections 1404 of prize selector 1400 to ensure that the amount contributed by prize selector 1400 to the overall RTP of a game is less than or equal to the maximum RTP. For example, if the primary game has an RTP value of 0.90, the RTP amount of the bonus awarded through prize selector 1400 may be limited to a range of 0 to 0.08. The RTP amount of the bonus awarded through prize selector 1400 may factor in the probability of triggering a bonus round that includes spinning or otherwise activating prize selector 1400.

The monitoring, determining, and adjustment of the player skill and the RTP of prize selector 1400 (including the adjustment of prizes 1416 and section sizes) may be performed by one or more processors of gaming device 114, local server 110, WAP server 120, and/or any other suitable system or device.

In one embodiment, an adjustment to a player's skill level and/or an adjustment to the size of one or more sections 1404 may be adjusted quickly to prevent a highly skilled player taking over for the bonus portion of a lower skilled player's game. For example, if a player has a relatively stable skill level and gaming device 114, local server 110, WAP server 120, or another suitable system or device determines that a bonus prize associated with prize selector 1400 has been selected with greater skill than is consistent with the player's history, the player's skill level may be adjusted to a higher level and/or the size of one or more sections 1404, such as a section 1404 associated with a grand prize, may be adjusted to be a smaller size consistent with a higher player skill level.

While the embodiments described herein have focused on adjusting a size of one or more sections 1404 based on a determined player skill level (sometimes referred to as adjusting an accuracy requirement), a speed at which prize selector 1400 is oscillated (i.e., bar 1402 portion of prize selector 1400) may be adjusted based on the player's skill level in addition to, or instead of, the adjustment to the size of one or more sections 1404. Adjusting the player-influenced speed or accuracy requirement in response to the player's skill level may occur at any time including before the start of a game, during the game, or following the conclusion of a game.

Figure 15:
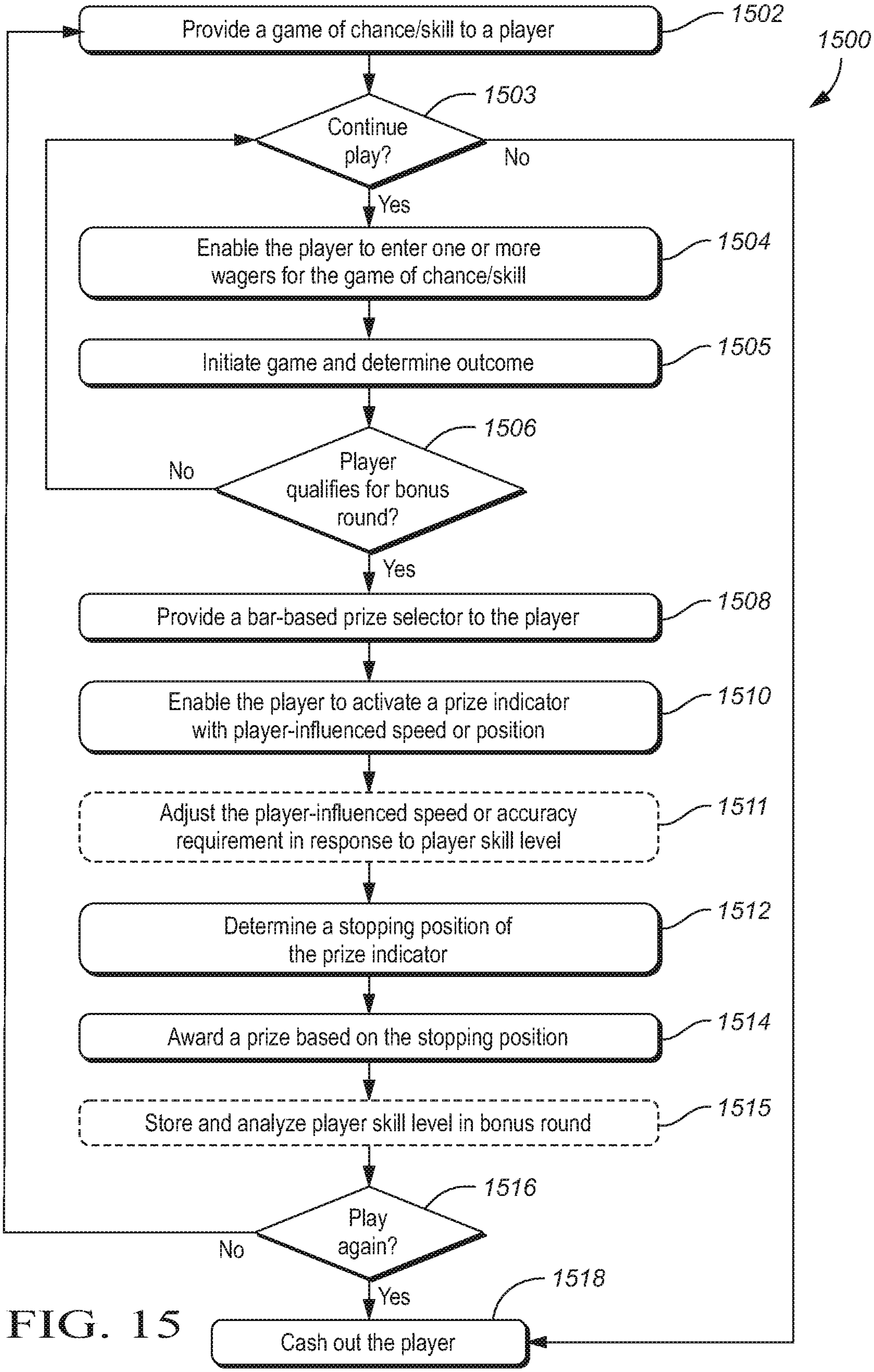
FIG. 15 is a flow diagram of a method of selecting a prize that may be used with the bar-based prize selector shown in FIG. 14.

FIG. 15 is a flow diagram of a method 1500 of selecting a prize that may be used with one or more gaming devices 114 (shown in FIG. 1).

In one embodiment, method 1500 is performed by one or more processors 304 of one or more computing devices 300 executing instructions stored within one or more computer-readable memories, such as memory device 306. For example, method 1500 may be implemented by processor 304 of a gaming device 114, WAP server 120, local server 110, accounting system 128, and/or by any other suitable device.

During operation of method 1500, one or more games of chance and/or skill are provided 1502 to a player on a gaming device 114, for example. The games of chance and/or skill may include, without limitation, video reel slots, video poker, sports betting or sport book games, bingo or bingo-related games, keno or keno-related games, and/or any other games of chance and/or skill. The game or games may be displayed to the player, for example, on one or more displays 310 of gaming device 114.

Once one or more games of chance and/or skill are provided 1502 to a player on a gaming device 114, the player may continue 1503 to play or alternatively cash out the player as described below. The player is enabled 1504 to enter one or more wagers for the game. For example, the player may enter one or more wagers through user interface device 312 of gaming device 114. The wagers entered by the player may be tracked by gaming device 114, by accounting system 128, and/or by any other suitable device or system. For example, the amount of money or credits wagered by the player may be tracked by a wagering meter included within gaming device 114, accounting system 128, and/or any other suitable system or device. In one embodiment, an amount of credits wagered by the player is deducted from a credit balance of the player.

The game is initiated and an outcome for the game is determined 1505. For example, in one embodiment, symbols or other indicia are selected during the game. If a winning outcome is determined (e.g., if the indicia satisfy a winning criterion), the player may be awarded a prize for the game.

As the player plays the game, gaming device 114 determines 1506 whether the player qualifies for a bonus round. Additionally or alternatively, WAP server 120, local server 110, and/or any other suitable system or device determines 1506 whether the player qualifies for the bonus round. The player may qualify for the bonus round by satisfying a winning criterion in a primary game or by satisfying a bonus criterion in the primary game, for example. The winning criterion may include, for example, matching a predetermined pattern of indicia in a reel-type or video bingo game, matching a predetermined number of indicia in a video keno game, achieving a predetermined hand rank in a video poker game, and/or any other suitable criterion. The bonus criterion may include, for example, receiving a predetermined number of bonus indicia in the game, matching a predetermined number of indicia during the game, matching a predetermined pattern of indicia in the game, and/or any other suitable criterion.

If the player is determined to not be eligible for the bonus round, another game of chance may be provided 1502 to the player. However, if the player is determined to be eligible for the bonus round, a bar-based prize selector, such as prize selector 1400 (shown in FIG. 14), may be provided 1508 to the player in one embodiment. While the following embodiment is described with reference to a bar-based prize selector, it should be recognized that any suitable prize selector may be provided to the player.

In one embodiment, the player is enabled 1510 to activate the prize selector with a player-influenced speed or a player-influenced activation position or location (i.e., a point at which the player either activates a stop function of the already oscillating bar-based prize selector or starts the oscillation of the bar-based prize selector). For example, in one embodiment, the player may operate an input device, such as a button, a touch screen interface of a tablet computing device or of gaming device 114, or another suitable input device 1410 (shown in FIG. 14), to cause a prize indicator of the prize selector to oscillate based on a characteristic of the player's input. For example, the input device may be a button that the player holds down and releases after a player-determined amount of time. The amount of time that the player holds down the button may influence the speed at which the prize indicator is oscillated. In another embodiment, the input device may be a touch screen that the player "swipes" (i.e., drags his or her finger across to register an input), with the length and/or speed of the swipe influencing the speed at which the prize indicator is oscillated. In embodiments in which the player operates the input device to oscillate a virtual prize indicator, it should be recognized that a processor, such as processor 304 (shown in FIG. 3), may calculate or determine the player-influenced speed and cause a display, such as display 310, to display the prize indicator oscillating at the player-influenced speed.

It should be recognized that the player-influenced speed refers to an initial speed at which the prize indicator oscillates. After the player initiates the oscillation of the prize indicator, the prize indicator may be displayed as decelerating according to a deceleration rate controlled by a processor or controller, for example.

In one embodiment, the player-influenced speed may be adjusted 1511, for example, by a processor in response to a skill level associated with the player as described above with reference to FIG. 7B. Additionally or alternatively, an accuracy requirement (described above with reference to FIG. 7B) may be adjusted 1511 in response to the player skill level. For example, as illustrated in FIG. 14, varying accuracy ranges or requirements may be provided in order for the player to achieve the highest value prize shown on prize selector 1400. As an example, a first time or average player would need to trigger in the second range 1420 to achieve the top prize. A highly skilled player needs to trigger in the third range 1422 and the highly unskilled needs to trigger in the first range 1418. The system may monitor the skill level of players using a player's reward card or the like over time, e.g., 2 plays, 1 play session, 1 week, 1 year, etc., and adjust accordingly or those players not using a players card for shorter periods. It is understood that the size and position of the first range 1418, second range 1420 and third range 1422 may vary and the size and position of the ranges shown in FIG. 14 are for reference purposes only. Adjusting the player-influenced speed or accuracy requirement in response to the player skill level 1511 may occur at any time including before the start of a game, during the game on following the conclusion of a game.

In any of the embodiments described, adjustments to compensate for player skill level may alternatively be made by adding randomness to the prize selector accuracy either as the sole means of adjustment or in combination with the adjustment means described. For example, a position or angular range to achieve a specific prize may be within a 4 degree range between 358 degrees and 2 degrees on a prize wheel. For an unskilled player the range may be maintained within a 4 degree range between 358 degrees and 2 degrees on a prize wheel. As the player skill level increases, a random number generator will add randomness via the processor to compensate. Accordingly, while the range remains the same at 4 degrees, the angular range may shift to 348 degrees to 352 degrees on the prize wheel or alternatively 6 degrees to 10 degrees. Any range may be utilized for the randomized adjustments. Alternatively, adjustments for the highly skilled player may be made by a combination or accuracy and randomness. For example, a position or angular range to achieve a specific prize may be within a 4 degree range between 358 degrees and 2 degrees on a prize wheel. For an unskilled player the range may be maintained within a 4 degree range between 358 degrees and 2 degrees on a prize wheel but for the skilled player the range may decrease to 2 degrees and may randomly angularly shift, i.e., 5 degrees counterclockwise or 3 degrees clockwise. It is understood that similar mechanisms may be utilized with any embodiments described herein. After the player has activated the prize selector to oscillate the prize indicator, a stopping position of the prize indicator is determined 1512 by processor 1408, for example. In some embodiments, the stopping position may be defined as the position on the bar pointed to by the prize indicator when the prize indicator is stopped.

The position at which the prize selector is stopped is determined 1512 by the processor in some embodiments. In an embodiment in which the bar-based prize selector includes a virtual prize indicator, the processor may determine 1512 the stopping position of the prize indicator based on a calculation of the initial speed of the prize indicator and the deceleration rate of the prize indicator.

A prize may be awarded 1514 based on the determined stopping position of the prize indicator. For example, if the stopping position of the prize indicator is associated with a particular prize, the player may be awarded the prize associated with the stopping position. The prize may be selected based on an associated pay table, or the prize selector may display the prize to be won for each stopping position, for example. While the foregoing embodiment has been described in which the prize is a bonus prize, it should be recognized that any suitable prize may be awarded 1514 during operation of method 1500. After 1 or more bonus rounds, the system may optionally store, analyze, and/or update 1515 the player skill level in the bonus round.

The player may be presented with an option 1516 to play the game of chance again, or to play another game of chance. If the player chooses to play again, method 1500 returns to providing 1502 a game of chance to the player. If the player does not want to play another game of chance, the player may cash out 1518 of gaming device 114. The player may receive a ticket or voucher representing the funds remaining in the player's credit balance, or may receive currency from a bill or coin dispenser representative of the amount remaining in the player's credit balance. Alternatively, the player may receive an electronic fund transfer of the remaining credit balance into an account of the player at a financial institution, for example.

Figure 16:
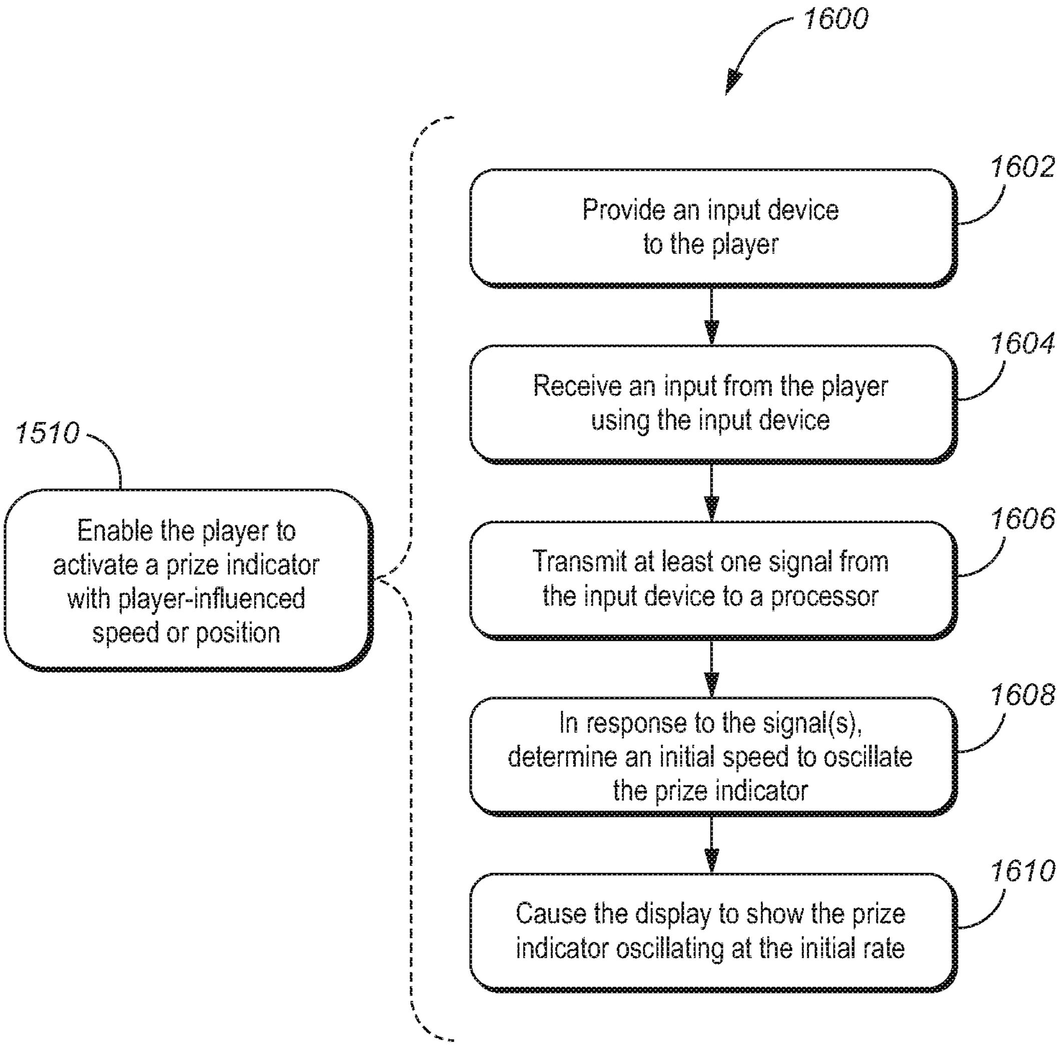
FIG. 16 is a flow diagram of a method of enabling a player to activate a prize indicator with a player-influenced speed that may be used with the method shown in FIG. 15.

FIG. 16 is a flow diagram of a method 1600 of enabling a player to activate a prize indicator with a player-influenced speed and/or activation position or location that may be used with one or more gaming devices 114 (shown in FIG. 1). In one embodiment, method 1600 is a more detailed embodiment of step 1510 in which the prize selector is a virtual bar-based prize selector as described above with reference to FIG. 15.

In one embodiment, method 1600 is performed by one or more processors 304 of one or more computing devices 300 executing instructions stored within one or more computer-readable memories, such as memory device 306. For example, method 1600 may be implemented by processor 304 of a gaming device 114, WAP server 120, local server 110, accounting system 128, and/or by any other suitable device.

In one embodiment, an input device is provided 1602 to the player to facilitate enabling the player to operate the prize selector for the bonus round. For example, the input device may include a button, a touch screen interface of a tablet computing device or of gaming device 114, or another suitable input device 1410 (shown in FIG. 14). An input may then be received 1604 from the player using the input device. The input device transmits 1606 at least one signal representative of the user input to a processor, such as processor 304 of gaming device 114, WAP server 120, local server 110, and/or any other device or system.

In response to the signal or signals received from the input device, the processor determines 1608 an initial speed to oscillate the prize indicator. For example, the input device may be a button that the player holds down and releases after a player-determined amount of time. The processor may then determine the initial speed to oscillate the prize indicator based on the amount of time the player holds down the button. For example, in one embodiment, the processor may assign a base speed of 1 oscillation per second (i.e., one complete traversal from a first end of the bar to an opposing second end of the bar and back to the first end of the bar) and may determine the initial speed to be equal to the base speed multiplied by a multiplier value that is equal to the number of seconds the player holds the button. The processor may set the initial speed equal to a minimum speed of 1 oscillation per second in case the player does not hold the button down for a full second, and may set the initial speed equal to a maximum speed of 10 oscillations per second in case the player holds down the button for longer than 10 seconds. These examples are illustrative only, and any suitable base speed, multiplier value, minimum speed, and/or maximum speed may be used as desired. Additionally, the processor may not assign a minimum speed or maximum speed, and/or may use a different calculation to determine the initial speed to oscillate the prize indicator.

In another embodiment, the input device may be a touch screen that the player "swipes" (i.e., drags his or her finger across to register an input), with the length and/or speed of the swipe influencing the speed at which the prize indicator is oscillated. The processor may then determine the initial speed to oscillate the prize indicator based on the amount of time, the distance, and/or the speed at which the player swipes his or her finger across the screen. For example, in one embodiment, the processor may assign a base speed of 1 oscillation per second and may determine the initial speed to be equal to the base speed multiplied by a multiplier value that is equal to the number of inches the player swipes his or her finger across the screen. The processor may set the initial speed equal to a minimum speed of 1 oscillation per second in case the player's finger does not travel a full inch, and may set the initial speed equal to a maximum speed of 10 oscillations per second in case the player's finger travels more than 10 inches. These examples are illustrative only, and any suitable base speed, multiplier value, distance, minimum speed, and/or maximum speed may be used as desired. Additionally, the processor may not assign a minimum speed or maximum speed, and/or may use a different calculation to determine the initial speed to oscillate the prize indicator.

In the embodiments described herein, the processor may also adjust the initial speed by a value based on the player's gameplay or prize history. For example, if the player has a history of achieving high bonus prizes, the processor may add or subtract a random or set value from the initial speed to determine an adjusted initial speed to oscillate the prize indicator. In such embodiments, the processor may enable the prize indicator and/or prize selector to be at least partially non-deterministic from the player's perspective and/or may make it more difficult for the player to use skill in achieving a high bonus prize.

The processor may cause 1610 a display to show the prize indicator oscillating at the initial speed. For example, the processor may transmit one or more signals to a display, such as display 310 (shown in FIG. 3), to cause display 310 to graphically depict the prize indicator oscillating at the initial speed determined above.

Figure 17:
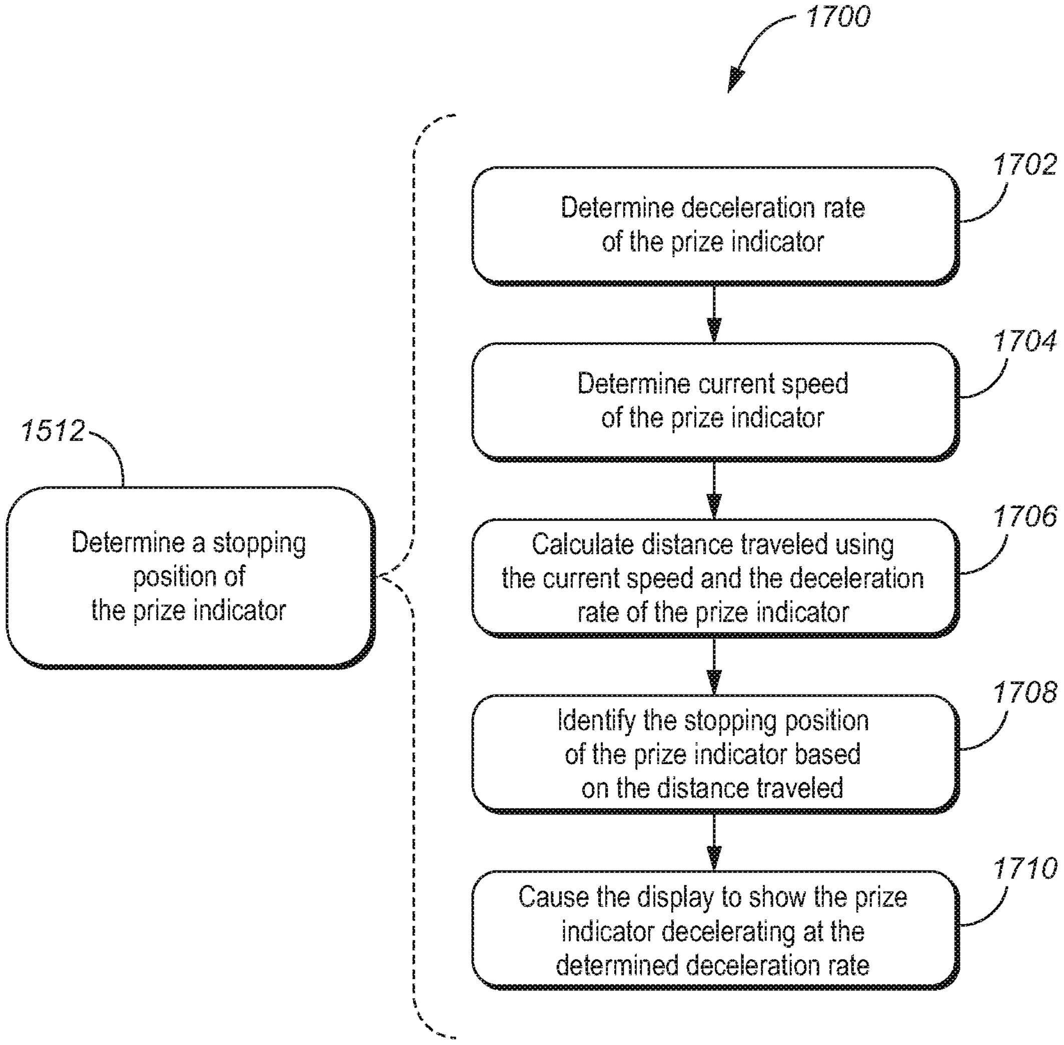
FIG. 17 is a flow diagram of a method of determining a stopping position of a prize indicator that may be used with the method shown in FIG. 15.

FIG. 17 is a flow diagram of a method 1700 of determining a stopping position of a prize indicator that may be used with one or more gaming devices 114 (shown in FIG. 1). In one embodiment, method 1700 is a more detailed embodiment of step 1512 in which the prize selector is a virtual bar-based prize selector as described above with reference to FIG. 15.

In one embodiment, method 1700 is performed by one or more processors 304 of one or more computing devices 300 executing instructions stored within one or more computer-readable memories, such as memory device 306. For example, method 1700 may be implemented by processor 304 of a gaming device 114, WAP server 120, local server 110, accounting system 128, and/or by any other suitable device.

During operation of method 1700, a processor, such as processor 304, may determine 1702 a deceleration rate of a prize indicator, such as prize indicator 1406 (shown in FIG. 14). In one embodiment, the processor may assign a constant deceleration rate of 0.5 oscillations per second squared to the prize indicator. Accordingly, in the example described above in FIG. 16 in which the initial speed of the prize indicator is between 1 and 10 oscillations per second, the prize indicator may come to a stop after between 2 and 20 seconds. Alternatively, the processor may assign a random deceleration rate or may add or subtract a random or set value to the constant deceleration rate described above. For example, if the player has a history of achieving high bonus prizes, the processor may adjust the deceleration rate by adding or subtracting a random or set value from the constant deceleration rate to determine an adjusted deceleration rate for the prize indicator. In such embodiments, the processor may enable the prize indicator and/or prize selector to be at least partially non-deterministic from the player's perspective and/or may make it more difficult for the player to use skill in achieving a high bonus prize.

The processor may also determine 1704 a current speed of the prize indicator. The current speed may be determined to be the initial speed at which the prize indicator is oscillated as described above with reference to FIG. 16. In such an embodiment, the processor may determine the current speed at a time substantially simultaneously with the initiated oscillation of the prize indicator. Alternatively, the current speed of the prize indicator may be determined 1704 to be the initial speed minus a deceleration rate of the prize indicator multiplied by the number of seconds (or other suitable unit of time) that has elapsed since the prize indicator was initially activated or the oscillation began.

The processor may also calculate 1706 a distance traveled by the prize indicator until the prize indicator slows to a stop using the initial or current speed and the deceleration rate of the prize indicator according to Eq. 1 described above. For example, if the current speed is 3 oscillations per second, the deceleration rate of the prize selector is 0.5 oscillations per second squared, and the amount of time needed to slow the prize indicator down to a stop is 6 seconds, the processor may calculate the distance traveled to be 9 oscillations (or 18 lengths of the bar or channel).

The processor may also identify 1708 a stopping position of the prize indicator based on the distance traveled by the prize indicator. In one embodiment, the processor may identify a starting position of the prize indicator before the oscillation begins (or the position of the prize indicator when calculating the current speed of the indicator) and may add the distance traveled to the starting position to determine the stopping position of the indicator. If the starting position plus the distance traveled is more than one length of the bar (i.e., more than one length of the channel), the processor may calculate the stopping position to be equal to the remainder of the distance traveled plus the starting position divided by the length of the channel.

In some embodiments, the processor may also cause 1710 the display to show the prize indicator to decelerate at the deceleration rate determined above until the prize indicator stops at the stopping position. For example, the processor may transmit one or more signals to the display, such as display 310 (shown in FIG. 3), to cause display 310 to graphically depict the prize indicator decelerating at the deceleration rate determined above until the prize indicator comes to a stop at the stopping position.

Figure 18:
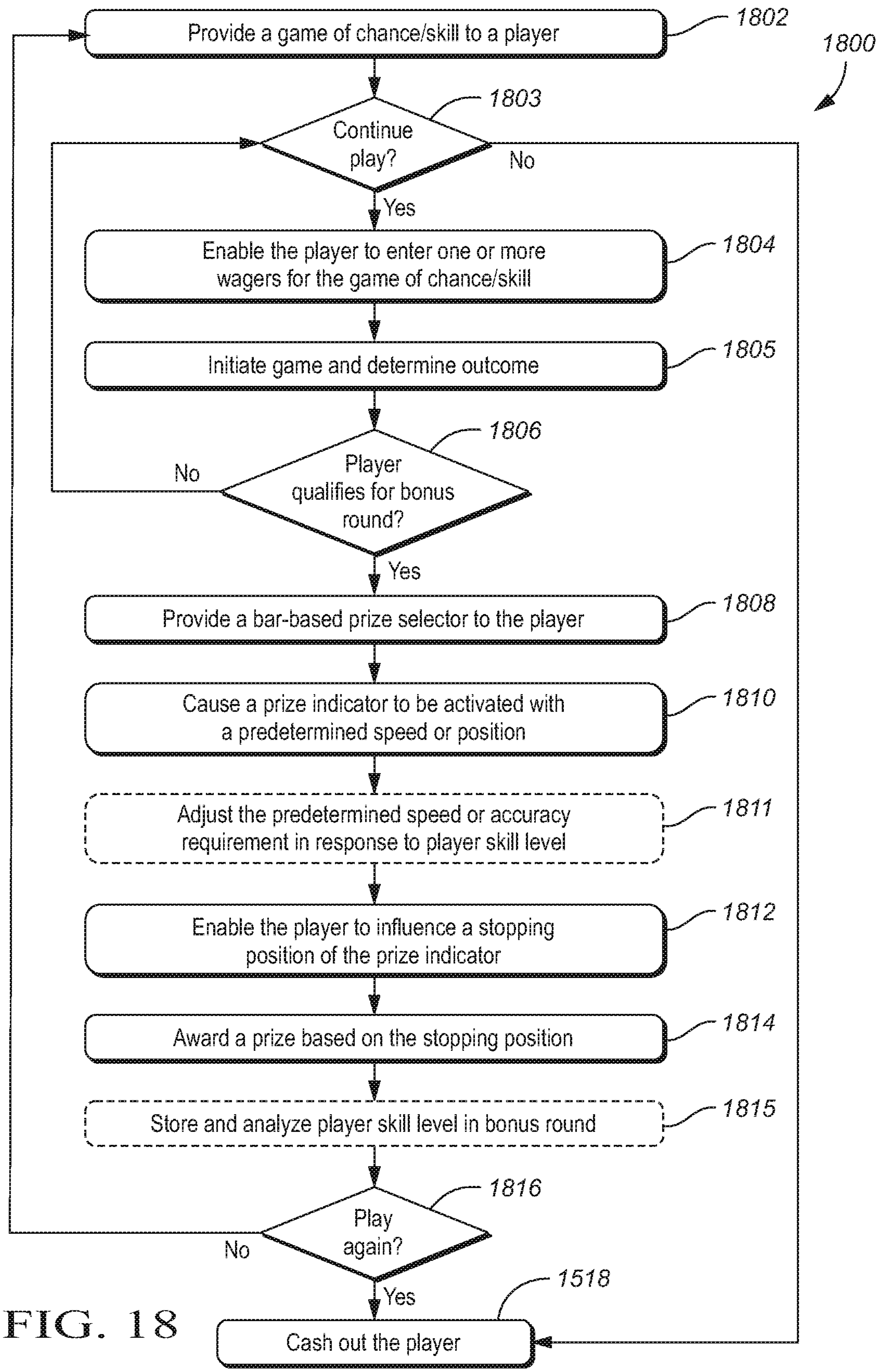
FIG. 18 is a flow diagram of a method of selecting a prize that may be used with the bar-based prize selector shown in FIG. 14.

FIG. 18 is a flow diagram of a method 1800 of selecting a prize that may be used with one or more gaming devices 114 (shown in FIG. 1).

In one embodiment, method 1800 is performed by one or more processors 304 of one or more computing devices 300 executing instructions stored within one or more computer-readable memories, such as memory device 306. For example, method 1800 may be implemented by processor 304 of a gaming device 114, WAP server 120, local server 110, accounting system 128, and/or by any other suitable device.

During operation of method 1800, one or more games of chance and/or skill are provided 1802 to a player on a gaming device 114, for example. The games of chance and/or skill may include, without limitation, video reel slots, video poker, sports betting or sport book games, bingo or bingo-related games, keno or keno-related games, and/or any other games of chance and/or skill. The game or games may be displayed to the player, for example, on one or more displays 310 of gaming device 114.

Once one or more games of chance and/or skill are provided 1802 to a player on a gaming device 114, the player may continue 1803 to play or alternatively cash out the player as described below. The player is enabled 1804 to enter one or more wagers for the game. For example, the player may enter one or more wagers through user interface device 312 of gaming device 114. The wagers entered by the player may be tracked by gaming device 114, by accounting system 128, and/or by any other suitable device or system. For example, the amount of money or credits wagered by the player may be tracked by a wagering meter included within gaming device 114, accounting system 128, and/or any other suitable system or device. In one embodiment, an amount of credits wagered by the player is deducted from a credit balance of the player.

The game is initiated and an outcome for the game is determined 1805. For example, in one embodiment, symbols or other indicia are selected during the game. If a winning outcome is determined (e.g., if the indicia satisfy a winning criterion), the player may be awarded a prize for the game.

As the player plays the game, gaming device 114 determines 1806 whether the player qualifies for a bonus round. Additionally or alternatively, WAP server 120, local server 110, and/or any other suitable system or device determines 1806 whether the player qualifies for the bonus round. The player may qualify for the bonus round by satisfying a winning criterion in a primary game or by satisfying a bonus criterion in the primary game, for example. The winning criterion may include, for example, matching a predetermined pattern of indicia in a reel-type or video bingo game, matching a predetermined number of indicia in a video keno game, achieving a predetermined hand rank in a video poker game, and/or any other suitable criterion. The bonus criterion may include, for example, receiving a predetermined number of bonus indicia in the game, matching a predetermined number of indicia during the game, matching a predetermined pattern of indicia in the game, and/or any other suitable criterion.

If the player is determined to not be eligible for the bonus round, another game of chance may be provided 1802 to the player. However, if the player is determined to be eligible for the bonus round, a bar-based prize selector, such as prize selector 1400 (shown in FIG. 14), may be provided 1808 to the player in one embodiment. While the following embodiment is described with reference to a bar-based prize selector, it should be recognized that any suitable prize selector may be provided to the player.

In one embodiment, the processor causes 1810 the prize selector to be activated with a predetermined speed. In embodiments in which the prize selector includes a virtual bar and prize indicator, the processor may transmit one or more signals to a display, such as display 310 (shown in FIG. 3), to cause the display to display the prize indicator oscillating at the predetermined speed. In one embodiment, the predetermined speed is about 10 oscillations per second. Alternatively, any suitable speed may be used for the predetermined speed.

In one embodiment, the predetermined speed may be adjusted 1811, for example, by a processor in response to a skill level associated with the player as described above with reference to FIG. 7B. Additionally or alternatively, an accuracy requirement (described above with reference to FIG. 7B) may be adjusted 1811 in response to the player skill level.

When the prize indicator is oscillating at the predetermined speed, the player is enabled 1812 to influence a stopping position of the prize indicator. For example, the player may operate an input device, such as a button, a touch screen interface of a tablet computing device or of gaming device 114, or another suitable input device 1410 (shown in FIG. 14), to cause the prize indicator to stop oscillating or to begin slowing down to until the prize indicator stops at the stopping position. In embodiments in which the player operates the input device to influence the stopping position of a virtual prize selector, it should be recognized that a processor, such as processor 304 (shown in FIG. 3), may calculate or determine the stopping position and/or a deceleration rate of the prize selector when the player operates the input device. The processor may cause a display, such as display 310, to display the prize selector stopping at the stopping position or may cause the display to display the prize selector slowing down at the deceleration rate when the player operates the input device.

It should be recognized that the player-influenced stopping position refers to a position at which the prize indicator stops as a result of the player operating the input device. In one embodiment, the prize indicator will stop at the player-selected stopping position when the player operates the input device. In another embodiment, the prize indicator will begin decelerating when the player operates the input device and will slow down to a stop at the stopping position.

A prize may be awarded 1814 based on the determined stopping position of the prize indicator. For example, if the stopping position of the prize indicator is associated with a particular prize, the player may be awarded the prize associated with the stopping position. The prize may be selected based on an associated pay table, or the prize selector may display the prize to be won for each stopping position, for example. While the foregoing embodiment has been described in which the prize is a bonus prize awarded in a bonus round, it should be recognized that any suitable prize may be awarded 1814 during operation of method 1800. After 1 or more bonus rounds, the system may optionally store, analyze, and/or update 1815 the player skill level in the bonus round.

The player may be presented with an option 1816 to play the game of chance again, or to play another game of chance. If the player chooses to play again, method 1800 returns to providing 1802 a game of chance to the player. If the player does not want to play another game of chance, the player may cash out 1818 of gaming device 114. The player may receive a ticket or voucher representing the funds remaining in the player's credit balance, or may receive currency from a bill or coin dispenser representative of the amount remaining in the player's credit balance. Alternatively, the player may receive an electronic fund transfer of the remaining credit balance into an account of the player at a financial institution, for example.

Figure 19:
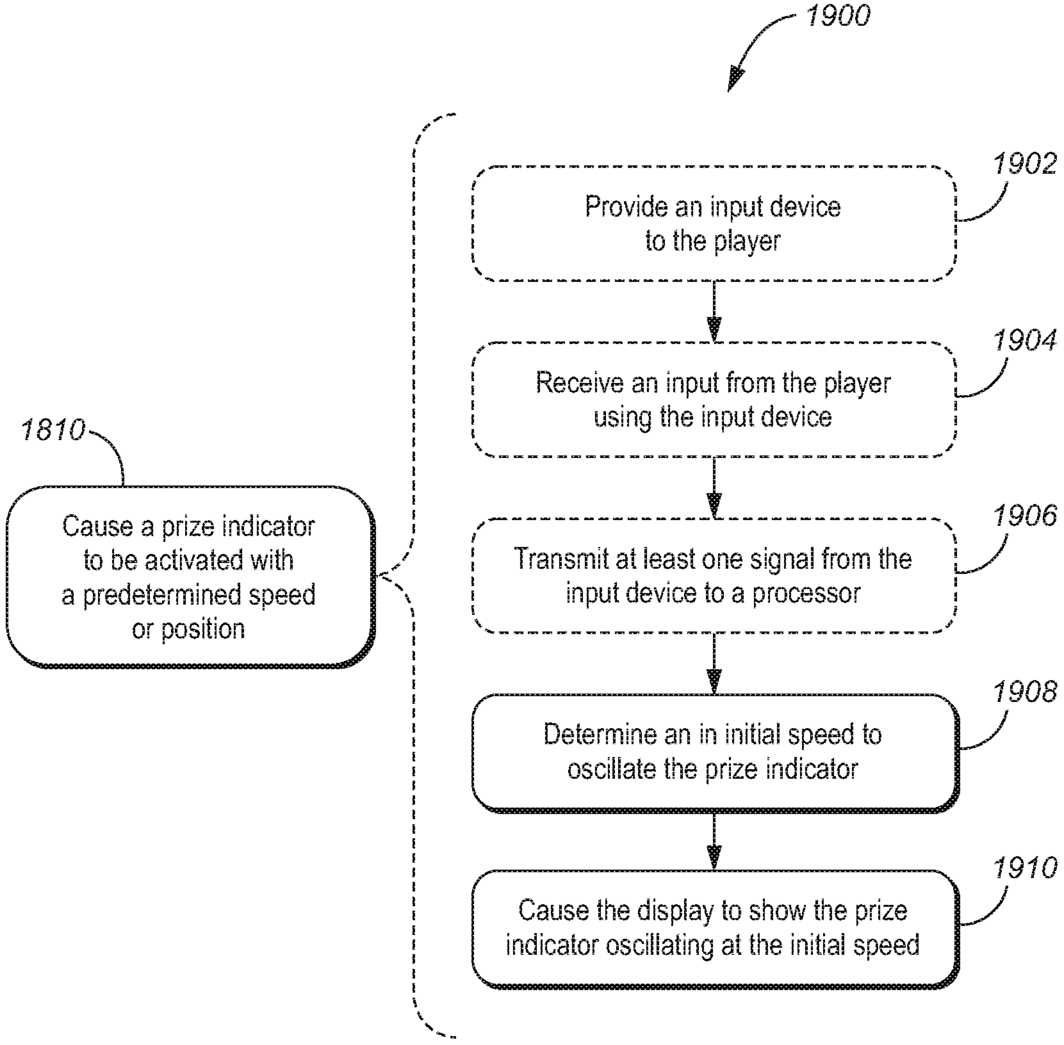
FIG. 19 is a flow diagram of a method of causing a prize indicator to be activated with a predetermined speed that may be used with the method shown in FIG. 18.

FIG. 19 is a flow diagram of a method 1900 of causing a bar-based prize selector to be activated or oscillated with a predetermined speed or activation location that may be used with one or more gaming devices 114 (shown in FIG. 1). In one embodiment, method 1900 is a more detailed embodiment of step 1810 in which the prize selector is a virtual bar-based prize selector as described above with reference to FIG. 18.

In one embodiment, method 1900 is performed by one or more processors 304 of one or more computing devices 300 executing instructions stored within one or more computer-readable memories, such as memory device 306. For example, method 1900 may be implemented by processor 304 of a gaming device 114, WAP server 120, local server 110, accounting system 128, and/or by any other suitable device.

In one embodiment, an input device is provided 1902 to the player to facilitate enabling the player to operate the prize selector for the bonus round. For example, the input device may include a button, a touch screen interface of a tablet computing device or of gaming device 114, or another suitable input device 1410 (shown in FIG. 14). An input may then be received 1904 from the player using the input device to start oscillating the prize indicator at the initial speed. The input device may transmit 1906 at least one signal representative of the user input to a processor, such as processor 304 of gaming device 114, WAP server 120, local server 110, and/or any other device or system. Alternatively, the input device may not be used in method 1900 and the prize indicator may automatically begin oscillating at the initial speed when the player is determined to be eligible for the bonus round, for example.

In response to the signal or signals received from the input device, the processor determines 1908 an initial speed to oscillate the prize indicator. Alternatively, the processor may determine 1908 an initial speed to oscillate the prize indicator without using signals from the input device. For example, in one embodiment, the processor may determine the initial speed to be 10 revolutions per second. This example is illustrative only, and any suitable initial speed may be used as desired.

In the embodiments described herein, the processor may also adjust the initial speed by a value based on the player's gameplay or prize history. For example, if the player has a history of achieving high bonus prizes, the processor may add or subtract a random or set value from the initial speed to determine an adjusted initial speed to oscillate the prize indicator. In such embodiments, the processor may enable the prize selector and/or prize indicator to be at least partially non-deterministic from the player's perspective and/or may make it more difficult for the player to use skill in achieving a high bonus prize.

The processor may cause 1910 a display to show the prize indicator oscillating at the initial speed. For example, the processor may transmit one or more signals to a display, such as display 310 (shown in FIG. 3), to cause display 310 to graphically depict the prize indicator oscillating at the initial speed determined above.

Figure 20:
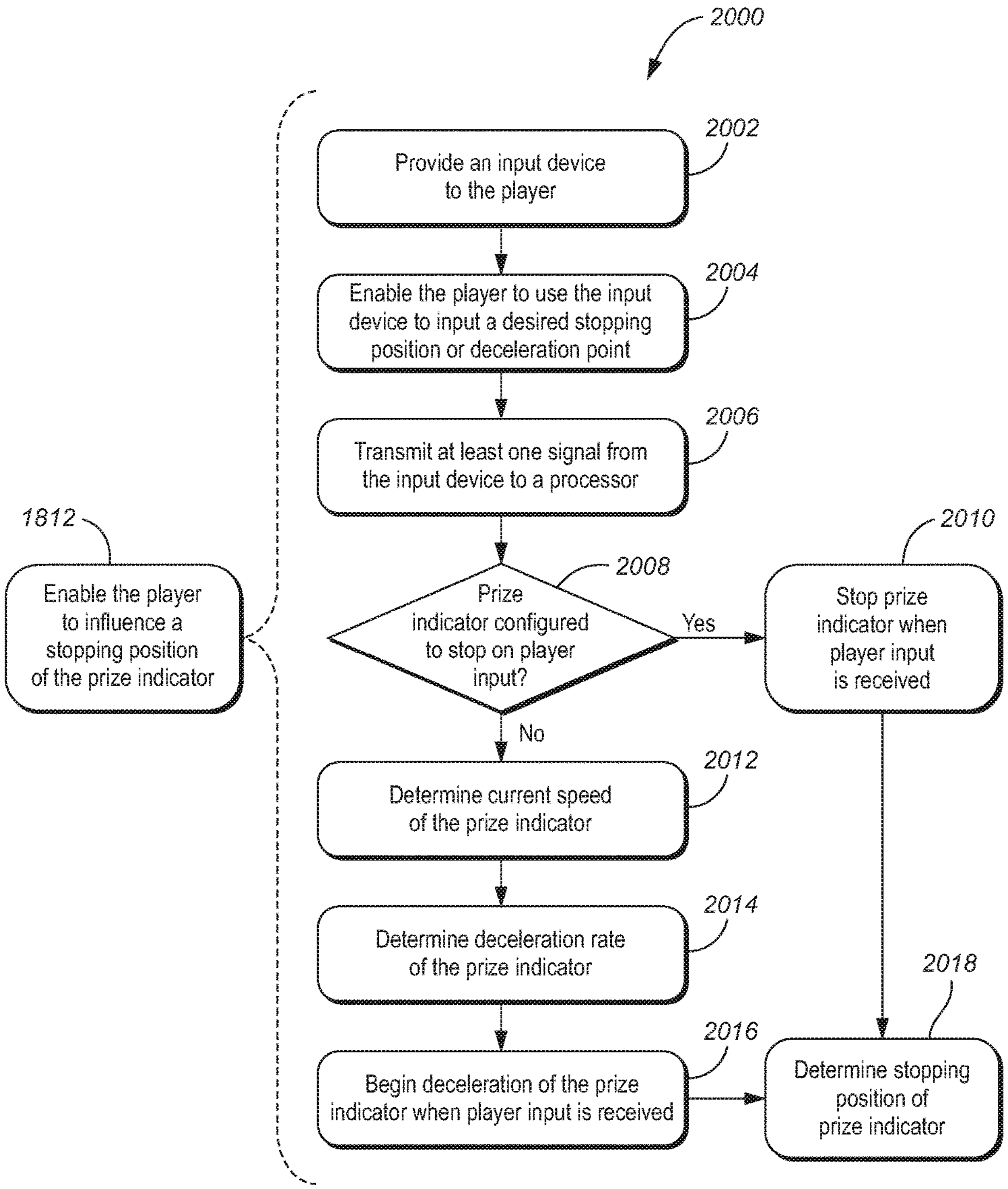
FIG. 20 is a flow diagram of a method of enabling a player to influence a stopping position of a prize indicator that may be used with the method shown in FIG. 18.

FIG. 20 is a flow diagram of a method 2000 of enabling a player to influence a stopping position of a prize selector that may be used with one or more gaming devices 114 (shown in FIG. 1). In one embodiment, method 2000 is a more detailed embodiment of step 1812 in which the prize selector is a virtual bar-based prize selector as described above with reference to FIG. 18.

In one embodiment, method 2000 is performed by one or more processors 304 of one or more computing devices 300 executing instructions stored within one or more computer-readable memories, such as memory device 306. For example, method 2000 may be implemented by processor 304 of a gaming device 114, WAP server 120, local server 110, accounting system 128, and/or by any other suitable device.

In one embodiment, an input device is provided 2002 to the player to facilitate enabling the player to operate the prize selector. For example, the input device may include a button, a touch screen interface of a tablet computing device or of gaming device 114, or another suitable input device 1410 (shown in FIG. 14). The player is enabled 2004 to use the input device to input a desired stopping position or deceleration point for the prize indicator. The input device transmits 2006 at least one signal representative of the user input to a processor, such as processor 304 of gaming device 114, WAP server 120, local server 110, and/or any other device or system.

If the prize indicator is configured 2008 to stop at the time the player input is received, the processor transmits one or more signals to cause the prize indicator to stop 2010 upon receipt of the signal or signals from the input device. For example, the processor may transmit one or more signals to a display to cause the display to show the prize indicator in a stopped position when the signal or signals are received from the input device.

Alternatively, if the prize indicator is not configured to stop at the time the player input is received, the processor may determine 2012 a current speed of the prize indicator in preparation for slowing down the prize indicator. The current speed may be determined to be the initial speed at which the prize indicator is oscillated as described above with reference to FIG. 19. In such an embodiment, the processor may determine the current speed at a time substantially simultaneously with the initiation of the prize indicator oscillation. Alternatively, the current speed of the prize indicator may be determined 2012 to be the initial speed minus a deceleration rate of the indicator multiplied by the number of seconds (or other suitable unit of time) that has elapsed since the oscillation of the prize indicator was begun.

The processor may determine 2014 the deceleration rate of the prize indicator. In one embodiment, the processor may assign a constant deceleration rate of 0.5 oscillations per second squared to the prize indicator. Accordingly, in the example described above in FIG. 19 in which the initial speed of the prize indicator is 10 oscillations per second, the prize indicator may come to a stop after about 20 seconds. Alternatively, the processor may assign a random deceleration rate or may add or subtract a random or set value to the constant deceleration rate described above. For example, if the player has a history of achieving high bonus prizes, the processor may adjust the deceleration rate by adding or subtracting a random or set value from the constant deceleration rate to determine an adjusted deceleration rate for the prize indicator. In such embodiments, the processor may enable the prize selector and/or prize indicator to be at least partially non-deterministic from the player's perspective and/or may make it more difficult for the player to use skill in achieving a high bonus prize.

The processor may also begin 2016 deceleration of the prize indicator when the player input is received (i.e., when the signal or signals representative of the player input is received). In one embodiment, the processor may cause the display to show the prize indicator decelerating at the deceleration rate determined above until the prize indicator stops. For example, the processor may transmit one or more signals to the display, such as display 310 (shown in FIG. 3), to cause display 310 to graphically depict the prize indicator decelerating at the deceleration rate determined above until the indicator comes to a stop.

The processor may also determine 2018 a stopping position of the prize indicator. For example, the processor may identify a starting position of the prize indicator before the oscillation of the prize indicator has begun (or the position of the prize indicator when calculating the current speed of the indicator) and may add a distance traveled (described above) to the starting position to determine the stopping position of the prize selector. If the starting position plus the distance traveled is more than one length of the bar (i.e., more than one length of the channel), the processor may calculate the stopping position to be equal to the remainder of the distance traveled plus the starting position divided by the length of the channel.

Figure 21:
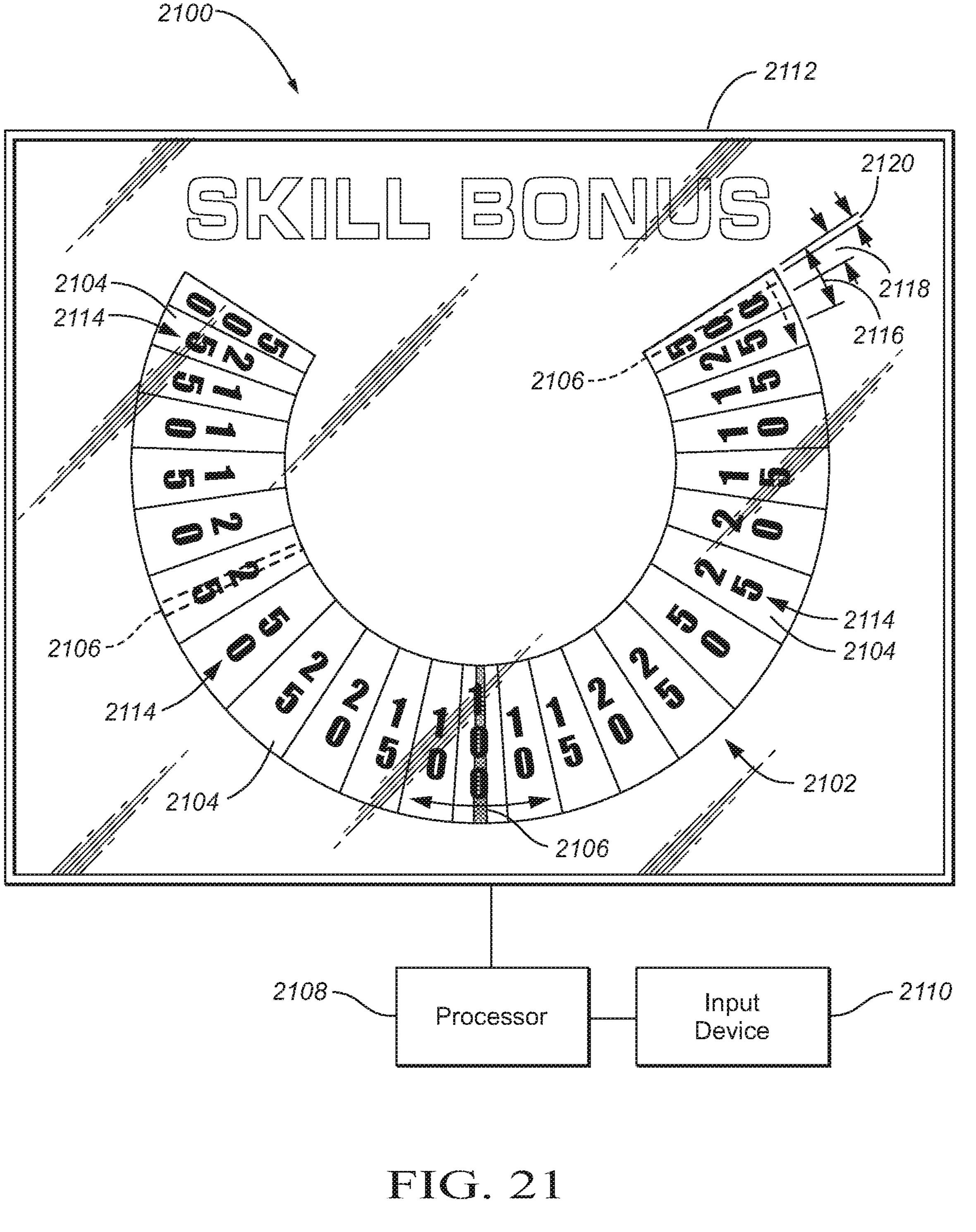
FIG. 21 is a block diagram of an exemplary rotation-based prize selector that may be used with the systems and methods described herein.

FIG. 21 is a block diagram of an exemplary rotation-based prize selector 2100 that may be used with system 100 (shown in FIG. 1) or system 200 (shown in FIG. 2).

In one embodiment, prize selector 2100 includes an arc 2102 that is divided into sections 2104, a prize indicator 2106, a processor 2108, and an input device 2110. In one embodiment, prize selector 2100 is operatively connected to, or included within, one or more gaming machines 114, local server 110, WAP server 120, and/or any other suitable device within gaming establishment 102. Prize selector 2100 may be activated by a player by using input device 2110, for example, to initiate a rotation or oscillation of prize indicator 2106 (e.g., causing prize indicator 2106 to move back and forth along arc 2102) and/or to cause the rotation or oscillation of prize indicator 2106 and/or prize selector 2100 to stop.

It is understood that any of the embodiments described may be operated by stopping the movement of the prize selector 2100, may be operated by starting the movement of the prize selector 2100, may be operated by starting and stopping the movement of the prize selector 2100 or may be operated by starting the movement of the prize selector 2100 while the input device 2110 is pressed or otherwise activated and initiating stopping the movement when the input device 2110 is released. It is also understood the term stop or stopping refers to any stopping or initiation of a slowing movement to ultimately stop the prize selector 2100. Accordingly, the prize selector 2100 may stop instantly, may come to a stop over time, may come to a stop in a predetermined period of time, may come to a stop in a random or semi-random period of time or may come to a stop after a predetermined or semi-predetermined period of time in response to instructions from the processor 2108 which may be based on analyzing the skill level or proficiency of the player. Such movements may also apply to embodiments where the player activates or starts the movement of the prize selector 2100. It may also be desirable to provide for automated starting or stopping of the prize selector 2100 in the event the player fails to either activate or start the prize selector 2100 for applicable embodiments or if the player fails to either stop or activate the stop process of the prize selector 2100 for applicable embodiments.

Arc 2102 may be implemented as a virtual arc displayed on a display 2112. In one embodiment, display 2112 is a display 310 of a computing device 300. Alternatively, arc 2102 may be implemented as a physical arc 2102 having a channel 2114 through which a physical prize indicator 2106, such as a ball, may be directed by a player or a device operated by the player. In the example of a physical arc 2102, prize indicator 2106 may gradually slow down due to friction between prize selector 2100 components (e.g., between prize indicator 2106 and arc 2102, for example) after being propelled through channel 2114. In the example of a virtual arc 2102, a display of arc 2102 (e.g., a graphic or image depicting arc 2102) may be displayed as slowing down due to a predetermined algorithm or deceleration rate, for example.

Arc 2102 may include any suitable number of sections 2104 as desired. In the example shown in FIG. 21, 5 sections 2104 are shown with varying sizes. One or more prizes may be associated with each section 2104 such that when a player selects a section 2104 (or a selection is made for the player), the prize (or prizes) associated with the selected section 2104 is awarded to the player. The prizes may include, for example, a fixed amount of money or credits, a changeable amount of money or credits (e.g., a progressive jackpot), one or more prize multipliers for one or more prizes awarded in a primary game or the like, a physical item such as a car or a retail item, and/or any other suitable prize. In one embodiment, the size of each section 2104 may be adjusted by processor 2108, for example, to adjust the probability of selecting the prize associated with each section. For example, processor 2108 (or another suitable processor or device) may adjust the size of each section 2104 based on the player's gameplay, player skill level, prize history, wager history, and/or any other suitable factor as described more fully herein.

Prize selector 2100 may also include a prize indicator 2106 that points to or otherwise indicates a selected section 2104 and/or a prize (not shown) associated with a selected section 2104. As illustrated in FIG. 21, prize indicator 2106 may be implemented as a physical or virtual pointer or arrow. Alternatively, prize indicator 2106 may be implemented as a physical or virtual ball, arm, flapper, or may be implemented in any other suitable manner as desired.

Processor 2108 may be used to control the operation of prize selector 2100. For example, processor 2108 may determine one or more characteristics of arc 2102 and/or prize indicator 2106, such as the position, rotational speed, rotational acceleration or deceleration, and/or a distance traveled by prize indicator 2106. Processor 2108 may also determine a speed to rotate prize indicator 2106 or another suitable portion of prize selector 2100. Processor 2108 may then transmit one or more signals to display 2112 to cause display 2112 to show prize indicator 2106 rotating at a desired speed. Processor 2108 may also transmit one or more signals to display 2112 to cause display 2112 to show prize indicator 2106 slowing down and/or stopping at a desired deceleration rate, for example. Processor 2108 may also determine the stopped or stopping position of prize indicator 2106 and to determine which section 2104 and/or prize is pointed to by prize indicator 2106. For example, processor 2108 may reference a look-up-table or a database (not shown) to correlate the stopping position of prize indicator 2106 with the section 2104 and/or prize associated with the stopping position. In one embodiment, processor 2108 is a processor 304 of a specialized or specific computing device 300, such as a gaming device 114, local server 110, WAP server 120, or another suitable device or system.

In one embodiment, prize selector 2100 includes an input device 2110 that is operable by a player and/or a gaming establishment employee. Input device 2110 may be activated to initiate the rotation of prize indicator 2106, to stop prize indicator 2106 at a desired time or position, and/or to initiate a deceleration of prize indicator 2106 (or another suitable component of prize selector 2100). For example, the player may activate or use input device 2110 to start the rotation of prize indicator 2106. Input device 2110 may then transmit one or more signals to processor 2108 indicating that the player has activated or used input device 2110. Processor 2108 may transmit one or more signals to display 2112 to cause display to show prize indicator 2106 rotating at a constant or variable speed as described herein.

The player may also activate or use input device 2110 to stop or initiate a slowdown of prize indicator 2106 after prize indicator 2106 has begun rotating. Input device 2110 may transmit one or more signals to processor 2108 when the player has activated input device 2110. Processor 2108 may then transmit one or more signals to display 2112 to cause display 2112 to show prize indicator 2106 rotating at a substantially constant rate or at a variable rate. Additionally or alternatively, processor 2108 may transmit one or more signals to display 2112 to cause display 2112 to show prize indicator 2106 stopping when the player operates input device 2110. When prize indicator 2106 stops, processor 2108 may determine the stopping position of prize indicator 2106 and may identify the section 2104 and/or prize pointed to by prize indicator 2106 as described above.

In one embodiment, prize selector 2100 may initiate the rotation of prize indicator 2106 in a first direction 2116 according to a first operation of input device 2110 and may initiate the rotation in a second direction 2118 different than first direction 2116 according to a second operation of input device 2110. For example, the player may press or hold down a button to cause prize indicator 2106 to begin rotating in first direction 2116 (e.g., clockwise in the example shown in FIG. 21) and may press the button again or release the button (if the button was held down) to cause prize indicator 2106 to switch directions and begin rotating in second direction 2118. In one embodiment, the player may press the button another time to stop prize indicator 2106 from rotating in second direction 2118 such that prize indicator 2106 stops substantially at the same time the player pressed the button. The stopping position in first direction 2116 and the stopping position in second direction 2118 may influence the prize that is awarded to the player in some embodiments. In one embodiment, the combination of the first stopping position and the second stopping position may be used to determine the prize based on a simulated golf club swing or baseball bat swing, for example. For example, the stopping position in first direction 2116 may be used to indicate an accuracy component of the golf club swing or baseball bat swing, while the stopping position in second direction 2118 may be used to indicate a power or strength of the golf club swing or baseball bat swing. In such an example, processor 2108 may correlate the accuracy and/or power components with a pay table stored in a look-up table or a database to determine the prize to award the player.

In some embodiments, one or more components of prize selector 2100 may be incorporated within multiple devices. For example, input device 2110 may be incorporated within a handheld tablet device or smart phone while arc 2102, prize indicator 2106, and/or other components of prize selector 2100 may be incorporated within a separate gaming device 114, computing device, or as a standalone component.

While the foregoing embodiments primarily described implementations of a virtual arc or rotation-based prize selector 2100, it should be recognized that a physical prize selector 2100 may be operated in a similar manner as described herein. Accordingly, in a physical implementation of prize selector 2100, prize indicator 2106 may be a ball that is propelled through channel 2114 of arc 2102 by an input device, such as a spring-loaded launcher or plunger. The ball may travel back and forth through arc 2102, bouncing off of each end of channel 2114, until coming to a stopped or stopping position within channel 2114. Processor 2108 may receive signals from a sensor (not shown) or the like to determine the stopping position of the ball to determine the prize won by the player.

In one embodiment, a size and/or an accuracy range or requirement may be adjusted for prize selector 2100 and/or prize indicator 2106. More specifically, the size of each section 2104 and/or for prize indicator 2106 may be adjusted by processor 2108, for example, to adjust the probability of selecting the prize associated with each section. For example, processor 2108 (or another suitable processor or device) may adjust the size of each section 2104 based on the player's gameplay, player skill level, prize history, wager history, and/or any other suitable factor. It should be recognized that processor 2108 may display sections 2104 in any size, i.e., equal sections, but may process sections 2104 differently internally, i.e., high prizes may appear equal on arc 2102 or another suitable display but be treated as smaller by processor 2108 to bias arc 2102 toward prizes of a lesser amount. In one embodiment shown in FIG. 21, a section 2104 associated with a grand prize may be adjusted to be a first or increased size 2116, a second or normal size 2118, or a third or reduced size 2120. These sizes may represent accuracy ranges (e.g., first accuracy range 2116, second accuracy range 2118, and third accuracy range 2120) within which a player must stop prize selector 2100 (or prize indicator 2106) to achieve the desired prize 2114. The first size or accuracy range 2116 may be used for players having a low amount of skill or a low skill level, the second size or accuracy range 2118 may be used for players having a normal or average amount of skill or skill level, and the third size or accuracy range 2120 may be used for players having a high amount of skill or a high skill level. It should be recognized that any suitable section 2104 may be adjusted to be any size rather than being limited to three sizes as shown in FIG. 21.

The player's skill level may be determined, for example, based on a history of prizes won by the player, and/or based on any other suitable criterion. In one example, the player's skill level may be a value between 1 and 10. Alternatively, the player's skill level may be a value between 1 and 100 or any other suitable range. Each section size may be associated with different player skill levels or ranges of player skill levels to facilitate normalizing bonus prizes won by players and/or to encourage less skilled players to keep playing to win larger bonus prizes. For example, in an embodiment where player skill levels range from 1 to 10, with 1 representing a player having very low skill and 10 representing a player having very high skill, the first or increased size 2116 may be associated with player skill levels 1-3, the second or normal size 2118 may be associated with player skill levels 4-6, and the third or reduced size 2120 may be associated with player skill levels 7-10. Alternatively, any suitable skill level or range of skill levels may be associated with any suitable section 2104 and/or section size as desired.

In one embodiment, the player skill level may be set to an initial value until the player's prize history is developed sufficiently to adjust the skill level to a more suitable value. For example, if the player skill level range is between 1 and 10 described above, each player with an unknown player skill may have their player skill level set to 8, or any suitable value, as described above with reference to FIG. 7B.

A player's prize history and skill level may be monitored and updated, for example, during the entire gameplay at a particular gaming device 114 (e.g., for a player who does not use a player reward card or the like). Additionally or alternatively, the player's prize history and skill level may be monitored and updated during any suitable period, such as 1 game or play session on gaming device 114, 1 day, 1 week, 1 month, and/or 1 year. As a result, the player's prize history and skill can be tracked and updated for both carded play (i.e., using a player reward card or the like) and uncarded play (i.e., without using a player reward card or the like).

In one embodiment, to maintain an expected level of profitability for games associated with prize selector 2100, one or more prizes 2114 and sizes of the section 2104 associated with each prize 2114 may be adjusted based on the player skill level to maintain a predetermined return-to-player (RTP) percentage or value, or a predetermined RTP range as described above with reference to FIG. 7B.

In one embodiment, a gaming establishment may determine a maximum RTP value that may be realized over time with respect to a game associated with prize selector 2100. For example, a gaming establishment may set a maximum RTP value of 0.98 to ensure that, on average, the gaming establishment will retain about 2% of money wagered. In such an embodiment, the gaming establishment may adjust the value of one or more prizes 2114 displayed on prize selector 2100 and/or a size of one or more sections 2104 of prize selector 2100 to ensure that the amount contributed by prize selector 2100 to the overall RTP of a game is less than or equal to the maximum RTP. For example, if the primary game has an RTP value of 0.90, the RTP amount of the bonus awarded through prize selector 2100 may be limited to a range of 0 to 0.08. The RTP amount of the bonus awarded through prize selector 2100 may factor in the probability of triggering a bonus round that includes spinning or otherwise activating prize selector 2100.

The monitoring, determining, and adjustment of the player skill and the RTP of prize selector 2100 (including the adjustment of prizes 2114 and section sizes) may be performed by one or more processors of gaming device 114, local server 110, WAP server 120, and/or any other suitable system or device.

In one embodiment, an adjustment to a player's skill level and/or an adjustment to the size of one or more sections 2104 may be adjusted quickly to prevent a highly skilled player taking over for the bonus portion of a lower skilled player's game. For example, if a player has a relatively stable skill level and gaming device 114, local server 110, WAP server 120, or another suitable system or device determines that a bonus prize associated with prize selector 2100 has been selected with greater skill than is consistent with the player's history, the player's skill level may be adjusted to a higher level and/or the size of one or more sections 2104, such as a section 2104 associated with a grand prize, may be adjusted to be a smaller size consistent with a higher player skill level.

While the embodiments described herein have focused on adjusting a size of one or more sections 1404 based on a determined player skill level (sometimes referred to as adjusting an accuracy requirement), a speed at which prize selector 2100 is rotated (i.e., arc 2102 portion of prize selector 2100) may be adjusted based on the player's skill level in addition to, or instead of, the adjustment to the size of one or more sections 2104. Adjusting the player-influenced speed or accuracy requirement in response to the player's skill level may occur at any time including before the start of a game, during the game, or following the conclusion of a game.

Figure 22:
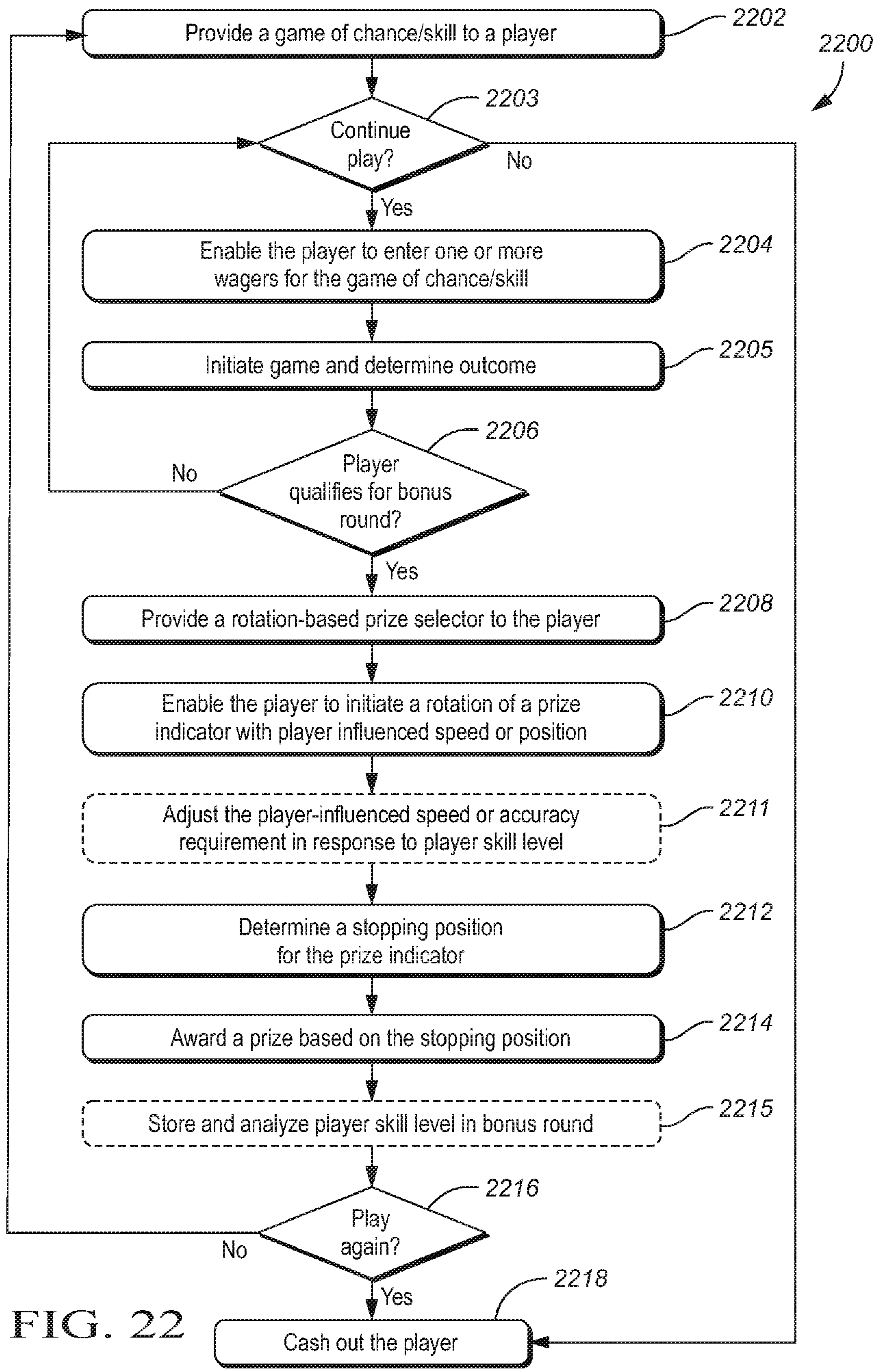
FIG. 22 is a flow diagram of a method of selecting a prize that may be used with the rotation-based prize selector shown in FIG. 21.

FIG. 22 is a flow diagram of a method 2200 of selecting a prize that may be used with one or more gaming devices 114 (shown in FIG. 1).

In one embodiment, method 2200 is performed by one or more processors 304 of one or more computing devices 300 executing instructions stored within one or more computer-readable memories, such as memory device 306. For example, method 2200 may be implemented by processor 304 of a gaming device 114, WAP server 120, local server 110, accounting system 128, and/or by any other suitable device.

During operation of method 2200, one or more games of chance and/or skill are provided 2202 to a player on a gaming device 114, for example. The games of chance and/or skill may include, without limitation, video reel slots, video poker, sports betting or sport book games, bingo or bingo-related games, keno or keno-related games, and/or any other games of chance and/or skill. The game or games may be displayed to the player, for example, on one or more displays 310 of gaming device 114. Once one or more games of chance and/or skill are provided 2202 to a player on a gaming device 114, the player may continue 2203 to play or alternatively cash out the player as described below.

The player is enabled 2204 to enter one or more wagers for the game. For example, the player may enter one or more wagers through user interface device 312 of gaming device 114. The wagers entered by the player may be tracked by gaming device 114, by accounting system 128, and/or by any other suitable device or system. For example, the amount of money or credits wagered by the player may be tracked by a wagering meter included within gaming device 114, accounting system 128, and/or any other suitable system or device. In one embodiment, an amount of credits wagered by the player is deducted from a credit balance of the player.

The game is initiated and an outcome for the game is determined 2205. For example, in one embodiment, symbols or other indicia are selected during the game. If a winning outcome is determined (e.g., if the indicia satisfy a winning criterion), the player may be awarded a prize for the game.

As the player plays the game, gaming device 114 determines 2206 whether the player qualifies for a bonus round. Additionally or alternatively, WAP server 120, local server 110, and/or any other suitable system or device determines 2206 whether the player qualifies for the bonus round. The player may qualify for the bonus round by satisfying a winning criterion in a primary game or by satisfying a bonus criterion in the primary game, for example. The winning criterion may include, for example, matching a predetermined pattern of indicia in a reel-type or video bingo game, matching a predetermined number of indicia in a video keno game, achieving a predetermined hand rank in a video poker game, and/or any other suitable criterion. The bonus criterion may include, for example, receiving a predetermined number of bonus indicia in the game, matching a predetermined number of indicia during the game, matching a predetermined pattern of indicia in the game, and/or any other suitable criterion.

If the player is determined to not be eligible for the bonus round, another game of chance may be provided 2202 to the player. However, if the player is determined to be eligible for the bonus round, a rotation-based prize selector, such as prize selector 2100 (shown in FIG. 21), may be provided 2208 to the player in one embodiment. While the following embodiment is described with reference to a rotation-based prize selector, it should be recognized that any suitable prize selector may be provided to the player.

In one embodiment, the player is enabled 2210 to activate the prize selector with a player-influenced speed or a player-influenced activation position or location (i.e., a point at which the player either activates a stop function of the already rotating rotation-based prize selector 2100 or starts the oscillation of the rotation-based prize selector 2100). For example, in one embodiment, the player may operate an input device, such as a button, a touch screen interface of a tablet computing device or of gaming device 114, or another suitable input device 2110 (shown in FIG. 21), to cause a prize indicator of the prize selector to rotate or oscillate based on a characteristic of the player's input. For example, the input device may be a button that the player holds down and releases after a player-determined amount of time. The amount of time that the player holds down the button may influence the speed at which the prize indicator is rotated and/or the position or time at which the prize selector switches from rotating in a first direction to rotating in a second direction. In another embodiment, the input device may be a touch screen that the player "swipes" (i.e., drags his or her finger across to register an input), with the length and/or speed of the swipe influencing the speed at which the prize indicator is rotated. In embodiments in which the player operates the input device to rotate a virtual prize indicator, it should be recognized that a processor, such as processor 304 (shown in FIG. 3), may calculate or determine the player-influenced speed and cause a display, such as display 310, to display the prize indicator rotating at the player-influenced speed.

It should be recognized that the player-influenced speed refers to an initial speed at which the prize indicator rotates. After the player initiates the rotation of the prize indicator, the prize indicator may be displayed as decelerating according to a deceleration rate controlled by a processor or controller, for example. In some embodiments, the prize indicator may be displayed as "bouncing off" of each end of the arc if the rotation speed of the prize indicator is greater than 0 when the prize indicator reaches a respective end of the arc. In such embodiments, all or a portion of the remaining speed of the prize indicator is applied to the new direction of the prize indicator.

In one embodiment, the player-influenced speed may be adjusted 2211, for example, by a processor in response to a skill level associated with the player as described above with reference to FIG. 7B. Additionally or alternatively, an accuracy requirement (described above with reference to FIG. 7B) may be adjusted 2211 in response to the player skill level. For example, as illustrated in FIG. 21, varying accuracy ranges or requirements may be provided in order for the player to achieve the highest value prize shown on prize selector 2100. As an example, a first time or average player would need to trigger in the second range 2118 to achieve the top prize. A highly skilled player needs to trigger in the third range 2120 and the highly unskilled needs to trigger in the first range 2116. The system may monitor the skill level of players using a player's reward card or the like over time, e.g., 2 plays, 1 play session, 1 week, 1 year, etc., and adjust accordingly or those players not using a players card for shorter periods. It is understood that the size and position of the first range 2116, second range 2118 and third range 2120 may vary and the size and position of the ranges shown in FIG. 21 are for reference purposes only. Adjusting the player-influenced speed or accuracy requirement in response to the player skill level 2211 may occur at any time including before the start of a game, during the game on following the conclusion of a game.

After the player has activated the prize selector to rotate the prize indicator, a stopping position of the prize indicator is determined 2212 by processor 2108, for example. In some embodiments, the stopping position may be defined as the position on the arc pointed to by the prize indicator when the prize indicator is stopped. In an embodiment in which the rotation-based prize selector includes a virtual prize indicator, the processor may determine 2212 the stopping position of the prize indicator based on a calculation of the initial speed of the prize indicator and the deceleration rate of the prize indicator.

In an embodiment in which the prize indicator is enabled to rotate in both a first direction and a second direction, a plurality of stopping positions of the prize indicator may be determined 2212. For example, the prize indicator may begin rotating in a first direction and the player may operate the input device to stop the rotation at a first stopping position. The prize indicator may then begin rotating in a second direction and the player may operate the input device to stop the rotation at a second stopping position. The processor may determine both the first stopping position and the second stopping position. Additional stopping positions and rotational changes in direction may also be provided.

A prize may be awarded 2214 based on the determined stopping position or positions of the prize indicator. For example, if the stopping position or positions of the prize indicator are associated with a particular prize, the player may be awarded the prize associated with the stopping position or positions. The prize may be selected based on an associated pay table, or the prize selector may display the prize to be won for each stopping position or combination of stopping positions, for example. While the foregoing embodiment has been described in which the prize is a bonus prize awarded in a bonus round, it should be recognized that any suitable prize may be awarded 2214 during operation of method 2200. After 1 or more bonus rounds, the system may optionally store, analyze, and/or update 2215 player skill level in the bonus round.

The player may be presented with an option 2216 to play the game of chance again, or to play another game of chance. If the player chooses to play again, method 2200 returns to providing 2202 a game of chance to the player. If the player does not want to play another game of chance, the player may cash out 2218 of gaming device 114. The player may receive a ticket or voucher representing the funds remaining in the player's credit balance, or may receive currency from a bill or coin dispenser representative of the amount remaining in the player's credit balance. Alternatively, the player may receive an electronic fund transfer of the remaining credit balance into an account of the player at a financial institution, for example.

Figure 23:
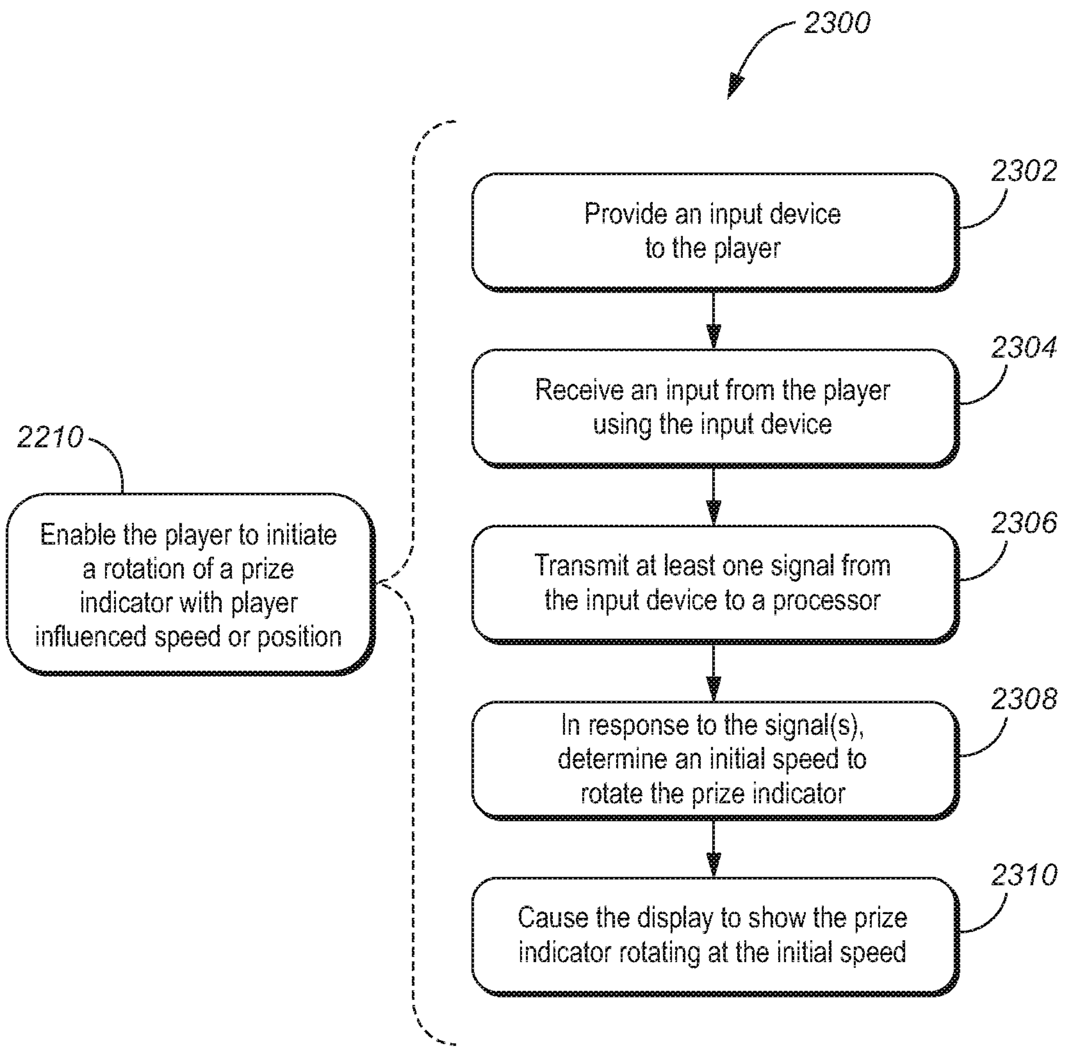
FIG. 23 is a flow diagram of a method of enabling a player to initiate a rotation of a prize indicator with a player-influenced speed that may be used with the method shown in FIG. 22.

FIG. 23 is a flow diagram of a method 2300 of enabling a player to initiate a rotation of a prize indicator with a player-influenced speed and/or activation position or location that may be used with one or more gaming devices 114 (shown in FIG. 1). In one embodiment, method 2300 is a more detailed embodiment of step 2210 in which the prize selector is a virtual rotation-based prize selector as described above with reference to FIG. 22.

In one embodiment, method 2300 is performed by one or more processors 304 of one or more computing devices 300 executing instructions stored within one or more computer-readable memories, such as memory device 306. For example, method 2300 may be implemented by processor 304 of a gaming device 114, WAP server 120, local server 110, accounting system 128, and/or by any other suitable device.

In one embodiment, an input device is provided 2302 to the player to facilitate enabling the player to operate the prize selector for the bonus round. For example, the input device may include a button, a touch screen interface of a tablet computing device or of gaming device 114, or another suitable input device 2110 (shown in FIG. 21). An input may then be received 2304 from the player using the input device. The input device transmits 2306 at least one signal representative of the user input to a processor, such as processor 304 of gaming device 114, WAP server 120, local server 110, and/or any other device or system.

In response to the signal or signals received from the input device, the processor determines 2308 an initial speed to rotate or oscillate the prize indicator. For example, the input device may be a button that the player holds down and releases after a player-determined amount of time. The processor may then determine the initial speed to rotate the prize indicator based on the amount of time the player holds down the button. For example, in one embodiment, the processor may assign a base speed of 1 rotation per second (i.e., one complete traversal from a first end of the arc to an opposing second end of the arc) and may determine the initial speed to be equal to the base speed multiplied by a multiplier value that is equal to the number of seconds the player holds the button. The processor may set the initial speed equal to a minimum speed of 1 rotation per second in case the player does not hold the button down for a full second, and may set the initial speed equal to a maximum speed of 10 rotations per second in case the player holds down the button for longer than 10 seconds. These examples are illustrative only, and any suitable base speed, multiplier value, minimum speed, and/or maximum speed may be used as desired. Additionally, the processor may not assign a minimum speed or maximum speed, and/or may use a different calculation to determine the initial speed to rotate the prize indicator.

In another embodiment, the input device may be a touch screen that the player "swipes" (i.e., drags his or her finger across to register an input), with the length and/or speed of the swipe influencing the speed at which the prize indicator is rotated. The processor may then determine the initial speed to rotate the prize indicator based on the amount of time, the distance, and/or the speed at which the player swipes his or her finger across the screen. For example, in one embodiment, the processor may assign a base speed of 1 rotation per second and may determine the initial speed to be equal to the base speed multiplied by a multiplier value that is equal to the number of inches the player swipes his or her finger across the screen. The processor may set the initial speed equal to a minimum speed of 1 rotation per second in case the player's finger does not travel a full inch, and may set the initial speed equal to a maximum speed of 10 rotations per second in case the player's finger travels more than 10 inches. These examples are illustrative only, and any suitable base speed, multiplier value, distance, minimum speed, and/or maximum speed may be used as desired. Additionally, the processor may not assign a minimum speed or maximum speed, and/or may use a different calculation to determine the initial speed to rotate the prize indicator.

In the embodiments described herein, the processor may also adjust the initial speed by a value based on the player's gameplay or prize history. For example, if the player has a history of achieving high bonus prizes, the processor may add or subtract a random or set value from the initial speed to determine an adjusted initial speed to rotate the prize indicator. In such embodiments, the processor may enable the prize indicator and/or prize selector to be at least partially non-deterministic from the player's perspective and/or may make it more difficult for the player to use skill in achieving a high bonus prize.

The processor may cause 2310 a display to show the prize indicator rotating at the initial speed. For example, the processor may transmit one or more signals to a display, such as display 310 (shown in FIG. 3), to cause display 310 to graphically depict the prize indicator rotating at the initial speed determined above.

FIG. 24 is a flow diagram of a method 2400 of determining a stopping position of a prize indicator that may be used with one or more gaming devices 114 (shown in FIG. 1). In one embodiment, method 2400 is a more detailed embodiment of step 2212 in which the prize selector is a virtual rotation-based prize selector as described above with reference to FIG. 22.

In one embodiment, method 2400 is performed by one or more processors 304 of one or more computing devices 300 executing instructions stored within one or more computer-readable memories, such as memory device 306. For example, method 2400 may be implemented by processor 304 of a gaming device 114, WAP server 120, local server 110, accounting system 128, and/or by any other suitable device.

During operation of method 2400, a processor, such as processor 304, may determine 2402 a deceleration rate of a prize indicator. In one embodiment, the processor may assign a constant deceleration rate of 0.5 rotations per second squared to the prize indicator. Accordingly, in the example described above in FIG. 23 in which the initial speed of the prize indicator is between 1 and 10 rotations per second, the prize indicator may come to a stop after between 2 and 20 seconds. Alternatively, the processor may assign a random deceleration rate or may add or subtract a random or set value to the constant deceleration rate described above. For example, if the player has a history of achieving high bonus prizes, the processor may adjust the deceleration rate by adding or subtracting a random or set value from the constant deceleration rate to determine an adjusted deceleration rate for the prize indicator. In such embodiments, the processor may enable the prize indicator and/or prize selector to be at least partially non-deterministic from the player's perspective and/or may make it more difficult for the player to use skill in achieving a high bonus prize.

The processor may also determine 2404 a current speed of the prize indicator. The current speed may be determined to be the initial speed at which the prize indicator is rotated as described above with reference to FIG. 23. In such an embodiment, the processor may determine the current speed at a time substantially simultaneously with the initiated rotation of the prize indicator. Alternatively, the current speed of the prize indicator may be determined 2404 to be the initial speed minus a deceleration rate of the prize indicator multiplied by the number of seconds (or other suitable unit of time) that has elapsed since the prize indicator was initially activated or the rotation began.

The processor may also calculate 2406 a distance traveled by the prize indicator until the prize indicator slows to a stop using the initial or current speed and the deceleration rate of the prize indicator according to Eq. 1 described above. For example, if the current speed is 3 rotations per second, the deceleration rate of the prize selector is 0.5 rotations per second squared, and the amount of time needed to slow the prize indicator down to a stop is 6 seconds, the processor may calculate the distance traveled to be 9 rotations.

The processor may also identify 2408 a stopping position of the prize indicator based on the distance traveled by the prize indicator. In one embodiment, the processor may identify a starting position of the prize indicator before the rotation begins (or the position of the prize indicator when calculating the current speed of the indicator) and may add the distance traveled to the starting position to determine the stopping position of the indicator. If the starting position plus the distance traveled is more than one length of the arc (i.e., more than one length of the channel), the processor may calculate the stopping position to be equal to the remainder of the distance traveled plus the starting position divided by the length of the channel.

In some embodiments, the processor may also cause 2410 the display to show the prize indicator to decelerate at the deceleration rate determined above until the prize indicator stops at the stopping position. For example, the processor may transmit one or more signals to the display, such as display 310 (shown in FIG. 3), to cause display 310 to graphically depict the prize indicator decelerating at the deceleration rate determined above until the prize indicator comes to a stop at the stopping position.

Figure 25:
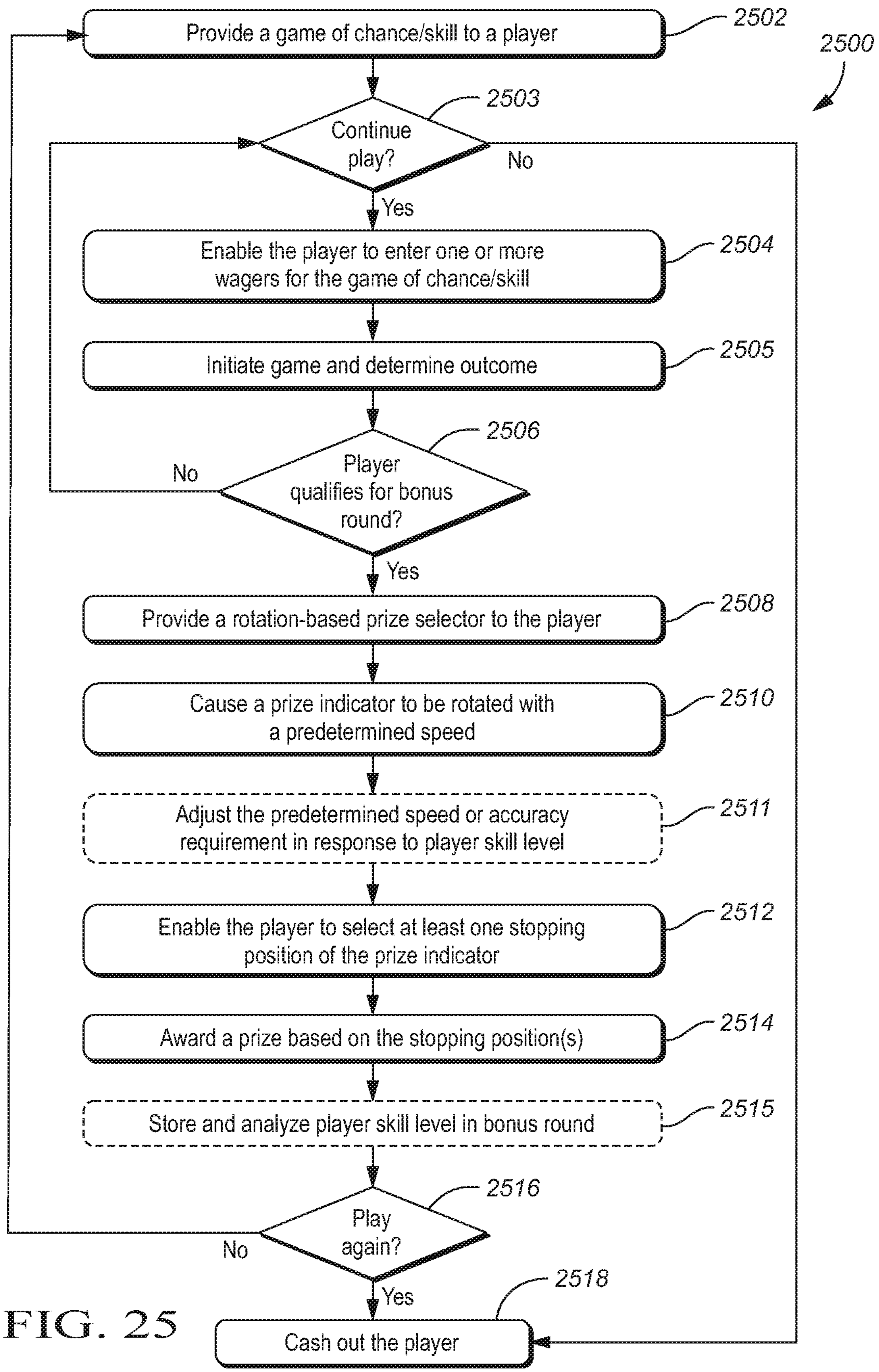
FIG. 25 is a flow diagram of a method of selecting a prize that may be used with the rotation-based prize selector shown in FIG. 21.

FIG. 25 is a flow diagram of a method 2500 of selecting a prize that may be used with one or more gaming devices 114 (shown in FIG. 1).

In one embodiment, method 2500 is performed by one or more processors 304 of one or more computing devices 300 executing instructions stored within one or more computer-readable memories, such as memory device 306. For example, method 2500 may be implemented by processor 304 of a gaming device 114, WAP server 120, local server 110, accounting system 128, and/or by any other suitable device.

During operation of method 2500, one or more games of chance and/or skill are provided 2502 to a player on a gaming device 114, for example. The games of chance and/or skill may include, without limitation, video reel slots, video poker, sports betting or sport book games, bingo or bingo-related games, keno or keno-related games, and/or any other games of chance and/or skill. The game or games may be displayed to the player, for example, on one or more displays 310 of gaming device 114. Once one or more games of chance and/or skill are provided 2502 to a player on a gaming device 114, the player may continue 2503 to play or alternatively cash out the player as described below.

The player is enabled 2504 to enter one or more wagers for the game. For example, the player may enter one or more wagers through user interface device 312 of gaming device 114. The wagers entered by the player may be tracked by gaming device 114, by accounting system 128, and/or by any other suitable device or system. For example, the amount of money or credits wagered by the player may be tracked by a wagering meter included within gaming device 114, accounting system 128, and/or any other suitable system or device. In one embodiment, an amount of credits wagered by the player is deducted from a credit balance of the player.

The game is initiated and an outcome for the game is determined 2505. For example, in one embodiment, symbols or other indicia are selected during the game. If a winning outcome is determined (e.g., if the indicia satisfy a winning criterion), the player may be awarded a prize for the game.

As the player plays the game, gaming device 114 determines 2506 whether the player qualifies for a bonus round. Additionally or alternatively, WAP server 120, local server 110, and/or any other suitable system or device determines 2506 whether the player qualifies for the bonus round. The player may qualify for the bonus round by satisfying a winning criterion in a primary game or by satisfying a bonus criterion in the primary game, for example. The winning criterion may include, for example, matching a predetermined pattern of indicia in a reel-type or video bingo game, matching a predetermined number of indicia in a video keno game, achieving a predetermined hand rank in a video poker game, and/or any other suitable criterion. The bonus criterion may include, for example, receiving a predetermined number of bonus indicia in the game, matching a predetermined number of indicia during the game, matching a predetermined pattern of indicia in the game, and/or any other suitable criterion.

If the player is determined to not be eligible for the bonus round, another game of chance may be provided 2502 to the player. However, if the player is determined to be eligible for the bonus round, a rotation-based prize selector, such as prize selector 2100 (shown in FIG. 21), may be provided 2508 to the player in one embodiment. While the following embodiment is described with reference to a rotation-based prize selector, it should be recognized that any suitable prize selector may be provided to the player.

In one embodiment, the processor causes 2510 the prize selector to be activated with a predetermined speed. In embodiments in which the prize selector includes a virtual arc and prize indicator, the processor may transmit one or more signals to a display, such as display 310 (shown in FIG. 3), to cause the display to display the prize indicator rotating at the predetermined speed. In one embodiment, the predetermined speed is about 10 rotations per second. Alternatively, any suitable speed may be used for the predetermined speed.

In one embodiment, the predetermined speed may be adjusted 2511, for example, by a processor in response to a skill level associated with the player as described above with reference to FIG. 7B. Additionally or alternatively, an accuracy requirement (described above with reference to FIG. 7B) may be adjusted 2511 in response to the player skill level.

When the prize indicator is rotating at the predetermined speed, the player is enabled 2512 to select at least one stopping position of the prize indicator or to influence at least one stopping position of the prize indicator. For example, the prize indicator may begin rotating in a first direction. The player may operate an input device, such as a button, a touch screen interface of a tablet computing device or of gaming device 114, or another suitable input device 2110 (shown in FIG. 21), to cause the prize indicator to stop rotating at a first stopping position or to begin slowing down until the prize indicator stops at the first stopping position. The prize indicator may then begin rotating in a second direction until the player operates the input device to cause the prize indicator to stop rotating at a second stopping position or to begin slowing down until the prize indicator stops a the second stopping position. Further changes in rotation direction and/or further stopping positions may be provided in some embodiments.

In embodiments in which the player operates the input device to select or influence the stopping position or positions of a virtual prize indicator, it should be recognized that a processor, such as processor 304 (shown in FIG. 3), may calculate or determine the stopping position or positions and/or a deceleration rate of the prize selector when the player operates the input device. The processor may cause a display, such as display 310, to display the prize indicator stopping at the stopping position or positions or may cause the display to display the prize indicator slowing down at the deceleration rate when the player operates the input device.

It should be recognized that each player-selected or influenced stopping position refers to a position at which the prize indicator stops as a result of the player operating the input device. In one embodiment, the prize indicator will stop at the stopping position when the player operates the input device. In another embodiment, the prize indicator will begin decelerating when the player operates the input device and will slow down to a stop at the stopping position such that the player only influences, but does not select, the final stopping position.

A prize may be awarded 2514 based on the determined stopping position or positions of the prize indicator. For example, if the stopping position or positions of the prize indicator is associated with a particular prize, the player may be awarded the prize associated with the stopping position or positions. The prize may be selected based on an associated pay table, or the prize selector may display the prize to be won for each stopping position or combination of stopping positions, for example. While the foregoing embodiment has been described in which the prize is a bonus prize awarded in a bonus round, it should be recognized that any suitable prize may be awarded 2514 during operation of method 2500. After 1 or more bonus rounds, the system may optionally store, analyze, and/or update 2515 player skill level in the bonus round.

The player may be presented with an option 2516 to play the game of chance again, or to play another game of chance. If the player chooses to play again, method 2500 returns to providing 2502 a game of chance to the player. If the player does not want to play another game of chance, the player may cash out 2518 of gaming device 114. The player may receive a ticket or voucher representing the funds remaining in the player's credit balance, or may receive currency from a bill or coin dispenser representative of the amount remaining in the player's credit balance. Alternatively, the player may receive an electronic fund transfer of the remaining credit balance into an account of the player at a financial institution, for example.

Figure 26:
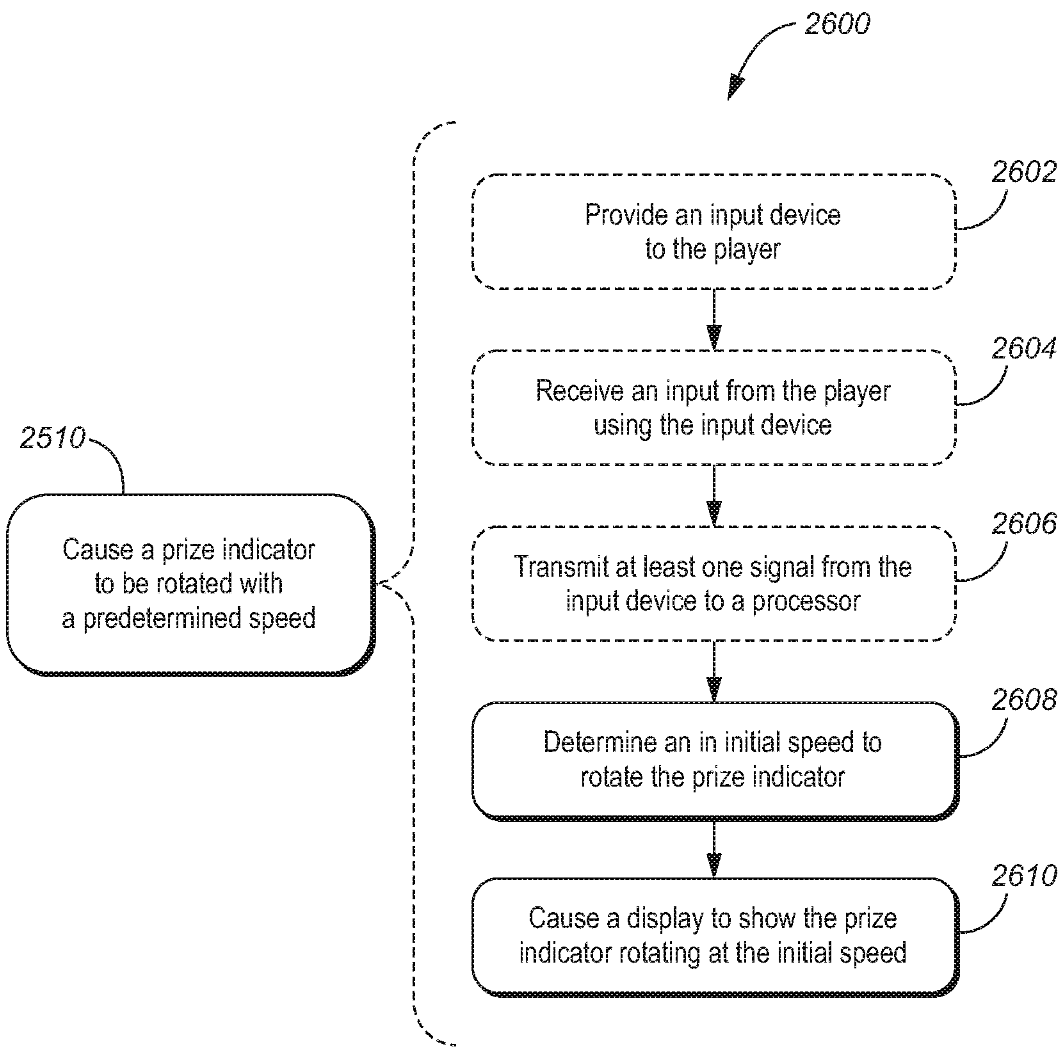
FIG. 26 is a flow diagram of a method of causing a prize indicator to be rotated at a predetermined speed that may be used with the method shown in FIG. 25.

FIG. 26 is a flow diagram of a method 2600 of causing a rotation-based prize selector to be rotated at a predetermined speed or activation location that may be used with one or more gaming devices 114 (shown in FIG. 1). In one embodiment, method 2600 is a more detailed embodiment of step 2510 in which the prize selector is a virtual rotation-based prize selector as described above with reference to FIG. 25.

In one embodiment, method 2600 is performed by one or more processors 304 of one or more computing devices 300 executing instructions stored within one or more computer-readable memories, such as memory device 306. For example, method 2600 may be implemented by processor 304 of a gaming device 114, WAP server 120, local server 110, accounting system 128, and/or by any other suitable device.

In one embodiment, an input device is provided 2602 to the player to facilitate enabling the player to operate the prize selector for the bonus round. For example, the input device may include a button, a touch screen interface of a tablet computing device or of gaming device 114, or another suitable input device 2110 (shown in FIG. 21). An input may then be received 2604 from the player using the input device to start rotating the prize indicator at the initial speed. The input device may transmit 2606 at least one signal representative of the user input to a processor, such as processor 304 of gaming device 114, WAP server 120, local server 110, and/or any other device or system. Alternatively, the input device may not be used in method 2600 and the prize indicator may automatically begin rotating at the initial speed when the player is determined to be eligible for the bonus round, for example.

In response to the signal or signals received from the input device, the processor determines 2608 an initial speed to rotate the prize indicator. Alternatively, the processor may determine 2608 an initial speed to rotate the prize indicator without using signals from the input device. For example, in one embodiment, the processor may set the initial speed equal to 10 rotations per second. This example is illustrative only, and any suitable initial speed may be used as desired.

In the embodiments described herein, the processor may also adjust the initial speed by a value based on the player's gameplay or prize history. For example, if the player has a history of achieving high bonus prizes, the processor may add or subtract a random or set value from the initial speed to determine an adjusted initial speed to rotate the prize indicator. In such embodiments, the processor may enable the prize selector and/or prize indicator to be at least partially non-deterministic from the player's perspective and/or may make it more difficult for the player to use skill in achieving a high bonus prize.

The processor may cause 2610 a display to show the prize indicator rotating at the initial speed. For example, the processor may transmit one or more signals to a display, such as display 310 (shown in FIG. 3), to cause display 310 to graphically depict the prize indicator rotating at the initial speed determined above.

Figure 27:
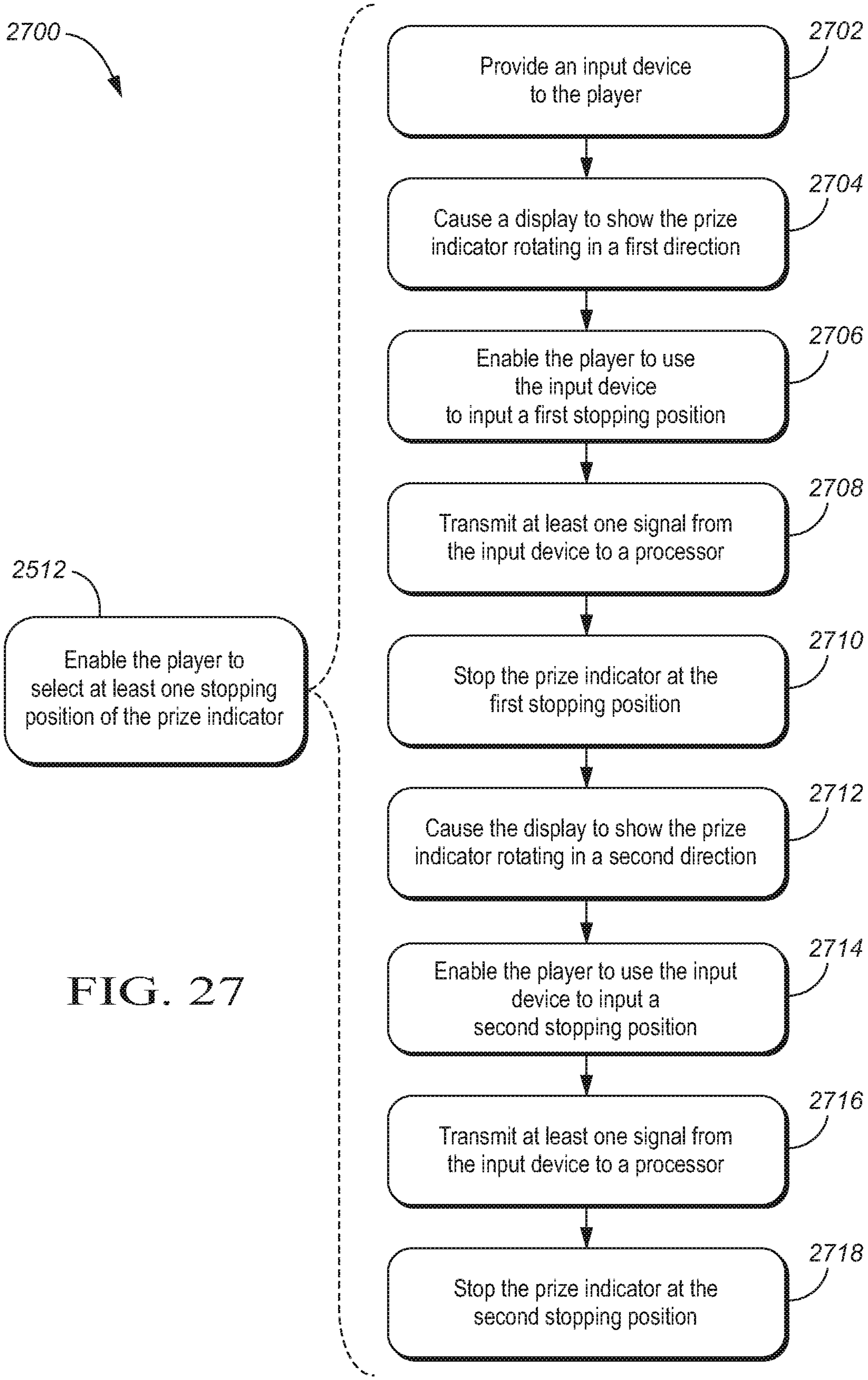
FIG. 27 is a flow diagram of a method of enabling a player to select at least one stopping position of a prize indicator that may be used with the method shown in FIG. 25.

FIG. 27 is a flow diagram of a method 2700 of enabling a player to select at least one stopping position of a prize indicator that may be used with one or more gaming devices 114 (shown in FIG. 1). In one embodiment, method 2700 is a more detailed embodiment of step 2512 in which the prize selector is a virtual rotation-based prize selector as described above with reference to FIG. 25.

In one embodiment, method 2700 is performed by one or more processors 304 of one or more computing devices 300 executing instructions stored within one or more computer-readable memories, such as memory device 306. For example, method 2700 may be implemented by processor 304 of a gaming device 114, WAP server 120, local server 110, accounting system 128, and/or by any other suitable device.

In one embodiment, an input device is provided 2702 to the player to facilitate enabling the player to operate the prize selector. For example, the input device may include a button, a touch screen interface of a tablet computing device or of gaming device 114, or another suitable input device 2110 (shown in FIG. 21).

In one embodiment, the processor may cause 2704 a display to show the prize indicator rotating in a first direction. For example, the processor may transmit one or more signals to the display, such as display 310 (shown in FIG. 3), to cause display 310 to graphically depict the prize indicator rotating in a counterclockwise direction. In one embodiment, the prize indicator begins rotating (or is displayed as beginning the rotation) when the player is determined to be eligible for a bonus round, when the prize selector is provided to the player, or when another suitable condition occurs.

The player is enabled 2706 to use the input device to input a first stopping position for the prize indicator. For example, the player may press or hold a button or may touch a portion of a touch screen display to input a desired time or position at which the player wants the prize indicator to stop. The input device transmits 2708 at least one signal representative of the user input to a processor, such as processor 304 of gaming device 114, WAP server 120, local server 110, and/or any other device or system. The processor causes the prize indicator to stop 2710 at the first stopping position. For example, the processor may transmit one or more signals to the display to cause the display to show the prize indicator stopped at the first stopping position when the signal or signals are received from the input device.

In one embodiment, the processor may cause 2712 the display to show the prize indicator rotating in a second direction. For example, the processor may transmit one or more signals to the display to cause the display to graphically depict the prize indicator rotating in a clockwise direction.

The player is enabled 2714 to use the input device to input a second stopping position for the prize indicator. For example, the player may press or hold a button or may touch a portion of a touch screen display to input a desired time or position at which the player wants the prize indicator to stop. The input device transmits 2716 at least one signal representative of the user input to the processor. The processor causes the prize indicator to stop 2718 at the second stopping position. For example, the processor may transmit one or more signals to the display to cause the display to show the prize indicator stopped at the second stopping position when the signal or signals are received from the input device.

In one embodiment, the processor may add or subtract a random or set value to the first stopping position and/or the second stopping position described above. For example, if the player has a history of achieving high bonus prizes, the processor may adjust the first stopping position and/or the second stopping position by adding or subtracting a random or set value from the respective stopping position to determine an adjusted stopping position for the prize indicator. In such embodiments, the processor may enable the prize selector and/or prize indicator to be at least partially non-deterministic from the player's perspective and/or may make it more difficult for the player to use skill in achieving a high bonus prize.

While the foregoing embodiments describe the prize indicator rotating in a first direction and a second direction and stopping at a first and a second stopping position, it should be recognized that the prize indicator may rotate in any suitable number of directions as desired and may alternate between the different directions any suitable number of times. Additionally or alternatively, the prize indicator may be stopped at any suitable number of stopping positions as desired.

Figure 28:
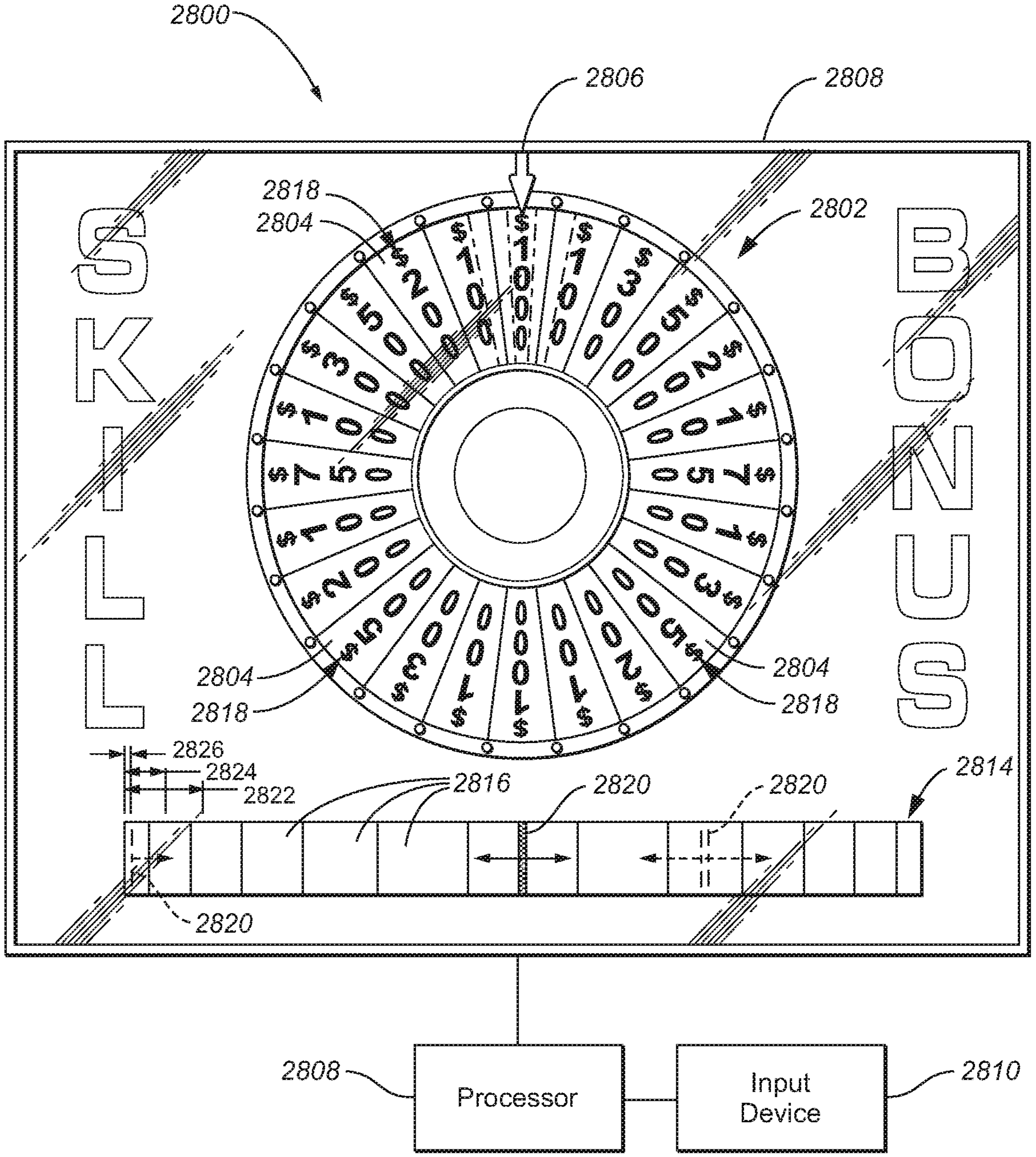
FIG. 28 is a block diagram of an exemplary virtual or computer-implemented prize selector that may be operated by the system shown in FIG. 1 or the system shown in FIG. 2.

FIG. 28 is a block diagram of an exemplary virtual or computer-implemented hybrid prize selector 2800 that may be used with system 100 (shown in FIG. 1) or system 200 (shown in FIG. 2).

In one embodiment, prize selector 2800 includes a wheel 2802 that is divided into a plurality of wheel sections 2804 and a prize indicator 2806, each of which is displayed on a display 2808. Prize selector 2800 also includes a processor 2810 and an input device 2812. In addition, prize selector 2800 may include a bar-based prize selector, or bar 2814 that is divided into a plurality of bar sections 2816. Alternatively, prize selector 2800 may not include one or more of the above-identified components. In one embodiment, prize selector 2800 is operatively connected to, or included within, one or more gaming machines 114, local server 110, WAP server 120, and/or any other suitable device within gaming establishment 102.

Wheel 2802 may include any suitable number of sections 2804 as desired. One or more prizes 2818 may be associated with each section 2804 such that when a player selects a section 2804 (or a selection is made for the player), the prize 2818 (or prizes 2818) associated with the selected section 2804 is awarded to the player. Alternatively, one or more sections 2804 may not be associated with a prize 2818. Prizes 2818 may include, for example, a fixed amount of money or credits, a changeable amount of money or credits (e.g., a progressive jackpot), a prize multiplier for a prize awarded in a primary game or the like, a physical item such as a car or a retail item, and/or any other suitable prize.

Wheel 2802 may also include a prize indicator 2806 that points to or otherwise indicates a selected section 2804 and/or a prize 2818 associated with a selected section 2804. As illustrated in FIG. 28, prize indicator 2806 may be implemented as a virtual pointer or arrow. Alternatively, prize indicator 2806 may be implemented as a virtual arm or flapper, or may be implemented in any other suitable manner as desired.

Bar 2814 may include any suitable number of bar sections 2816 as desired. Bar 2814 may also include a bar selector 2820 that oscillates back and forth along bar 2814 during operation. In one embodiment, bar sections 2816 are associated with one or more prizes 2818 and/or one or more characteristics of wheel 2802 that cause wheel 2802 to be spun in a predetermined manner, as described more fully herein. For example, as described herein, bar 2814 may be used as a secondary input device by the player to control a speed that wheel 2802 is rotated, a speed that wheel 2802 is decelerated, a time or position at which wheel 2802 initiates rotation, a time or position at which wheel 2802 initiates a deceleration, and/or any other suitable characteristic of wheel 2802.

Processor 2810 may be used to control the operation of wheel 2802 and bar 2814. For example, processor 2810 may receive one or more signals from input device 2812 representing a player input, and may determine a speed at which to oscillate bar 2814 (i.e., bar selector 2820) and/or to spin wheel 2802. In addition, processor 2810 may determine a stopping point or a deceleration rate for bar 2814 and/or wheel 2802.

In one embodiment, input device 2812 is operable by a player and/or a gaming establishment employee. Input device 2812 may be activated to initiate the oscillation of bar indicator 2820, to stop bar indicator 2820 at a desired time or position, and/or to initiate a deceleration of bar indicator 2820. For example, the player may activate or use input device 2812 to start the oscillation of bar indicator 2820. Input device 2812 may then transmit one or more signals to processor 2810 indicating that the player has activated or used input device 2812. Processor 2810 may transmit one or more signals to display 2808 to cause display 2808 to show bar indicator 2820 oscillating based on the input and/or wheel 2802 rotating based on the input as described herein.

The player may also activate or use input device 2812 to stop or initiate a slowdown of bar indicator 2820 and/or wheel 2802 after bar indicator 2820 and/or wheel 2802 has begun oscillating or rotating. Input device 2812 may transmit one or more signals to processor 2810 when the player has activated input device 2812. Processor 2810 may then transmit one or more signals to display 2808 to cause display 2808 to show bar indicator 2820 and/or wheel 2802 decelerating at a substantially constant rate or at a variable rate. When bar indicator 2820 stops, processor 2810 may determine the stopping position of wheel 2802 and may identify the wheel section 2804 and/or prize 2818 pointed to by prize indicator 2806 as described above.

In addition, one or more components of prize selector 2800 may be incorporated within multiple devices. For example, input device 2812 may be incorporated within a handheld tablet device or smart phone while wheel 2802 and/or other components of prize selector 2800 may be incorporated within a separate gaming device 114, specialized computing device 300, or as a standalone component.

In the example shown in FIG. 28, the size of each bar section 2816 may be adjusted by processor 2810, for example, to adjust the probability of selecting each section 2816. For example, processor 2810 (or another suitable processor or device) may adjust the size of each bar section 2816 based on the player's gameplay, player skill level, prize history, wager history, and/or any other suitable factor. It should be recognized that processor 2810 may display bar sections 2816 in any size, i.e., equal sections, but may process sections 2816 differently internally. For example, bar sections 2816 that are associated with high prizes on wheel 2802 may appear equally sized on bar 2814 or another suitable display but be treated as smaller by processor 2810 to bias bar 2814 toward prizes of a lesser amount. In one embodiment shown in FIG. 28, one or more bar sections 2816 may be adjusted to be a first or increased size 2822, a second or normal size 2824, or a third or reduced size 2826. These sizes may represent accuracy ranges (e.g., first accuracy range 2822, second accuracy range 2824, and third accuracy range 2826) within which a player must stop bar indicator 2820 to achieve a desired spin of wheel 2802 in order to obtain a desired prize 2818. The first size or accuracy range 2822 may be used for players having a low amount of skill or a low skill level, the second size or accuracy range 2824 may be used for players having a normal or average amount of skill or skill level, and the third size or accuracy range 2826 may be used for players having a high amount of skill or a high skill level. It should be recognized that any suitable bar section 2816 may be adjusted to be any size rather than being limited to three sizes as shown in FIG. 28.

The player's skill level may be determined in a similar manner as described above with reference to FIG. 7B. In addition, bar sections 2816, wheel sections 2804, and/or prizes 2818 may be adjusted based on player skill to maintain a desired RTP value as described above with reference to FIG. 7B.

During operation, wheel 2802 operates substantially as described in FIGS. 7A-13 with the exception that bar 2814 may be used to spin and/or stop wheel 2802. For example, in one embodiment, the player may operate input device 2812 during a bonus round to cause bar indicator 2820 to start oscillating at a player influenced speed and/or position as described above with reference to FIGS. 14-20. Additionally or alternatively, the player may operate input device 2812 to cause bar indicator 2820 to stop oscillating at a player determined or player influenced position or deceleration rate as described above with reference to FIGS. 14-20.

Processor 2810 may determine a stopping point of bar indicator 2820 in a similar manner as described above. The stopping point of bar indicator 2820 may be used to determine a stopping point of wheel 2802. More specifically, in one embodiment, the stopping point of bar indicator 2820 may be used to determine a speed at which to rotate wheel 2802, a position or time at which to stop wheel 2802, and/or a deceleration rate of wheel 2802 in a similar manner as described above. Accordingly, the player may enjoy the added excitement of operating both bar 2814 and wheel 2802 during a bonus round, for example, and may therefore be enticed to play more often or longer.

While the embodiment described herein provided for the sizes or accuracy ranges of one or more bar sections 2816 to be adjusted by processor 2810 based on a player skill level, it should be recognized that the sizes or accuracy ranges of one or more wheel sections 2804 may be adjusted by processor based on the player skill level in addition to, or in place of, the adjustments to bar sections 2816. As a result, a game operator may have more control over the probabilities of selecting each prize 2818 and may have more flexibility in maintaining a suitable RTP range or value.

While the embodiments described herein have focused on adjusting a size of one or more bar sections 2816 and/or wheel sections 2804 based on a determined player skill level (sometimes referred to as adjusting an accuracy requirement), a speed at which prize selector 2800 is spun (i.e., wheel 2802 and/or bar 2814 portions of prize selector 2800) may be adjusted based on the player's skill level in addition to, or instead of, the adjustment to the size of one or more sections. Adjusting the player-influenced speed or accuracy requirement in response to the player's skill level may occur at any time including before the start of a game, during the game, or following the conclusion of a game.

In addition, while FIG. 28 illustrates a hybrid combination of a wheel 2802 and a bar 2814 used to select the stopping position of wheel 2802, it should be recognized that any suitable prize selector components may be used and/or combined together. For example, a rotation-based prize selector may be used to select prizes on a wheel or a bar, a wheel may be used to select prizes on a bar, a bar may be used to select prizes on a rotation-based prize selector, and/or any other suitable combination of prize selectors and components may be used as desired.

Figure 29A:
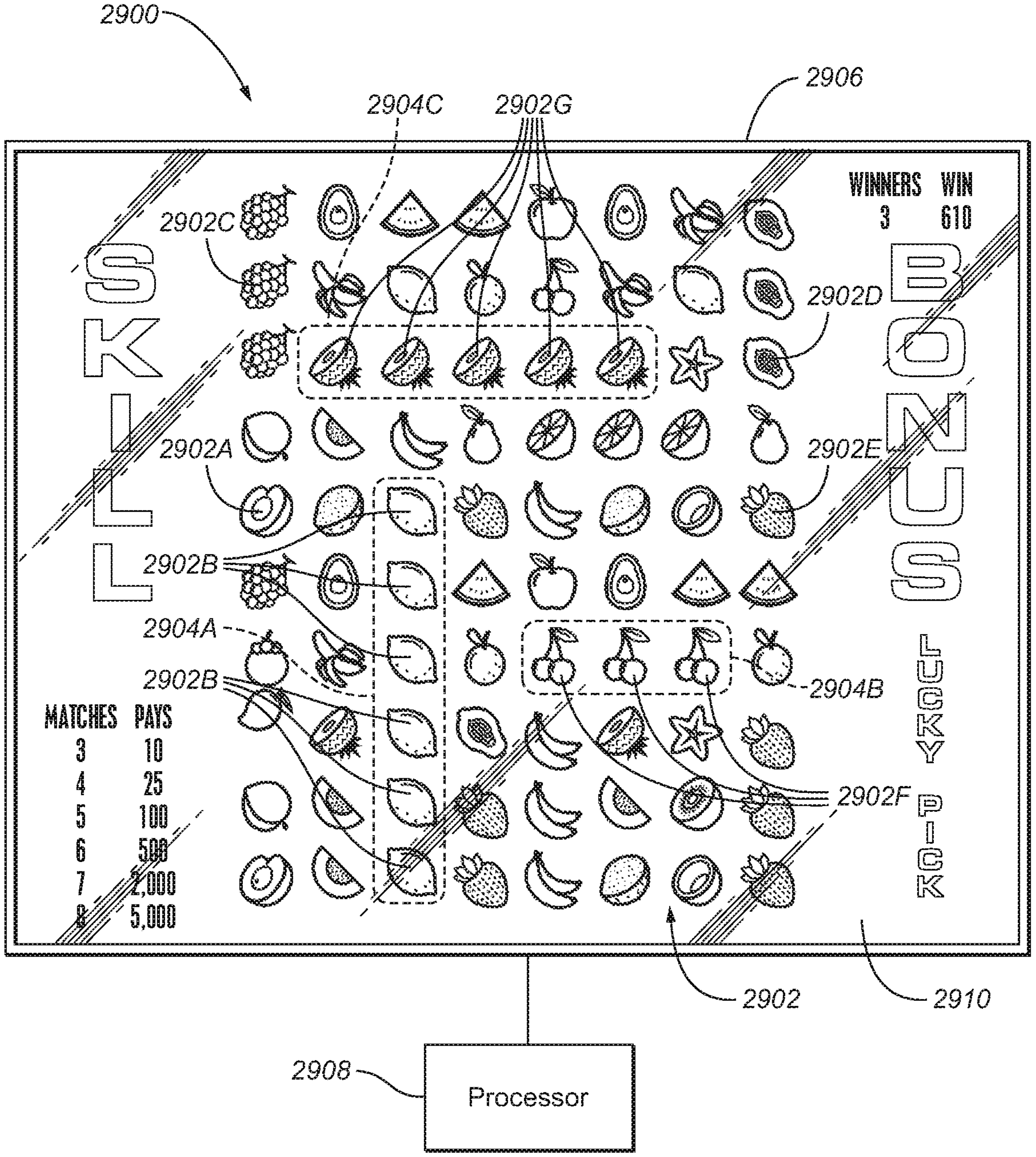
FIGS. 29A and 29B are diagrams of an exemplary bonus game that may be played in a bonus round operated by the system shown in FIG. 1 or the system shown in FIG. 2.
Figure 29B:
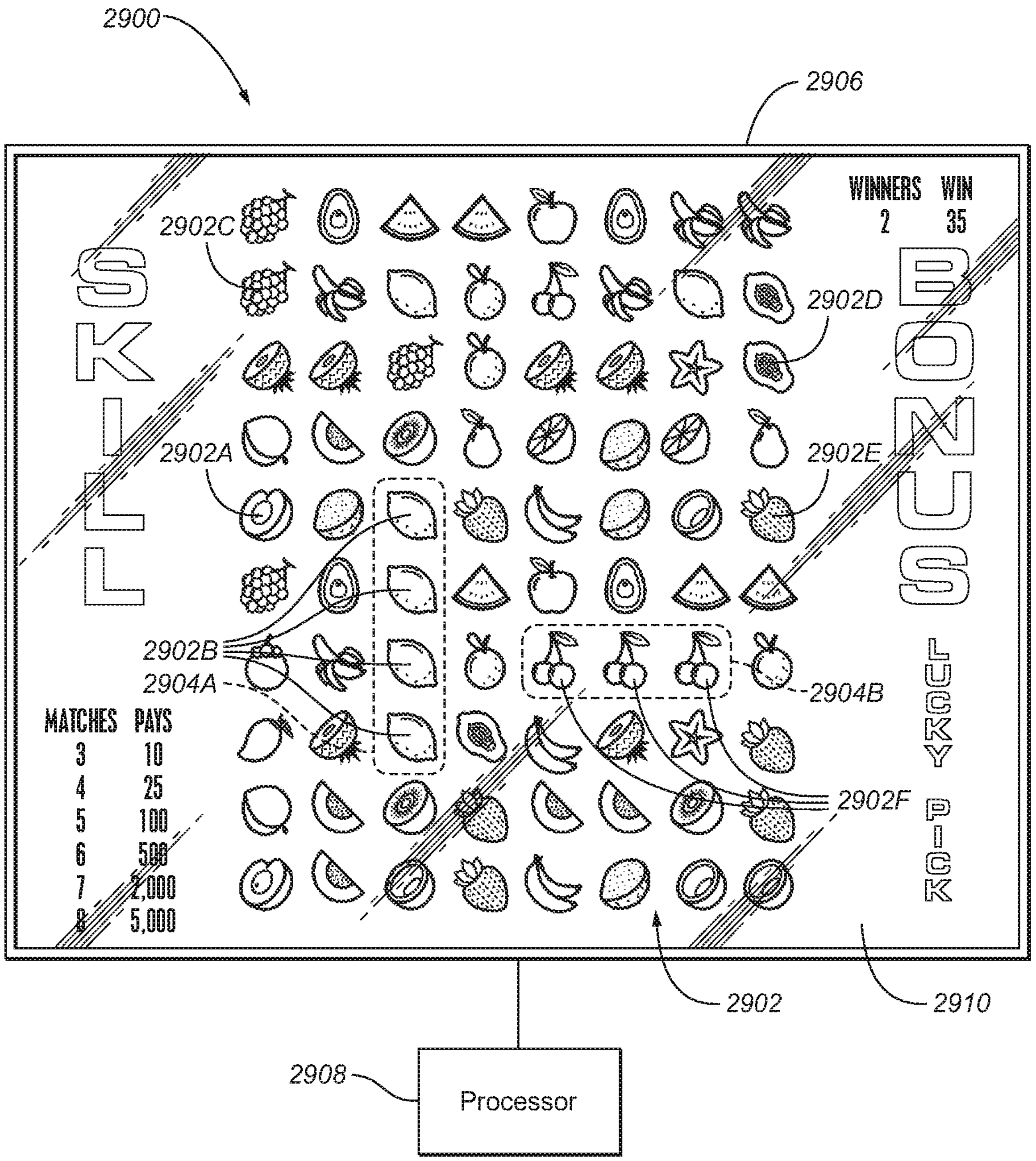

FIG. 29A is a diagram of an exemplary bonus game 2900 that may be played in a bonus round operated by system 100 (shown in FIG. 1) or system 200 (shown in FIG. 2). More specifically, FIG. 29A illustrates bonus game 2900 showing adjustments made for a player determined to have a relatively low skill level as compared to an average player. FIG. 29B illustrates bonus game 2900 showing adjustments made for a player determined to have a relatively high skill level as compared to an average player.

Bonus game 2900 may include a plurality of game indicia 2902, such as fruit symbols in the embodiment shown in FIG. 29A. For example, indicia 2902 may include one or more apples 2902A, lemons 2902B, grapes 2902C, papayas 2902D, strawberries 2902E, cherries 2902F, and/or pineapples 2902G. In one embodiment, if a player matches 3 or more indicia 2902 in a horizontal or vertical line within a predetermined time period, the player may win a prize. For example, in the embodiment shown in FIG. 29A, the player has matched a first group 2904A of 5 lemons 2902B, a second group 2904B of 3 cherries 2902F, and a third group 2904C of 5 pineapples 2902G. However, the player has missed other possible matches, such as a group of 3 grapes 2902C in the top left corner, a group of 3 papayas 2902D in the top right corner, a group of 3 strawberries 2902E in the bottom right corner, as well as others shown in FIG. 29A.

In one embodiment, the player may have been determined to have a low level of skill based on previous games and so the player is presented with bonus game 2900 having a relatively large number of possible matches as shown in FIG. 29A. In addition, based on the number of missed matches that the player achieved in this example shown in FIG. 29A, the player's low skill level may be reaffirmed. Accordingly, in one embodiment, the player may be provided with more possible matches to make in one or more subsequent games than a player having an average or a high level of skill would be provided.

On the other hand, with reference to FIG. 29B, only two matching groups, a first group 2904A of 4 lemons 2902B and a second group 2904B of 3 cherries 2902F, are provided. For example, a player may have been determined to have a high level of skill based on previous games and so the player is presented with bonus game 2900 having a relatively low number of possible matches as shown in FIG. 29B. Since the player has matched both possible groups, the player's high skill level may be reaffirmed and, as a result, a fewer number of possible matches than normal may be provided in future bonus games. Accordingly, in the embodiments described herein, a number of possible groups of matching indicia 2902 may be modified or adjusted in bonus game 2900 based on the player skill level.

It should be recognized that bonus game 2900 may be displayed on a display 2906 and may be presented and/or controlled by a processor 2908. A touch screen interface 2910 may be used as an input device or a user interface to enable the player to operate bonus game 2900 and select matching indicia 2902. In one embodiment, processor 2908 is a processor 304 of a gaming device 114 or a specialized computing device 300 and display 2906 is a display 310 of a gaming device 114 or a specialized computing device 300. Touch screen interface 2910 may be a user interface device 312 of a gaming device 114 or a specialized computing device 300.

While bonus game 2900 is described herein as being a symbol matching game, it should be recognized that any suitable game may be provided as bonus game 2900. Suitable games may also include any arcade style game and means of adjustment thereof such as Pac Man® (registered mark of Bandai Namco Games, Inc.) by adjusting speed and/or dexterity requirements, Asteroids® (registered mark of Atari Interactive, Inc.) by adjusting speed and/or accuracy requirements, Street Fighter® (registered mark of Capcom U.S.A., Inc.) by adjusting speed and/or reflex requirements, Command & Conquer Red Alert® (registered mark of Electronic Arts, Inc.) based on speed and/or asset requirements or sports based games such as golf, baseball or football based on agility, speed and/or game strategy. It should be understood that while many of the embodiments described herein refer to bonus games, any of the embodiments described may also be incorporated into the base or main game or be an integral part thereof.

The systems, methods, and examples described herein should be viewed as illustrative rather than limiting. For example, all or portions of the bonus round selectors and methods may be combined together with other bonus round selectors and methods. In addition, a player may choose which bonus round selector or method to use during a game in some embodiments. For example, when the player is determined to be eligible for a bonus round, the player may be presented with a list of prize selectors to use, such as the wheel-based prize selector shown in FIG. 7A or 7B, the bar-based prize selector shown in FIG. 14, the rotation-based prize selector shown in FIG. 21, the hybrid prize selector shown in FIG. 28 or the symbol grouping prize selector shown in FIG. 29A. The player may choose the prize selector to be used to select the bonus round and the respective method associated with the chosen prize selector may then be initiated.

In addition, while embodiments described herein refer to enabling the player to influence the stopping position of a prize selector, influencing the stopping position of the prize selector (or one or more portions thereof) may be achieved in numerous ways. For example, influencing the stopping position of the prize selector may be achieved by a player action on an already moving prize selector such as an already rotating wheel or already oscillating bar, wherein the player action will stop the prize selector or will start deceleration of the prize selector at a time or position selected or otherwise based on the action by the player. Influencing the stopping position of the prize selector may also be achieved by a player action on a nonmoving (e.g., non-rotating or non-oscillating) prize selector such as a rotatable wheel or oscillatable bar wherein the player action initiates rotation or oscillation of the prize selector. The player action to initiate the rotation or oscillation may include actions such as pressing and holding an input device, wherein the prize selector accelerates until the player releases the input device. The player may also initiate movement (e.g., rotation or oscillation) by pressing and holding the input device until a desired position or location is reached and the player releases the input device to cause the prize selector to rotate or oscillate. After the player action is completed, the rotation or oscillation of the prize selector decelerates and/or stops according to a predetermined deceleration rate, a random or variable deceleration rate, or based on another player action resulting from the player activating the input device, for example. The player may also influence the stopping position of the prize indicator using any combinations of the foregoing.

It is understood that adjusting the size of a section of a prize selector in any embodiment described herein may include adjusting the effective size of the section. Adjusting the effective size of a section of a prize selector in any embodiment may be achieved by the processor and may be either visually perceptible or imperceptible to the player. For example, in a wheel with 16 identical sized 22.5 degree sections, the effective size of at least one of the sections compared to the size of the other sections is adjustable by the processor. In one case, the adjustment may be perceptible to the player by reducing the angular section size, i.e., from 22.5 degrees to 11.25 degrees. Alternatively, the processor may reduce the angular section size for internal calculation or use whereas the adjustment of the angular section size is not perceptible to the player, i.e., the angular section size appears on a display to remain constant at 22.5 degrees but internally treated as an 11.25 degree angular section size. By way of further example, the processor may utilize 256 stop positions for mathematical purposes wherein each of 16 equal sections comprise 16 stop positions. The processor may adjust the effective size of a section by increasing or decreasing the number of stop positions for that section, i.e., by increasing the number of stop positions from 16 to 32 for an unskilled player or by decreasing the number of stop positions from 16 to 4 for a highly skilled player. The adjustments described may be either perceptible to the player by altering the angular section size on the display, or imperceptible by not altering the angular section size on the display so the player is unaware of the adjustment.

While the embodiments described herein generally refer to games of video reel slots, video poker, race or sports betting, table games, bingo, keno, and the like, it should be recognized that the systems and methods described herein may be used with any suitable game of chance. Additionally, any number and type of house indicia, player indicia, or pay tables may be used with the games described herein.

In addition, components of devices or systems described herein may be used in, and/or combined with, other devices or systems described herein unless otherwise specified. Likewise, the functionality of the systems and devices described herein may be used in, combined with, and/or incorporated into other systems and devices described herein unless otherwise specified. For example, two or more of the systems or devices described herein may be combined together, and/or one or more of the systems or devices described herein may be split into two or more other systems or devices.

The embodiments described herein or any combination thereof may allow for the system to adjust to player skill levels resulting in a system that has a higher average RTP for skilled players as opposed to unskilled players or novice or unknown player skill levels. For example, a very unskilled player may enjoy an average RTP of 85%, while an average, new or unknown skill player may enjoy an average RTP of 90%, while a highly skilled player may enjoy an average RTP of 95%. In any of the embodiments described herein or any combination thereof, the system may adjust to restrict the maximum average RTP at or below a given level, e.g., 99% for highly skilled players, to insure that no player, regardless of skill level, would or could consistently win over time. Any suitable means for adjusting the system relative to player skill levels may be utilized either individually or in combination and may include adding proportional randomness to insure that skilled players may outperform novice or unskilled players yet be restricted to a maximum average RTP.

Unless otherwise specified, "a" or "an" means one or more of a referenced object or step. Furthermore, unless otherwise specified, each method described herein is not limited to the order in which the steps of each method are described or introduced. Rather, the steps may be rearranged in any suitable order, may be omitted, and/or may be combined with steps of other methods as desired. In addition, aspects or components of each embodiment and/or figure described herein may be omitted, or may be combined with, or modified to include, aspects or components of any other embodiment and/or figure unless otherwise specified.

Unless otherwise specified, the phrase "at least one of A and B" means one or more of A alone, one or more of B alone, or one or more of the combination of A and B.

This written description uses examples to describe embodiments of the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:

a gaming device comprising:

a monetary input device configured to receive a physical item associated with a monetary value;

a user interface configured to:

enable a player to select a wager for a game of chance; and enable the player to initiate a cash out operation;

a processor programmed to:

add the monetary value to a credit balance for the player;

deduct the selected wager from the credit balance; and decrease the credit balance in response to the cash out operation; and a bonus game associated with the game of chance and a prize selector that selects one of a plurality of bonus prizes, the bonus game comprising a plurality of targets, wherein the processor adjusts at least one attribute associated the prize selector or at least one of the targets to adjust a probability of selecting particular ones of the plurality of bonus prizes, wherein the processor determines a number of displayed targets based on a history of prizes won by the player.

2. The system of claim 1 wherein the at least one attribute comprises size of the targets and wherein the processor adjusts the size of the targets based on a skill level of the player.

3. The system of claim 1 wherein at least one of the targets moves, wherein the attribute comprises target or prize selector moving speed, and wherein the processor adjusts the target or prize selector moving speed based on a skill level of the player.

4. The system of claim 1 wherein the attribute comprises a number of the targets and wherein the processor adjusts the number of the targets based on a skill level of the player.

5. The system of claim 1 wherein the processor is programmed to adjust a number of targets required to be selected by the player to select a particular one of the plurality of bonus prizes.

6. The system of claim 1 wherein the attribute comprises an amount of time for the player to select one or more of the targets and wherein the processor is programmed to adjust the amount of time based on the skill level of the player.

7. The system of claim 1 wherein the processor is programmed to determine the skill level of the player based on a player performance of the bonus game during a previous gaming session.

8. The system of claim 1 further comprising a bonus prize input device configured to enable the player to manipulate the prize selector or targets during the bonus game.

9. The system of claim 8 wherein the bonus prize input device comprises the user interface of the gaming device.

10. The system of claim 8 wherein the bonus prize input device comprises a handheld device.

11. A system, comprising:

a gaming device comprising:

a monetary input device configured to receive a physical item associated with a monetary value;

a user interface configured to:

enable a player to select a wager for a game of chance; and enable the player to initiate a cash out operation;

a processor programmed to:

add the monetary value to a credit balance for the player;

deduct the selected wager from the credit balance; and decrease the credit balance in response to the cash out operation; and a bonus game associated with the game of chance and a prize selector that selects one of a plurality of bonus prizes, the bonus game comprising a plurality of targets, wherein the processor adjusts at least one attribute associated the prize selector or at least one of the targets to adjust a probability of selecting particular ones of the plurality of bonus prizes, wherein the user interface comprises a touch screen, wherein the player selects at least one of the targets by pointing the bonus prize selector at the target using the touch screen, and wherein the attribute comprises accuracy of the prize selector, wherein the processor adjusts the accuracy of the prize selector based on a skill level of the player.

12. The system of claim 11 wherein the targets move toward the prize selector with movement of the targets based on the skill level of the player.

13. The system of claim 1 wherein the attribute is adjusted by the processor based on a skill level of the player.

14. The system of claim 13 wherein the attribute is further adjusted randomly.

15. The system of claim 1 wherein the player is awarded one of the plurality of bonus prizes, and wherein the processor is programmed to adjust a skill level of the player based on the bonus prize awarded to the player.

16. A system, comprising:
a gaming device comprising:
a monetary input device configured to receive a physical item associated with a monetary value;
a user interface configured to:
enable a player to select a wager for a game of chance; and
enable the player to initiate a cash out operation;
a processor programmed to:
add the monetary value to a credit balance for the player;
deduct the selected wager from the credit balance; and
decrease the credit balance in response to the cash out operation; and
a bonus game associated with the game of chance and a prize selector that selects one of a plurality of bonus prizes, the bonus game comprising a plurality of targets, wherein the processor adjusts at least one attribute associated the prize selector or at least one of the targets to adjust a probability of selecting particular ones of the plurality of bonus prizes, wherein the processor is programmed to adjust the at least one attribute to maintain a predetermined percentage or percentage range of money or credits returned to the player over time.

17. A method of selecting a prize for a game of chance, the method comprising:
receiving a physical item associated with a monetary value using a monetary input device of a gaming device;
enabling a player to select a wager for a game of chance using a user interface of the gaming device;
enabling the player to initiate a cash out operation using the user interface;
adding the monetary value to a credit balance for the player;
deducting the selected wager from the credit balance;
decreasing the credit balance in response to the cash out operation;
providing a bonus game that enables the player to win a bonus prize or to select one of a plurality of bonus prizes, the bonus game comprising a plurality of targets;
adjusting, by the gaming device, difficulty of the bonus game based on a skill level of the player by adjusting at least one parameter associated with selecting one or more of the targets;
awarding a selected bonus prize based on which or how many of the one or more targets is selected; and
determining the skill level of the player based on a history of prizes won by the player.

18. The method of claim 17 wherein the adjusting comprises changing a number of the targets presented during the bonus game based on the skill level of the player.

19. The method of claim 17 wherein the adjusting comprises changing size of at least some of the targets based on the skill level of the player.

20. The method of claim 17 wherein the adjusting comprises changing an amount of time for the player to select the one or more targets based on the skill level of the player.

21. The method of claim 17 wherein the adjusting comprises changing accuracy or size of a target selector based on the skill level of the player.

22. The method of claim 17 further comprising determining the skill level of the player based on a previously awarded bonus prize.

23. The method of claim 17 further comprising enabling the player to select the one or more targets via a touch screen.

24. The method of claim 17 further comprising enabling the player to select the one or more targets via a handheld bonus prize input device.

25. The method of claim 17 wherein the targets are moving and wherein adjusting comprises changing speed of the moving targets based on the skill level of the player.

26. The method of claim 17 wherein the player is awarded one of the plurality of bonus prizes, further comprising adjusting the skill level of the player based on the bonus prize awarded to the player.

27. The method of claim 17 wherein the adjusting comprises adjusting the difficulty to maintain a predetermined percentage or percentage range of money or credits returned to the player over time.

28. A gaming device, comprising:
a monetary input device configured to receive a physical item associated with a monetary value;
a user interface configured to:
enable a player to select a wager for a game of chance;
enable the player to initiate a cash out operation; and
enable the player to play a skill-based bonus game to win a bonus prize after winning the game of chance;
a processor programmed to:
add the monetary value to a credit balance for the player;
deduct the selected wager from the credit balance;
decrease the credit balance in response to the cash out operation; and
provide the skill-based bonus game to the player via the user interface, wherein the skill-based bonus game includes a plurality of player selectable targets, wherein the player is enabled to select one or more of the targets via the user interface to win the bonus prize, wherein the processor adjusts a difficulty of winning the bonus prize based on a skill level of the player, and wherein the processor adjusts the difficulty by changing size of one or more of the targets.

29. The gaming device of claim 28 wherein the processor adjusts the difficulty by adjusting a number of the targets.

30. The gaming device of claim 28 wherein the processor adjusts the difficulty by changing an amount of time for the player to select one or more of the targets.

31. The gaming device of claim 28 wherein the processor adjusts the difficulty by changing accuracy of a target selection device.

32. The gaming device of claim 28 wherein the processor is further programmed to adjust the skill level of the player based on a history of prizes won by the player.

33. The gaming device of claim 28 wherein the processor adjusts the difficulty to maintain a predetermined percentage or percentage range of money or credits returned to the player over time.

34. A gaming device, comprising:
a monetary input device configured to receive a physical item associated with a monetary value;
a user interface configured to:
enable a player to select a wager for a game of chance;
enable the player to initiate a cash out operation; and
enable the player to play a skill-based bonus game to win a bonus prize after winning the game of chance;
a processor programmed to:
add the monetary value to a credit balance for the player;
deduct the selected wager from the credit balance;

decrease the credit balance in response to the cash out operation; and provide the skill-based bonus game to the player via the user interface, wherein the skill-based bonus game includes a plurality of player selectable targets, wherein the player is enabled to select one or more of the targets via the user interface to win the bonus prize, wherein the processor adjusts a difficulty of winning the bonus prize based on a skill level of the player, and wherein the processor adjusts the difficulty based on a previously selected bonus prize.

35. The gaming device of claim 34 wherein the processor adjusts the skill level of the player based on a previously selected bonus prize.

36. The gaming device of claim 34 wherein the one or more targets are moving targets and wherein the processor adjusts the difficultly by adjusting moving speed of the one or more targets.

* * * * *